(12) United States Patent
Stibel et al.

(10) Patent No.: US 9,202,200 B2
(45) Date of Patent: Dec. 1, 2015

(54) INDICES FOR CREDIBILITY TRENDING, MONITORING, AND LEAD GENERATION

(75) Inventors: Jeffrey M. Stibel, Malibu, CA (US); Aaron B. Stibel, Malibu, CA (US); Judith Gentile Hackett, Malibu, CA (US); Moujan Kazerani, Santa Monica, CA (US); Jeremy Loeb, Santa Monica, CA (US)

(73) Assignee: Credibility Corp., Malibu, CA (US)

( * ) Notice: Subject to any disclaimer, the term of this patent is extended or adjusted under 35 U.S.C. 154(b) by 408 days.

(21) Appl. No.: 13/456,170

(22) Filed: Apr. 25, 2012

(65) Prior Publication Data

US 2012/0278767 A1 Nov. 1, 2012

Related U.S. Application Data

(60) Provisional application No. 61/479,823, filed on Apr. 27, 2011.

(51) Int. Cl.
  *G06F 3/00* (2006.01)
  *G06Q 10/10* (2012.01)
  *G06F 3/01* (2006.01)

(52) U.S. Cl.
  CPC .................................. *G06Q 10/101* (2013.01)

(58) Field of Classification Search
  USPC ........................................................ 715/854
  See application file for complete search history.

(56) References Cited

U.S. PATENT DOCUMENTS

| | | | |
|---|---|---|---|
| 6,892,178 B1 | 5/2005 | Zacharia et al. | |
| 6,892,179 B1 | 5/2005 | Zacharia et al. | |
| 6,895,385 B1 | 5/2005 | Zacharia et al. | |
| 7,403,919 B2 | 7/2008 | Chacko et al. | |
| 7,769,657 B2 | 8/2010 | Chacko et al. | |
| 7,881,994 B1 | 2/2011 | An et al. | |
| 8,532,916 B1* | 9/2013 | Szybalski | 701/457 |
| 2001/0039523 A1* | 11/2001 | Iwamoto | 705/35 |
| 2001/0039584 A1* | 11/2001 | Nobakht et al. | 709/227 |
| 2002/0133365 A1 | 9/2002 | Gery et al. | |
| 2003/0050814 A1* | 3/2003 | Stoneking et al. | 705/7 |
| 2003/0149645 A1* | 8/2003 | Flynn et al. | 705/30 |
| 2006/0123014 A1* | 6/2006 | Ng | 707/100 |
| 2006/0212931 A1* | 9/2006 | Shull et al. | 726/10 |
| 2006/0253584 A1 | 11/2006 | Dixon et al. | |
| 2006/0265429 A1* | 11/2006 | Pendergast et al. | 707/201 |
| 2007/0019235 A1* | 1/2007 | Lee | 358/1.15 |
| 2007/0208613 A1* | 9/2007 | Backer | 705/10 |

(Continued)

*Primary Examiner* — Amy Ng
*Assistant Examiner* — Toan Vu
(74) *Attorney, Agent, or Firm* — Los Angeles Patent Group; Arman Katiraei

(57) ABSTRACT

Some embodiments provide a credibility system that computes credibility scores to quantify the credibility of different businesses and to coalesce the generated credibility scores into various indices. The indices comparatively present the credibility of a particular business relative to other businesses along one or more dimensions. Based on the indices, the system identifies trends in the credibility of a particular business. The system derives preliminary credibility for a new business for which credibility data has not yet been obtained based on credibility that has been previously established for other businesses in an index associated with the new business. The system provides automated services for monitoring credibility of a business and for generating alerts to notify the business that its credibility has reached various thresholds. The system identifies business practices that improve upon or adversely affect the credibility of a particular business.

18 Claims, 34 Drawing Sheets

(56) References Cited

U.S. PATENT DOCUMENTS

| | | | |
|---|---|---|---|
| 2007/0266342 A1* | 11/2007 | Chang et al. | 715/810 |
| 2007/0288477 A1* | 12/2007 | Rekimoto | 707/10 |
| 2008/0148175 A1* | 6/2008 | Naaman et al. | 715/781 |
| 2008/0255984 A1* | 10/2008 | Millstone | 705/38 |
| 2008/0288494 A1* | 11/2008 | Brogger et al. | 707/7 |
| 2009/0150378 A1 | 6/2009 | Skubacz et al. | |
| 2009/0177644 A1* | 7/2009 | Martinez et al. | 707/5 |
| 2009/0222358 A1* | 9/2009 | Bednarek | 705/27 |
| 2009/0249070 A1* | 10/2009 | Abendroth et al. | 713/170 |
| 2009/0276233 A1* | 11/2009 | Brimhall et al. | 705/1 |
| 2009/0281988 A1* | 11/2009 | Yoo | 707/3 |
| 2009/0313346 A1* | 12/2009 | Sood | 709/207 |
| 2009/0319342 A1* | 12/2009 | Shilman et al. | 705/10 |
| 2009/0327054 A1 | 12/2009 | Yao et al. | |
| 2009/0328209 A1* | 12/2009 | Nachenberg | 726/22 |
| 2010/0114899 A1* | 5/2010 | Guha et al. | 707/741 |
| 2010/0153181 A1 | 6/2010 | Altunbasak et al. | |
| 2010/0153404 A1* | 6/2010 | Ghosh et al. | 707/748 |
| 2010/0262606 A1* | 10/2010 | Bedolla et al. | 707/741 |
| 2010/0332296 A1* | 12/2010 | Gharabally | 705/14.2 |
| 2011/0047035 A1* | 2/2011 | Gidwani et al. | 705/14.73 |
| 2011/0208684 A1* | 8/2011 | Dube et al. | 706/52 |
| 2011/0252121 A1* | 10/2011 | Borgs et al. | 709/223 |
| 2011/0313925 A1* | 12/2011 | Bailey, Jr. | 705/44 |
| 2012/0054169 A1* | 3/2012 | Marmaros et al. | 707/706 |
| 2012/0072384 A1* | 3/2012 | Schreiner et al. | 706/45 |
| 2012/0110672 A1* | 5/2012 | Judge et al. | 726/25 |
| 2012/0130723 A1* | 5/2012 | Bhattacharjee | 705/1.1 |
| 2012/0166803 A1* | 6/2012 | Hu et al. | 713/171 |
| 2012/0240200 A1* | 9/2012 | Lapidous | 726/4 |
| 2012/0260209 A1* | 10/2012 | Stibel et al. | 715/780 |
| 2013/0018737 A1* | 1/2013 | Kumar et al. | 705/14.73 |
| 2013/0066884 A1* | 3/2013 | Kast et al. | 707/748 |
| 2013/0080447 A1* | 3/2013 | Ramer et al. | 707/748 |
| 2013/0282706 A1* | 10/2013 | Yoo | 707/723 |

\* cited by examiner

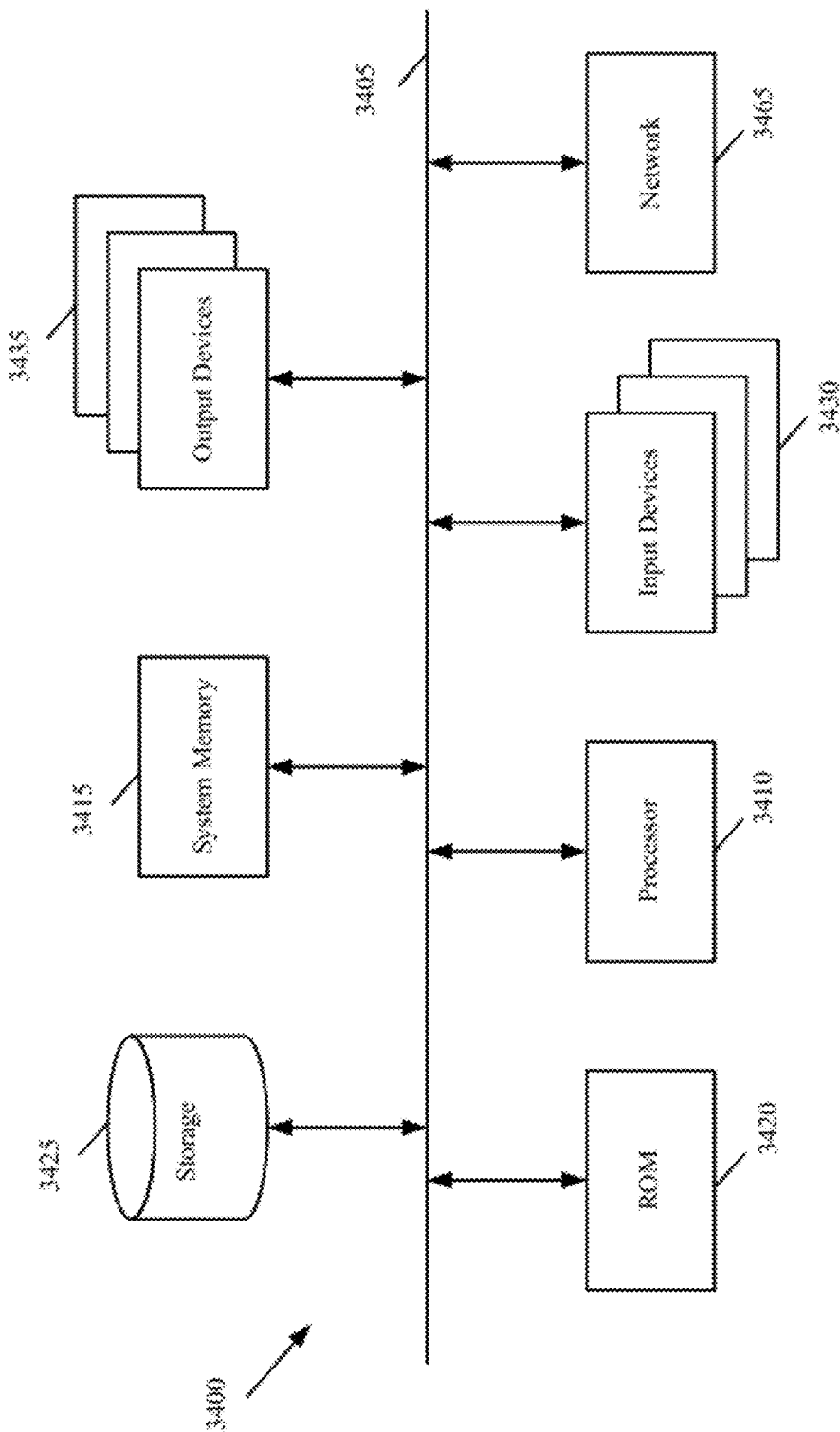

INDICES FOR CREDIBILITY TRENDING, MONITORING, AND LEAD GENERATION

CLAIM OF BENEFIT TO RELATED APPLICATIONS

This application claims the benefit of U.S. provisional application 61/479,823, entitled "Credibility and Credit Indices and Derived Uses for Trending, Predictive Forecasting, Lead Generation, and Event Accounting", filed Apr. 27, 2011. The contents of the provisional application 61/479,823 are hereby incorporated by reference.

TECHNICAL FIELD

The present invention pertains to systems, methods, and processes for enabling businesses to determine, communicate, and manage their credibility.

BACKGROUND

Credibility is a measure of the trustworthiness, reputation, and belief in an entity. Credibility may be derived from subjective and objective components relating to the services and goods that are provided by the entity. Credibility is built over time through the individual experiences of clients and others who engage in commercial transactions with the entity. These experiences are conveyed by word-of-mouth and are recorded for others to view in various print, audio, visual, or digital (online) mass distribution mediums. For example, the reviews section of the newspaper stores the experiences of food and entertainment critics and websites, such as www.yelp.com, www.citysearch.com, www.zagat.com, and www.amazon.com, provide an online medium that records the experiences of individual consumers and professional critics in an always-on and readily available medium for others to view.

For the small business, credibility is a critical factor in determining its day-to-day success. Specifically, whether a client leaves satisfied with a service or a product that has been purchased from the small business is instrumental in determining whether that client will be a repeat customer or whether that client will positively impact the credibility of the small business by publishing reviews to encourage others to visit the small business. A sufficient number of good client experiences that are recorded to the various mass distribution mediums beneficially increase the exposure of the small business, thereby resulting in better chances of growth, success, and profitability. Conversely, a sufficient number of bad client experiences can doom a small business by dissuading potential clientele from engaging in commercial transactions with the small business. The success of the small business is therefore predicated more on credibility than on other factors such as business creditworthiness.

Due to the inherent partial subjective nature of credibility, credibility has long been a measure that is difficult to quantify. Instead, credibility has existed as an unreliable and inconsistent set of independent credibility data where the viewer of that credibility data is left to quantify the credibility of a business based on his/her own analysis. For example, users access websites such as www.yelp.com, www.citysearch.com, www.zagat.com, www.amazon.com, etc. to obtain credibility data in the form of quantitative ratings, qualitative reviews, and other data about an entity from which to derive an independent opinion of the credibility of that entity. Accordingly, different users will come to different conclusions about the credibility of an entity even when provided the same set of credibility data.

While credibility data exists in many forms and in many different mass distribution mediums, there is currently no service that accurately, readily, and consistently quantifies that credibility data. Specifically, an online user can visit a website, such as www.yelp.com, view credibility data for a particular business that was submitted by hundreds of other users, and analyze that credibility data to derive a first measure of credibility for that business. The same user can then visit a different website, such as www.citysearch.com, view different credibility data for the particular business that was submitted by hundreds of other users, and analyze that credibility data to derive a second measure of credibility for that business that is inconsistent with the first measure of credibility derived from the credibility data that was obtained from www.yelp.com. Similarly, a different user can also visit www.yelp.com, view the credibility data for the particular business, and analyze that credibility data to derive a third measure of credibility for that business that is inconsistent with the measure derived by the first user from the same credibility data that is available at www.yelp.com, because the analysis that was employed by each user was subject to different biases, interests, interpretation, importance, etc.

Accordingly, there is a need to standardize measures of credibility for different businesses based on aggregate credibility data that is available at different credibility data sources. There is a need for such standardization to provide consistent, comparable, and easy to understand quantitative measures such that individual analytic biases and interpretation are eliminated, credibility derived for each business is derived according to the same set of rules and processes, and credibility of one business can be compared with the credibility of another business where the other business is a competitor, in the same field, in a different field, in the same region, etc.

SUMMARY OF THE INVENTION

It is an object of the present invention to define methods, systems, and computer software products for generating a tangible asset in the form of a standardized credibility score or credibility report that quantifiably measures business credibility based on a variety of data sources and credibility data that includes quantitative data, qualitative data, and other data related to other credibility dimensions. It is further an object to coalesce the generated credibility scores or reports into various indices. It is an object to utilize the indices to comparatively present the credibility of a particular business relative to other businesses that are associated with the particular business along one or more dimensions. It is further an object to utilize the indices to identify trends in the credibility of a particular business by comparing the credibility of the particular business with the credibility of other businesses associated with the indices. It is further an object to derive preliminary credibility for a new business for which credibility data has not yet been obtained based on credibility that has been previously established for other businesses in an index associated with the new business. It is further an object to provide automated services for monitoring credibility of a business and for generating alerts or other notifications to notify the business that its credibility has exceeded or fallen below one or more thresholds that have been set for that business, where the thresholds identify credibility levels of particular importance to the business. It is further an object to utilize the indices for purposes of identifying business practices that improve upon or adversely affect the credibility of a particular business. It is further an object to utilize the indices for purposes of identifying new partnerships that can improve upon the credibility of a particular business and established partnerships that adversely affect the credibility of that particular business.

Accordingly, some embodiments provide a credibility scoring and reporting system and methods. The credibility scoring and reporting system includes a master data manager, database, reporting engine, and interface portal. The master data manager aggregates from multiple data sources qualitative credibility data, quantitative credibility data, and other data related to one or more entities. The master data manager matches the aggregated data to an appropriate entity to which the data relates. The reporting engine performs natural language processing over the qualitative credibility data to convert the qualitative credibility data into numerical measures that quantifiably represent the qualitative credibility data. The quantitative measures and credibility data are then filtered to remove abnormalities, to adjust weighting where desired, and to normalize the quantitative measures. For a particular entity, the reporting engine compiles the quantitative measures that relate to the particular entity into a credibility score. In some embodiments, a credibility report is generated to detail the derivation of the credibility score with relevant credibility data. In some embodiments, the credibility report also suggests actions for how the entity can improve upon its credibility score. Using the interface portal, businesses and individuals can purchase and view the credibility scores and/or credibility reports while also engaging and interacting with the credibility scoring and reporting system. Specifically, users can submit credibility data and correct mismatches between credibility data and incorrect entities.

In some embodiments, the credibility scoring and reporting system is enhanced with an indexer. The indexer aggregates credibility scores for multiple entities that are related based on adjustable criteria. In some embodiments, the indexer also aggregates credibility data or credibility reports of those related entities. The aggregated scores are compiled into one or more indices. Each index of the indices comparatively presents credibility of each of the entities that are associated with that index. Different indices comparatively present credibility of different sets of entities that are related based on different criteria associated with each of the indices. From the various indices, users are able to quickly determine how the credibility of a given entity measures in relation to its competitors, entities in related fields, entities in similar geographic regions, or other criteria. In some embodiments, the indices are presented to the users through the interface portal with one or more interactive tools. The interactive tools allow the users the ability to on-the-fly adjust the criteria for the displayed index and to quickly obtain access to different indices related to a given entity.

In some embodiments, the indexer links the indices to those entities that are related with an index. The indices and the associated links are stored to the database. Accordingly when a user searches for a particular entity using the interface portal, the user will be provided access to one or more of the indices that are associated with that particular entity.

In some embodiments, the indexer performs analysis on the indices that are associated with each entity in order to identify trends that forecast the future credibility for those entities. These trends may relate to macro credibility influences that effect entities associated with the analyzed indices. Then, based on the identified trends, the indexer may forecast future or expected fluctuations to the credibility of the entity or entities that are associated with a particular index.

The analysis further identifies, from the indices, business practices of a particular entity that are proven to be successful or unsuccessful in terms of positively or negatively affecting the credibility for that particular entity. The indexer automatically identifies successful or beneficial business practices of the particular entity by identifying other entities having good credibility in the indices that are associated with the particular entity and by then identifying commonality between the credibility data of the particular entity and the credibility data of the identified entities. Similarly, the indexer automatically identifies unsuccessful or detrimental business practices of the particular entity by identifying other entities having poor credibility in the indices that are associated with the particular entity and by then identifying commonality between the credibility data of the particular entity and the credibility data of the identified entities. This information provides the particular entity with targeted information from which it can identify specific practices that can be adjusted in order to correct and improve its credibility, and derived credibility score, thereby improving its standing in the various indices. In some embodiments, the indexer analyzes the set of indices that are associated with the particular business in order to identify successful and unsuccessful business practices in use by other entities and that can be suggested to the particular entity to improve its credibility. Some such successful business practices are identified by detecting commonality in the credibility data for the entities having the highest credibility scores in the indices associated with the particular entity and some such unsuccessful business practice are identified by detecting commonality in the credibility data for the entities having the lowest credibility scores in the indices associated with the particular entity.

Identification of these successful and unsuccessful business practices facilitates predictive credibility scoring by the indexer. When performing predictive credibility scoring, the indexer models how changes to various business practices of the particular entity will affect the credibility score of that particular entity in the future. In this manner, the indexer discretely identifies steps that the particular entity can undertake to rectify or improve its credibility score while also discretely identifying what amount of improvement the particular entity is likely to see should those steps be performed.

In some embodiments, the indexer leverages the indices that are associated with a particular entity in order to generate leads identifying partnerships that if established by the particular entity may improve the credibility score for that particular entity. In some such embodiments, the indexer generates leads by identifying top performing entities in an index associated with the particular entity and then identifying partnerships used by those top performing entities as leads. These partnerships may include partnerships with suppliers, manufacturers, financiers, marketing agencies, contractors, etc. and that are established by the top performing entities. Similarly, the indexer can identify partnerships of the particular entity that are beneficial and detrimental to its credibility score by comparing the partnerships that the particular entity has with those of the top performing entities. For example, the indexer identifies a parts supplier that is a partner of several entities having poor credibility in the indices associated with a particular entity of interest and that parts supplier is also a partner of the particular entity. By identifying this parts supplier, the indexer may identify a partnership that adversely affects the credibility of the particular entity, thereby indicating that the credibility of the particular entity can potentially be improved by partnering with a more credible parts supplier.

In some embodiments, the indexer forecasts potential fluctuations to the credibility of an entity based on observed micro and macro events. These events can have a bearing on whether demand for a good may increase and whether supply for a part may decrease as some examples. Based on the identification of these events and the forecasted change to the credibility of the entity, the entity can take appropriate steps to address the fluctuations that are caused by the events and thereby preempt or proactively confront any such changes to the entity's credibility.

In some embodiments, the indexer utilizes the indices to derive a preliminary credibility score for a new entity that has registered with the credibility system and for which credibility data has not yet been aggregated or does not exist in sufficient quantities to derive a credibility score. The indexer adjusts the preliminary credibility score based on factors such as number of direct competitors, age of the market, historic growth of the market, how "hot" the market is, etc.

In some embodiments, the indexer provides credibility management and monitoring. Using the interface portal, entities can set one or more credibility score thresholds. When the credibility score for a particular entity satisfies a particular set threshold, the particular entity is alerted or otherwise notified. The particular entity can respond in kind to rectify a falling credibility score or identify whether changes in business practices, marketing, partnerships, etc. have had a desired effect on the credibility of the particular entity. Once the thresholds are set, the monitoring occurs automatically without the need for the particular entity to continually and manually check the score itself.

BRIEF DESCRIPTION OF THE DRAWINGS

In order to achieve a better understanding of the nature of the present invention a preferred embodiment of the credibility scoring and reporting system and methods will now be described, by way of example only, with reference to the accompanying drawings in which:

FIG. 34 illustrates a computer system with which some embodiments are implemented.

DETAILED DESCRIPTION OF THE INVENTION

In the following detailed description, numerous details, examples, and embodiments of a credibility scoring and reporting system including the indexer and the associated methods are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described.

I. Overview

For the small business, business credibility is an invaluable asset that can be used to identify which business practices have been successful, practices that have inhibited the success of the business, desired improvements by customers, where future growth opportunities lie, and changes that can be made to improve the future growth and success of the business. Today, business credibility exists as qualitative data and as non-standardized quantitative measures that selectively gauge various factors relating to a business using different ranking systems. The qualitative and non-standardized nature of credibility data results in an intangible asset for which baseline measurements do not exist, cross-comparisons cannot be made, and against which individual biases and scarcity of information undermine the relevancy of the information. Consequently, businesses, especially small business, are unable to effectively determine or evaluate their credibility in the marketplace and future strategic decisions are misguided or inaccurate as a result.

To overcome these and other issues and to provide tangible assets that quantifiably measure entity credibility, some embodiments provide a credibility scoring and reporting system. The credibility scoring and reporting system generates standardized credibility scores that quantifiably measure entity credibility based on aggregated data from multiple data sources and that present the credibility as a readily identifiable score that can be comparatively analyzed against credibility scores of competitors that are derived using the same system and methods. In some embodiments, the credibility scoring and reporting system generates credibility reports that detail the derivation of the credibility score for each entity. More specifically, the credibility report is a single tool from which a particular entity can identify practices that have been successful, practices that have inhibited the success of the entity, desired improvements by customers, where future growth opportunities lie, and changes that can be made to improve the future growth and success of the entity.

Figure 1:
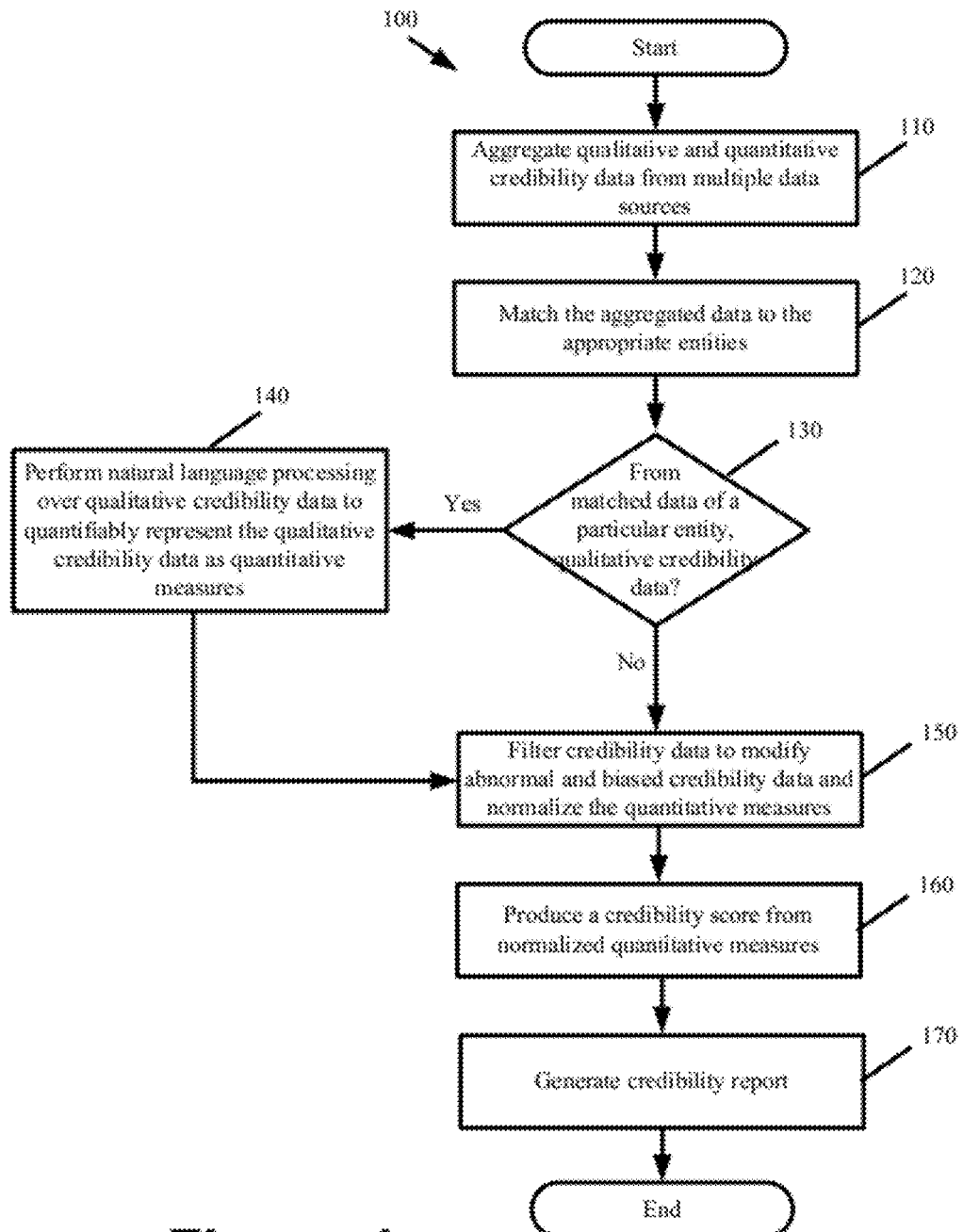
FIG. 1 presents a process performed by the credibility scoring and reporting system to generate a credibility score and credibility report in accordance with some embodiments.

FIG. 1 presents a process 100 performed by the credibility scoring and reporting system to generate a credibility score and credibility report in accordance with some embodiments. The process begins by aggregating (at 110) qualitative and quantitative credibility data from multiple data sources. This includes collecting data from various online and offline data sources through partner feeds, files, and manual inputs. The process matches (at 120) the aggregated data to the appropriate entities. The matched data for each entity is analyzed (at 130) to identify qualitative credibility data from quantitative credibility data. The process performs natural language processing (at 140) over the qualitative credibility data to convert the qualitative credibility data into quantitative measures. The derived quantitative measures for the qualitative credibility data and the other aggregated quantitative credibility data are then subjected to the scoring filters that modify (at 150) the quantitative measures for abnormal and biased credibility data and that normalize the quantitative measures. The process produces (at 160) a credibility score by compiling the remaining normalized quantitative measures.

The credibility score accurately represents the credibility of a given entity, because (i) the credibility score is computed using data from varied data sources and is thus not dependent on or disproportionately affected by any single data source, (ii) the credibility data is processed using algorithms that eliminate individual biases from the interpretation of the qualitative credibility data, (iii) the credibility data is processed using filters that eliminate biased credibility data while normalizing different quantitative measures, and (iv) by using the same methods and a consistent set of algorithms to produce the credibility score for a plurality of entities, the produced credibility scores are standardized and can be subjected to comparative analysis in order to determine how the credibility score of one entity ranks relative to the credibility scores of competitors or other entities. As a result, the credibility score can be sold as a tangible asset to those entities interested in understanding their own credibility.

In some embodiments, the process also generates (at 170) a credibility report as a separate tangible asset for entities interested in understanding the derivation of their credibility score and how to improve their credibility score. In some embodiments, the credibility report presents relevant credibility data to identify the derivation of the credibility score. In some embodiments, the credibility report also suggests actions for how the entity can improve upon its credibility score.

Some embodiments provide an interface portal from which entities or other users can purchase and view the credibility scores and/or credibility reports. Using these assets (i.e., credibility scores and credibility reports), entities can formulate accurate and targeted business objectives to improve their credibility and, more importantly, their likelihood for future growth and success. Entities will also have access to the credibility scores of other entities. The credibility score can be used in this manner to guide clientele to credible businesses and steer clientele away from entities providing a poor customer experience. Moreover, the credibility scores can serve to identify entities with which a particular entity would want to partner with or form relationships with for future business transactions. Accordingly, there is incentive for entities to improve upon their credibility scores as clientele and partners may be looking at the same information when determining whether or not to conduct business with a particular entity.

The portal further acts as a means by which entities can be directly involved with the credibility scoring process. Specifically, using the interface portal, entities can submit pertinent credibility data that may otherwise be unavailable from the data sources and can correct mismatched credibility data.

II. Credibility Scoring and Reporting System

Figure 2:
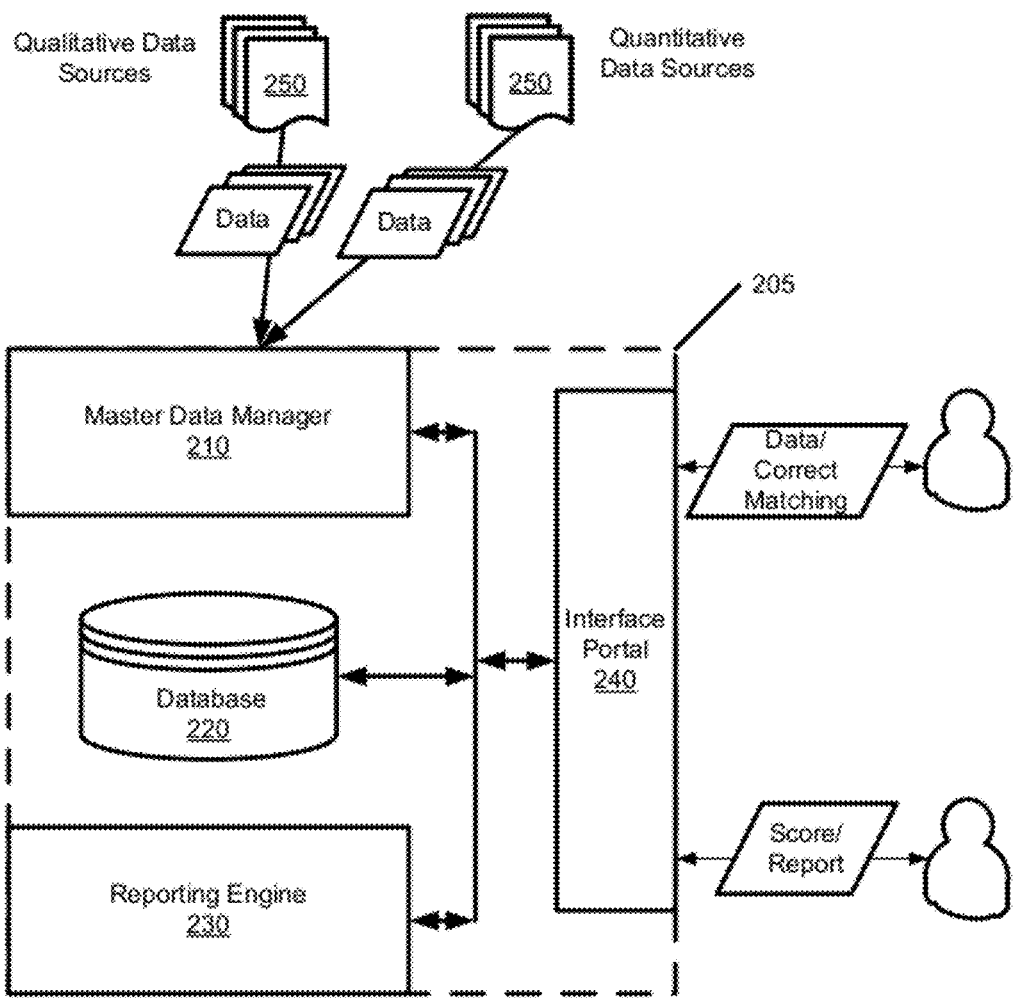
FIG. 2 presents some components of the credibility scoring and reporting system of some embodiments.

FIG. 2 presents components of the credibility scoring and reporting system 205 of some embodiments. The credibility scoring and reporting system 205 includes (1) master data manager 210, (2) database 220, (3) reporting engine 230, and (4) interface portal 240. As one skilled in the art would understand in light of the present description, the credibility scoring and reporting system 205 may include other components in addition to or instead of the enumerated components of FIG. 2. The components 210-240 of FIG. 2 are not intended as an exhaustive listing, but rather as an exemplary set of components for descriptive and presentation purposes. The overall system 205 is designed with modular plug-in components whereby new components or enhanced functionality can be incorporated within the overall system 205 without having to modify existing components or functionality.

A. Master Data Manager

At present, an entity can attempt to determine its credibility by analyzing credibility data at a particular data source to see what others are saying about the entity. Credibility obtained in this manner is deficient in many regards. Firstly, credibility that is derived from one or a few data sources is deficient because a sufficient sampling of credibility cannot be obtained from a single data source or even from a few data sources. For example, a site that includes only two negative reviews about a particular entity may not accurately portray the credibility of that particular entity when that particular entity services thousands of individuals daily. Moreover, one or more of the data sources may have biased data or outdated data that disproportionately impact the credibility of the entity. Secondly, credibility that is derived from one or a few data sources is deficient because each data source may contain information as to a particular aspect of the entity. As such, credibility derived from such few sources will not take into account the entirety of the entity's business dealings and can thus be misleading. Thirdly, credibility is deficient when it is not comparatively applied across all entities, amongst competitors, or a particular field of business. For example, a critical reviewer may identify a first entity as "poor performing" and identify a second entity as "horribly performing". When viewed separately, each entity would be classified with poor credibility. However, with comparative analysis, the first entity can be classified with better credibility than the second entity. Fourthly, credibility data from different reviewers or data sources is not standardized which opens the credibility data to different interpretations and individual biases. For example, it is difficult to determine whether for the same entity a 3 out of 5 ranking from www.yelp.com is equivalent to a 26 out of 30 ranking on www.zagat.com. Similarly, a review that states the services of a first entity as "good" can be interpreted by the first entity as a successful or positive review, whereas the same review of "good" for a second entity can be interpreted by the second entity as an average review from which services have to be improved upon.

To address these and other issues in deriving entity credibility, some embodiments include the master data manager 210. The master data manager 210 interfaces with multiple data sources 250 and to automatedly acquire relevant credibility data from these sources 250 at regular and continuous intervals. In so doing, the master data manager 210 removes the deficiencies that result from an insufficient sample size, outdated data, and lack of comparative data.

Figure 3:
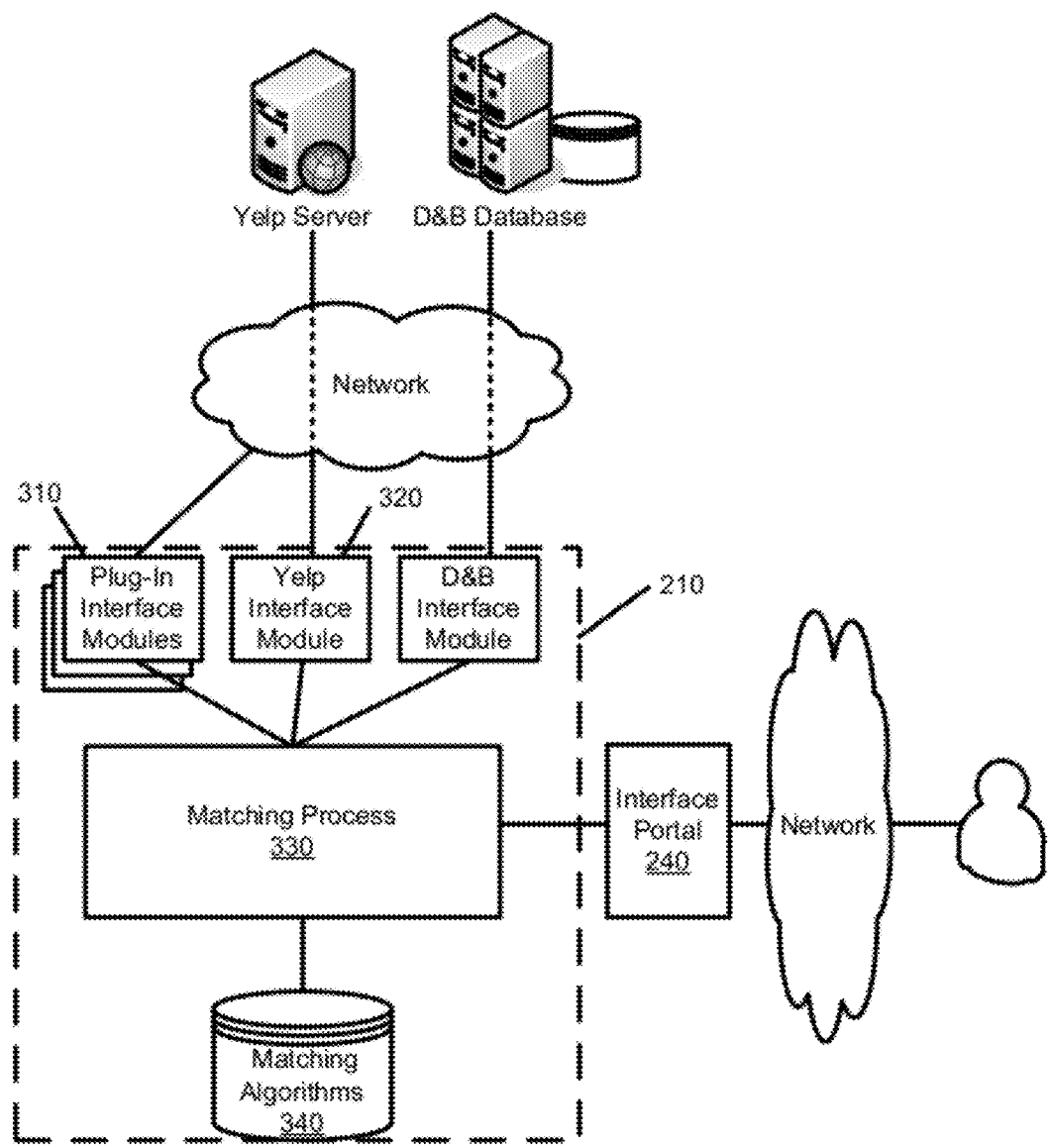
FIG. 3 illustrates components of the master data manager in accordance with some embodiments.

FIG. 3 illustrates components of the master data manager 210 in accordance with some embodiments. The master data manager 210 includes various plug-in interface modules 310 (including plug-in 320), matching process 330, and database 340 storing a set of matching algorithms. Access to the master data manager 210 is provided through the interface portal 240 of FIG. 2.

The master data manager 210 aggregates data from various data sources through the plug-in interface modules 310 (including 320) and through the interface portal 240. Each plug-in interface module 310 is configured to automatically interface with one or more data sources in order to extract credibility data from those data sources. In some embodiments, each plug-in interface module 310 is configured with communication protocols, scripts, and account information to access one or more data sources. Additionally, each plug-in interface module 310 may be configured with data crawling functionality to extract credibility data from one or more data sources. A particular plug-in interface module navigates through a particular data source in order to locate the credibility data. In one illustrated example, the master data manager 210 includes a particular plug-in interface module 320 to the website www.yelp.com. This interface module 320 can be configured with account information to access the www.yelp.com website and a data crawler script to scan through and extract entity credibility data directly from the website. In some embodiments, partnership agreements are established with the data sources, whereby the plug-in interface modules directly interface with one or more databases of the data source in order to extract the credibility data.

The extracted credibility data includes qualitative data and quantitative data about one or more entities. Qualitative data includes customer and professional review data, blog content, and social media content as some examples. Some data sources from which qualitative data about various entities may be acquired are internet websites such as www.yelp.com, www.citysearch.com, www.zagat.com, www.gayot.com, www.facebook.com, and www.twitter.com. Accordingly, some embodiments of the master data manager 210 include a different plug-in interface module 310 to extract the credibility data from each of those sites. Quantitative data includes credit and credibility data that is quantitatively measured using some scale, ranking, or rating. Some quantitative data sources include Dun & Bradstreet® and the Better Business Bureau® (BBB). Some qualitative data sources may also include quantitative credibility data. For example, www.yelp.com includes qualitative data in the form of textual reviews and comments and quantitative data in the form of a 0 out of 5 rating system. Some embodiments of the master data manager 210 include a different plug-in interface module 310 to extract quantitative data from the quantitative data sources.

The plug-in interface modules 310 allow data from new data sources to be integrated into the master data manager 210 without altering functionality for any other plug-in interface module 310. This modularity allows the system to scale when additional or newer data sources are desired. Moreover, the plug-in interface modules 310 allow the credibility data to automatically and continuously be acquired from these various data sources. In some embodiments, the aggregated data includes copied text, files, feeds, database records, and other digital content.

Qualitative data and quantitative data may also be aggregated from other mediums including print publications (e.g., newspaper or magazine articles), televised commentary, or radio commentary. In some embodiments, the data sources access the interface portal 240 in order to provide their data directly to the master data manager 210. For example, relevant magazine articles may be uploaded or scanned and submitted through the interface portal 240 by the publisher. Publications and recordings may also be submitted by mail. An incentive for the publisher to submit such information is that doing so may increase the exposure of the publisher. Specifically, the exposure may increase when submitted publications are included within the generated credibility reports of some embodiments.

Credibility data may also be submitted directly by an entity to the master data manager 210. This is beneficial for small business entities that are unknown to or otherwise ignored by the various data sources. Specifically, credibility data can be submitted through the interface portal 240 by the business owner and that data can be incorporated into the credibility scores and credibility reports as soon as the data becomes available. In this manner, the business entity can be directly involved with the credibility data aggregation process and need not depend on other data sources to provide credibility data about the business to the master data manager 210. For example, the Los Angeles County of Health issues health ratings to restaurants on a graded A, B, and C rating system.

Should a restaurant receive a new rating, the restaurant business owner can submit the new rating to the master data manager 210 through the interface portal 240 without waiting for a third party data source to do so. A submission may be made via a webpage in which the submitting party identifies himself/herself and enters the data as text or submits the data as files.

The master data manager 210 tags data that is aggregated using the plug-in modules 310 and data that is submitted through the interface portal 240 with one or more identifiers that identify the entity to which the data relates. In some embodiments, the identifiers include one or more of a name, phonetic name, address, unique identifier, phone number, email address, and Uniform Resource Locator (URL) as some examples. For automatically aggregated credibility data, the plug-in modules 310 tag the aggregated credibility data with whatever available identifiers are associated with the credibility data at the data source. For example, the www.yelp.com site groups reviews and ranking (i.e., credibility data) for a particular entity on a page that includes contact information about the entity (e.g., name, address, telephone number, website, etc.). For credibility data that is submitted through the interface portal 240, the submitting party will first be required to create a user account that includes various identifiers that are to be tagged with the credibility data that is sent by that party.

In some cases, the tagged identifiers do not uniquely or correctly identify the entity that the data is to be associated with. This may occur when an entity operates under multiple different names, phone numbers, addresses, URLs, etc. Accordingly, the master data manager 210 includes matching process 330 that matches the aggregated data to an appropriate entity using a set of matching algorithms from the matching algorithms database 340. To further ensure the integrity and quality of the data matching, some embodiments allow for the entities themselves and community to be involved in the matching process 330.

Figure 4:
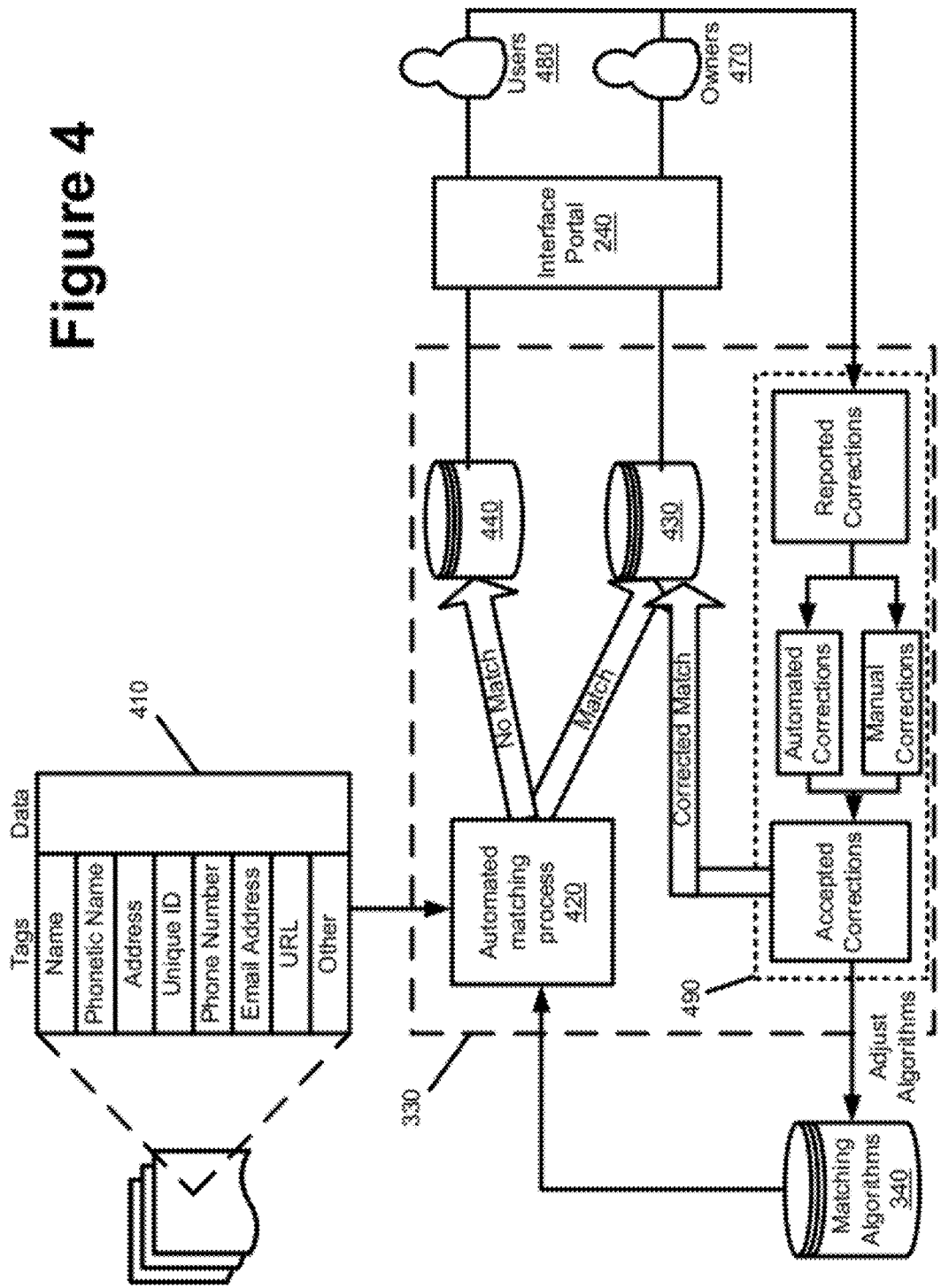
FIG. 4 presents a flow diagram for the matching process that is performed by the master data manager of some embodiments.

FIG. 4 presents a flow diagram for the matching process 330 that is performed by the master data manager of some embodiments. The matching process 330 involves tagged credibility data 410, an automated matching process 420, a first database 430, a second database 440, interface portal 240, owners 470, user community 480, correction process 490, and matching algorithms database 340.

The matching process 330 begins when tagged credibility data 410 is passed to the automated matching process 420. The automated matching process 420 uses various matching algorithms from the matching algorithms database 340 to match the credibility data 410 with an appropriate entity. Specifically, the credibility data 410 is associated with an identifier that uniquely identifies the appropriate entity. When a match is made, the credibility data is stored to the first database 430 using the unique identifier of the entity to which the credibility data is matched. In some embodiments, the first database 430 is the database 220 of FIG. 2. In some embodiments, the unique identifier is referred to as a credibility identifier. As will be described below, the credibility identifier may be one or more numeric or alphanumeric values that identify the entity.

In addition to matching the data to the appropriate entity, the automated matching process 420 may also perform name standardization and verification, address standardization and verification, phonetic name matching, configurable matching weights, and multi-pass error suspense reduction. In some embodiments, the automated matching process 420 executes other matching algorithms that match multiple entities to each other if ownership, partnership, or other relationships are suspected. For example, the automated matching process 420 determines whether the Acme Store in New York is the same entity as the Acme Store in Philadelphia, whether variations in the spelling of the word Acme (e.g., "Acme", "Acmi", "Akme", "Ackme", etc.) relates to the same entity or different entities, or whether "Acme Store", "Acme Corporation", and "Acme Inc." relate to the same entity or different entities. Such matching is of particular importance when ascertaining credibility for entities with both a digital presence (i.e., online presence) and an actual presence. For instance, offline credit data may be associated with a business entity with the name of "Acme Corporation" and that same entity may have online credibility data that is associated with the name of "Acme Pizza Shop".

However, the matching process 330 may be unable to automatically match some of the credibility data to an entity when there is insufficient information within the tags to find an accurate or suitable match. Unmatched credibility data is stored to the second database 440. The second database 440 is a temporary storage area that suspends unmatched credibility data until the data is discarded, manually matched by owners 470 (i.e., business entity owners), or manually matched by users in the community 480.

The interface portal 240 of FIG. 2 allows owners 470 and a community of users 480 to become involved in the matching process 330. In some embodiments, the interface portal 240 is a website through which owners 470 gain access to the matching process 330 and the databases 430 and 440. Through the interface portal 240, owners 470 can claim their accounts and verify themselves as a particular entity. Thereafter, the owners 470 can control matching errors, detect identity fraud, and monitor the integrity of their credibility score. Specifically, owners 470 can identify matching errors in the first database 430 and confirm, decline, or suggest matches for credibility data that has been suspended to the second database 440. Through the interface portal 240, owners 470 can address credibility issues in real-time. In some embodiments, owners 470 include agents or representatives of the business entity that are permitted access to the business entity account in the credibility scoring and reporting system.

In some embodiments, the interface portal 240 also provides users access to the matching process 330 through a plug-in. The plug-in can be utilized on any website where credibility data is found. In some embodiments, the plug-in is for external websites that wish to seamlessly integrate the backend of credibility data suppliers to the credibility scoring and reporting system. In this manner, an entity can own and manage the review of credibility data itself. Accordingly, whenever a user in the community 480 or owner 470 spots an incorrect match or issues with credibility data, they can interact with that data through the plug-in. This allows for community 480 interaction whereby other users help improve matching results.

When an improper match is flagged for review or a new match is suggested, it is passed to the correction process 490 for verification. In some embodiments, the correction process 490 includes automated correction verification and manual correction verification. Automated correction verification can be performed by comparing the flagged credibility data against known entity account information or other credibility data that has been matched to a particular entity. Approved corrections are entered into the first database 430. Disapproved corrections are ignored.

In some embodiments, adjustments may be made to improve the matching accuracy of the matching algorithms in the matching algorithm database 340 based on the approved corrections. In this manner, the matching process 330 learns from prior mistakes and makes changes to the algorithms in a manner that improves the accuracy of future matches.

B. Database

Figure 5:
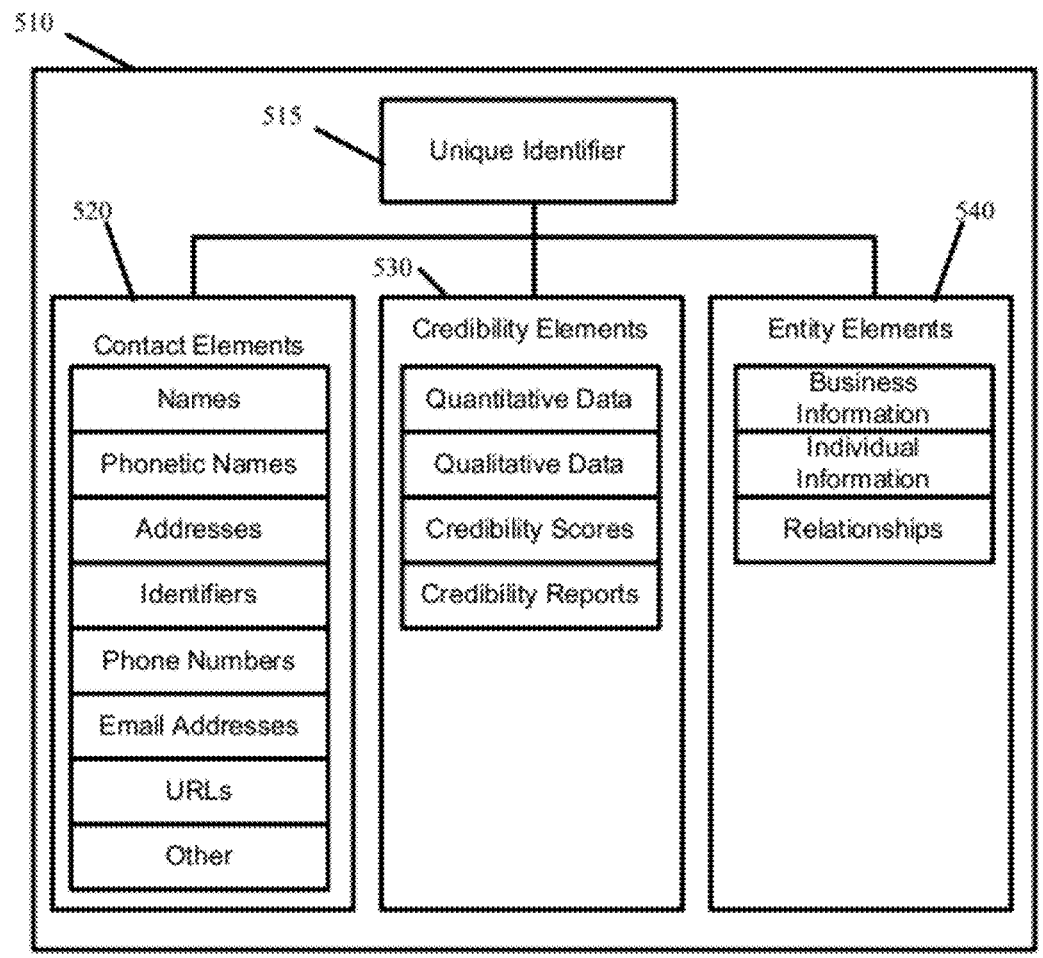
FIG. 5 illustrates an exemplary data structure for storing the credibility scoring information.

Referring back to FIG. 2, the database 220 stores various information pertaining to the credibility scoring of each entity using the unique identifier that is assigned to each entity. FIG. 5 illustrates an exemplary data structure 510 for storing the credibility scoring information. The data structure 510 includes unique identifier 515, contact elements 520, credibility elements 530, and entity elements 540.

As before, the unique identifier 515 uniquely identifies each entity. The contact elements 520 store one or more names, addresses, identifiers, phone numbers, email addresses, and URLs that identify an entity and that are used to match aggregated and tagged credibility data to a particular entity. The credibility fields 530 store the aggregated and matched qualitative and quantitative credibility data. Additionally, the credibility fields 530 may store generated credibility scores and credibility reports that are linked to the unique identifier 515 of the data structure 510. The entity elements 540 specify business information, individual information, and relationship information. Business information may include business credit, financial information, suppliers, contractors, and other information provided by companies such as Dun & Bradstreet. Individual information identifies individuals associated with the business. Relationship information identifies the roles of the individuals in the business and the various business organization or structure. Individual information may be included to assist in the matching process and as factors that affect the credibility score. For example, executives with proven records of growing successful businesses can improve the credibility score for a particular business and inexperienced executives or executives that have led failing businesses could detrimentally affect the credibility score of the business.

Logically, the database 220 may include the databases 430 and 440 of FIG. 4 and other databases referred to in the figures and in this document. Physically, the database 220 may include one or more physical storage servers that are located at a single physical location or are distributed across various geographic regions. The storage servers include one or more processors, network interfaces for networked communications, and volatile and/or nonvolatile computer-readable storage mediums, such as Random Access Memory (RAM), solid state disk drives, or magnetic disk drives.

C. Reporting Engine

Figure 6:
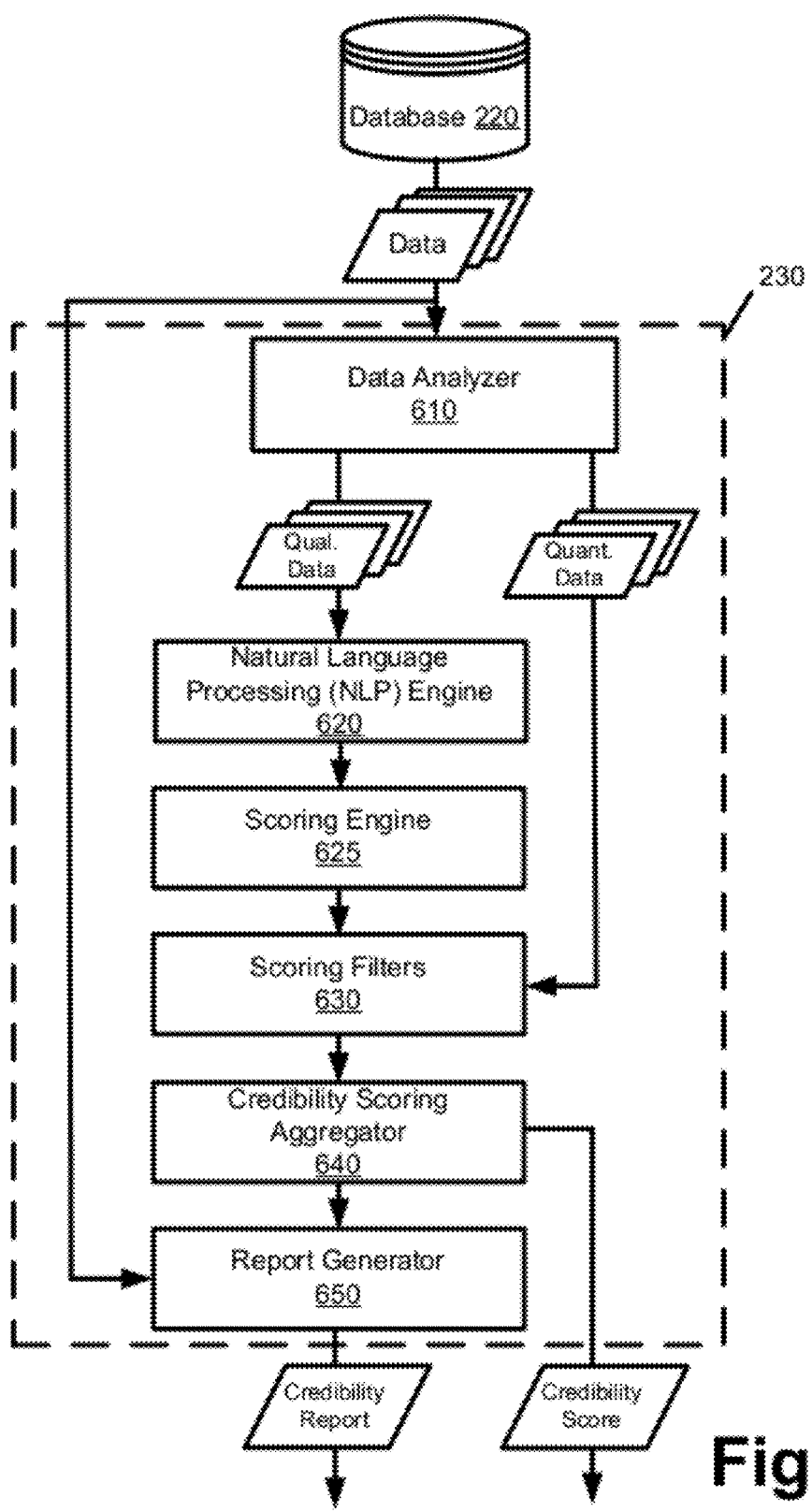
FIG. 6 illustrates some components of the reporting engine for generating credibility scores and credibility reports in accordance with some embodiments.

The reporting engine 230 accesses the database 220 to obtain credibility data from which to derive the credibility scores and credibility reports for various entities. In some embodiments, the reporting engine 230 updates previously generated scores and reports when credibility scores and reports for an entity have been previously generated and credibility data has changed or new credibility data is available in the database 220. FIG. 6 illustrates some components of the reporting engine 230 for generating credibility scores and credibility reports in accordance with some embodiments. The reporting engine 230 includes data analyzer 610, natural language processing (NLP) engine 620, scoring engine 625, scoring filters 630, credibility scoring aggregator 640, and report generator 650. In some embodiments, the reporting engine 230 and its various components 610-650 are implemented as a set of scripts or machine implemented processes that execute sets of computer instructions.

i. Data Analyzer

The data analyzer 610 interfaces with the database 220 in order to obtain aggregated credibility data for one or more entities. As noted above, credibility data for a particular entity is stored to the database 220 using a unique identifier. Accordingly, the data analyzer 610 is provided with one or a list of unique identifiers for which credibility scores and reports are to be generated. The list of unique identifiers may be provided by a system administrator or may be generated on-the-fly based on requests that are submitted through the interface portal. The data analyzer 610 uses the unique identifiers to retrieve the associated data from the database 220.

Once credibility data for a particular entity is retrieved from the database 220, the data analyzer 610 analyzes that credibility data to identify and separate qualitative credibility data from quantitative credibility data. The data analyzer 610 uses pattern matching techniques and character analysis to differentiate the qualitative credibility data from the quantitative credibility data. Qualitative credibility data includes data that is not described in terms of quantities, not numerically measured, or is subjective. Text based reviews and comments obtained from sites such as www.yelp.com and www.citysearch.com are examples of qualitative data. Accordingly, the data analyzer 610 identifies such text based reviews and classifies them as qualitative credibility data. The data analyzer 610 passes identified qualitative data to the NLP engine 620 and the scoring engine 625 for conversion into quantitative measures. Conversely, quantitative credibility data includes data that is described in terms of quantities, is quantifiably measured, or is objective. A credit score, rating, or rankings that are confined to a bounded scale (e.g., 0-5 stars) are examples of quantitative data. Accordingly, the data analyzer 610 identifies these scores, ratings, and rankings as quantitative credibility data. The data analyzer 610 passes identified quantitative data to the scoring filters 630.

ii. NLP Engine

In some embodiments, the NLP engine 620 performs relationship identification on qualitative credibility data. Specifically, the NLP engine 620 identifies relationships between (i) textual quantifiers and (ii) modified objects.

In some embodiments, a textual quantifier includes adjectives or other words, phrases, and symbols from which quantitative measures can be derived. This includes words, phrases, or symbols that connote some degree of positivity or negativity. The following set of words connotes similar meaning albeit with different degrees: "good", "very good", "great", "excellent", and "best ever". Textual quantifiers also include adjectives for which different degree equivalents may or may not exist, such as: "helpful", "knowledgeable", "respectful", "courteous", "expensive", "broken", and "forgetful". The above listings are an exemplary set of textual quantifiers and are not intended to be an exhaustive listing. A full listing of textual quantifiers are stored to a database that is accessed by the NLP engine 620. In this manner, the NLP engine 620 can scale to identify new and different textual quantifiers as needed.

In some embodiments, a modified object includes words, phrases, or symbols that pertain to some aspect of an entity and that are modified by one or more textual quantifiers. In other words, the modified objects provide context to the textual quantifiers. For example, the statement "my overall experience at the Acme Store was good, but the service was bad" contains two textual quantifiers "good" and "bad" and two modified objects "overall experience" and "service". The first modified object "overall experience" is modified by the textual quantifier "good". The second modified object "service" is modified by the textual quantifier "bad". In some embodiments, a full listing of modified objects is stored in a database that is accessed by the NLP engine. Additionally, grammatical rules and other modified object identification rules may be stored to the database and used by the NLP engine to identify the objects that are modified by various textual quantifiers.

Figure 7:
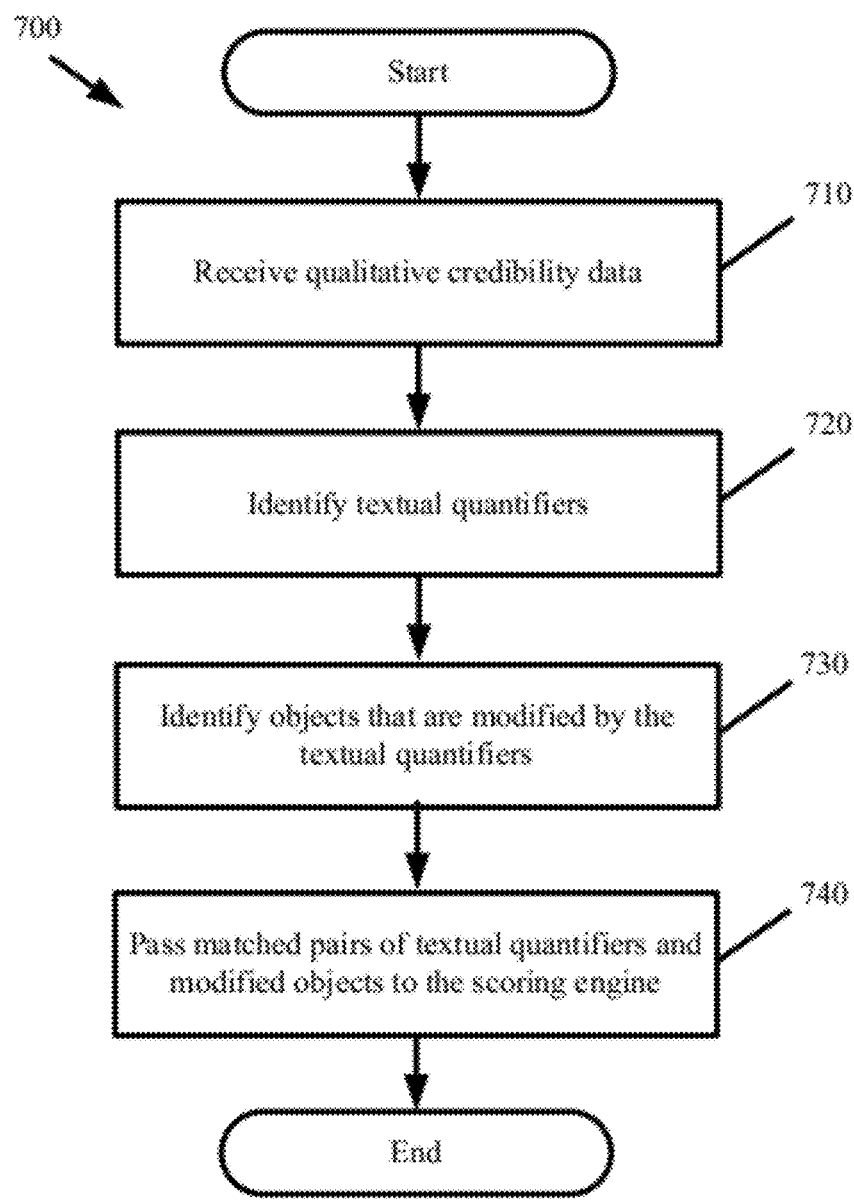
FIG. 7 presents a process performed by the NLP engine for identifying relationships between textual quantifiers and modified objects in accordance with some embodiments.

FIG. 7 presents a process 700 performed by the NLP engine 620 for identifying relationships between textual quantifiers and modified objects in accordance with some embodiments. The process 700 begins when the NLP engine 620 receives (at 710) qualitative credibility data from the data analyzer 610. The process performs an initial pass through the credibility data to identify (at 720) the textual quantifiers therein. During a second pass through, the process attempts to identify (at 730) a modified object for each of the textual quantifiers. Unmatched textual quantifiers or textual quantifiers that match to an object that does not relate to some aspect of an entity are discarded. Matched pairs are passed (at 740) to the scoring engine 625 for conversion into quantitative measures and the process 700 ends. It should be apparent that other natural language processing may be performed over the qualitative credibility data in order to facilitate the derivation of quantitative measures from such data and that other such processing may be utilized by the NLP engine 620.

Figure 8:
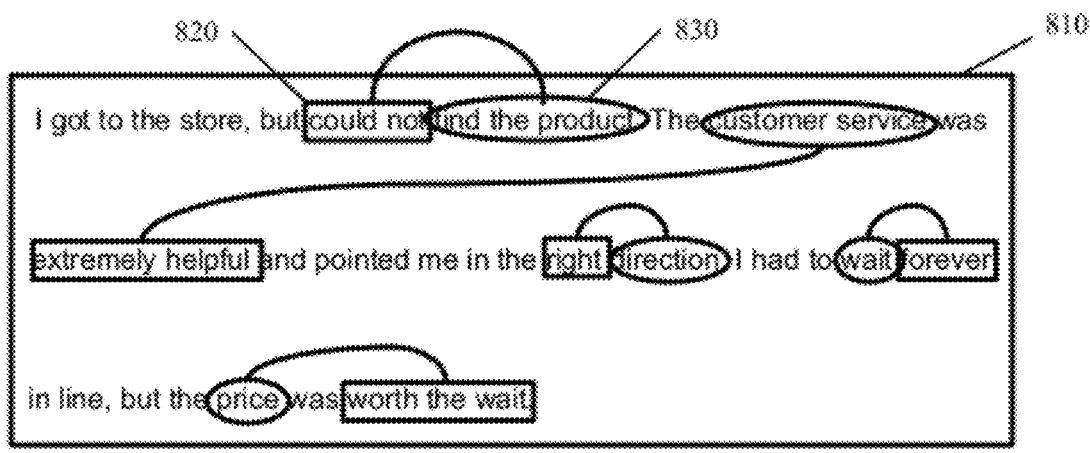
FIG. 8 illustrates identifying textual quantifier and modified object pairs in accordance with some embodiments.

FIG. 8 illustrates identifying textual quantifier and modified object pairs in accordance with some embodiments. The figure illustrates qualitative credibility data 810 in the form of a review. The review textually describes various user experiences with an entity. When passed to the NLP engine 620 for processing, the textual quantifiers and modified objects of the review are identified. In this figure, the textual quantifiers are indicated using the rectangular boxes (e.g., 820) and the modified objects (e.g., 830) are identified with circles.

iii. Scoring Engine

Figure 9:
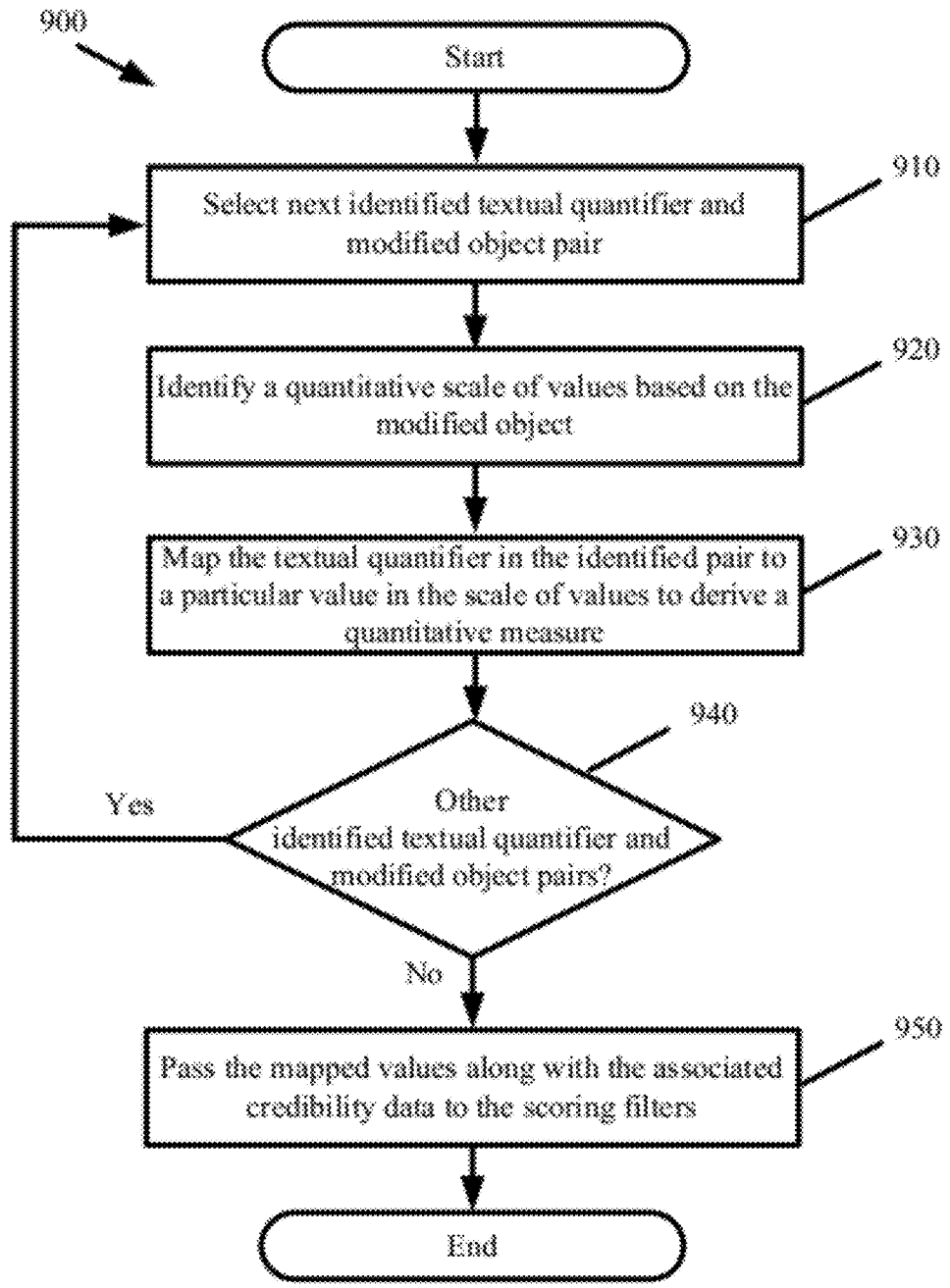
FIG. 9 presents a process for deriving quantitative measures from qualitative credibility data in accordance with some embodiments.

The NLP engine 620 passes the matched pairs of textual quantifiers and modified objects to the scoring engine 625. The scoring engine 625 converts each pair to a quantitative measure. FIG. 9 presents a process 900 for deriving quantitative measures from qualitative credibility data in accordance with some embodiments. The process 900 begins when the scoring engine 625 receives from the NLP engine 620 qualitative credibility data with identified pairs of textual quantifiers and modified objects.

The process selects (at 910) a first identified textual quantifier and modified object pair. Based on the modified object of the selected pair, the process identifies (at 920) a quantitative scale of values. In some embodiments, the scale of values determines a weight that is attributed to the particular modified object. Some modified objects are weighted more heavily than others in order to have greater impact on the credibility score. For example, from the statement "my overall experience at the Acme Store was good, but the service was bad", the modified object "overall experience" is weighted more heavily than the modified object "service", because "service" relates to one aspect of the entity's credibility, whereas "overall experience" relates to the entity credibility as a whole. In some embodiments, the process uses the modified object as an index or hash into a table that identifies the corresponding scale of values associated with that modified object.

Next, the process maps (at 930) the textual quantifier from the identified pair to a particular value in the identified scale of values to derive a quantitative measure. In some embodiments, the mapping is performed in conjunction with a conversion formula that outputs a particular value when the textual quantifier and a scale of values are provided as inputs. In some other embodiments, the textual quantifier maps to a first value that is then adjusted according to the scale of values identified by the modified object. For example, the textual quantifiers "good", "very good", "great", "excellent", and "best ever" map to values of 6, 7, 8, 9, and 10 respectively in an unadjusted scale of 0-10. A modified object that is paired with the textual quantifier "great" may identify a scale of value ranging from 0-100. Accordingly, the value associated with the textual quantifier (i.e., 8) is adjusted per the identified scale to a value of 80.

The process determines (at 940) whether there are other identified textual quantifier and modified object pairs associated with the credibility data. If so, the process reverts to step 910 and selects the next pair. Otherwise, the process passes (at 950) the mapped values along with the associated credibility data to the scoring filters 630 and the process 900 ends.

Figure 10:
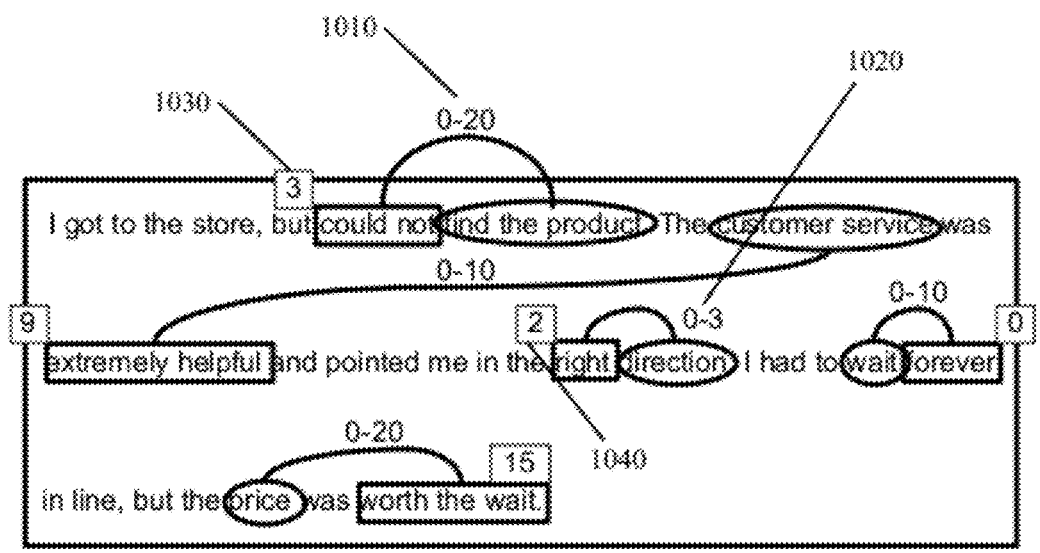
FIG. 10 illustrates mapping identified textual quantifier and modified object pairs to a particular value in a scale of values in accordance with some embodiments.

FIG. 10 illustrates mapping matched textual quantifier and modified object pairs to a particular value in a scale of values in accordance with some embodiments. As shown, for each identified textual quantifier and modified object pair, a scale of values (e.g., 1010 and 1020) is identified to represent the relative weight or importance of that modified object to the overall credibility score. For example, the scale of values 1010 ranges from 0-20 and the range of values 1020 ranges from 0-3. This indicates that the modified object that is associated with the scale of values 1010 is weighted more heavily in the credibility score than the modified object that is associated with the scale of values 1020. The textual quantifier for each identified pair is then mapped to a particular value in the scale of values (e.g., 1030 and 1040). In light of the present description, it should be apparent that the presented scales are for exemplary purposes and that the scoring engine 625 may utilize different scales for different modified objects.

In some embodiments, the reporting engine 230 monitors relationships between quantitative data and qualitative data to promote self-learning and adaptive scoring. Credibility data sources often provide a quantitative score that ranks or rates an entity on some quantitative scale (e.g., 0-5 stars) and an associated set of qualitative data that comments on or explains the quantitative score. Based on the relationship between the quantitative data and the qualitative data, the reporting engine 230 of some embodiments adaptively adjusts how quantitative measures are derived from qualitative data. Specifically, the reporting engine 230 adjusts (i) the scale of values provided to certain modified objects found in qualitative data and (ii) the value that is selected in a scale of values for a particular textual quantifier that is associated with a modified object. For example, when a quantitative score of 5 out of 5 appears 75% of the time with qualitative data that includes the textual quantifier "good" and a quantitative score of 3 out of 5 appears 80% of the time with qualitative data that includes the textual quantifier "fine", then the reporting engine 230 learns from these relationships to increase the quantifiable value for the "good" textual quantifier and decrease the quantifiable value for the "fine" textual quantifier.

In some embodiments, the reporting engine 230 monitors relationships between the various textual quantifiers and modified objects in the qualitative data to promote self-learning and adaptive scoring. Specifically, the reporting engine 230 adjusts the scale of values associated with a particular modified object based on the frequency with which that modified object appears in the qualitative data. Similarly, the reporting engine 230 can adjust the selected value associated with a particular textual quantifier based on the frequency with which that textual quantifier appears in the qualitative data. These frequency measurements can be made on a per entity basis, on a business sub-classification (e.g., fast food restaurant, fine dining restaurant, and family restaurant), or on a field of business basis (e.g., restaurants, clothing stores, and electronic stores). For example, when the phrase "the food was" appears in 75% of user reviews that are associated with a particular entity and the phrase "the waiter was"

appears in 10% of user reviews that are associated with that particular entity, then the reporting engine 230 can provide greater weight to the scale of values that is associated with the modified object "food" than the scale of values that is associated with the modified object "waiter". In this manner, the credibility score derived from the qualitative data can better account for those factors that users frequently comment on while reducing the impact that other rarely mentioned factors have on the credibility score.

In summary, the scale of values for certain modified objects and the selected value from the scale of values for the associated textual quantifier can be adaptively adjusted based on the correspondence between quantitative data that is associated with qualitative data and based on the relative frequency that a particular textual quantifier or modified object is used with reference to a particular entity, sub-classification of a business, or field-of-business.

iv. Scoring Filters

In some embodiments, the scoring filters 630 filter the quantitative measures and the credibility data before producing the credibility score. In some embodiments, the scoring filters 630 include executable processes that incorporate different pattern matching criteria to identify which quantitative measures or which credibility data to filter based on what conditions. Each scoring filter may be specific to one or more types of credibility data. As such, the scoring filters are selectively applied to the credibility data based on the type of credibility data.

Figure 11:
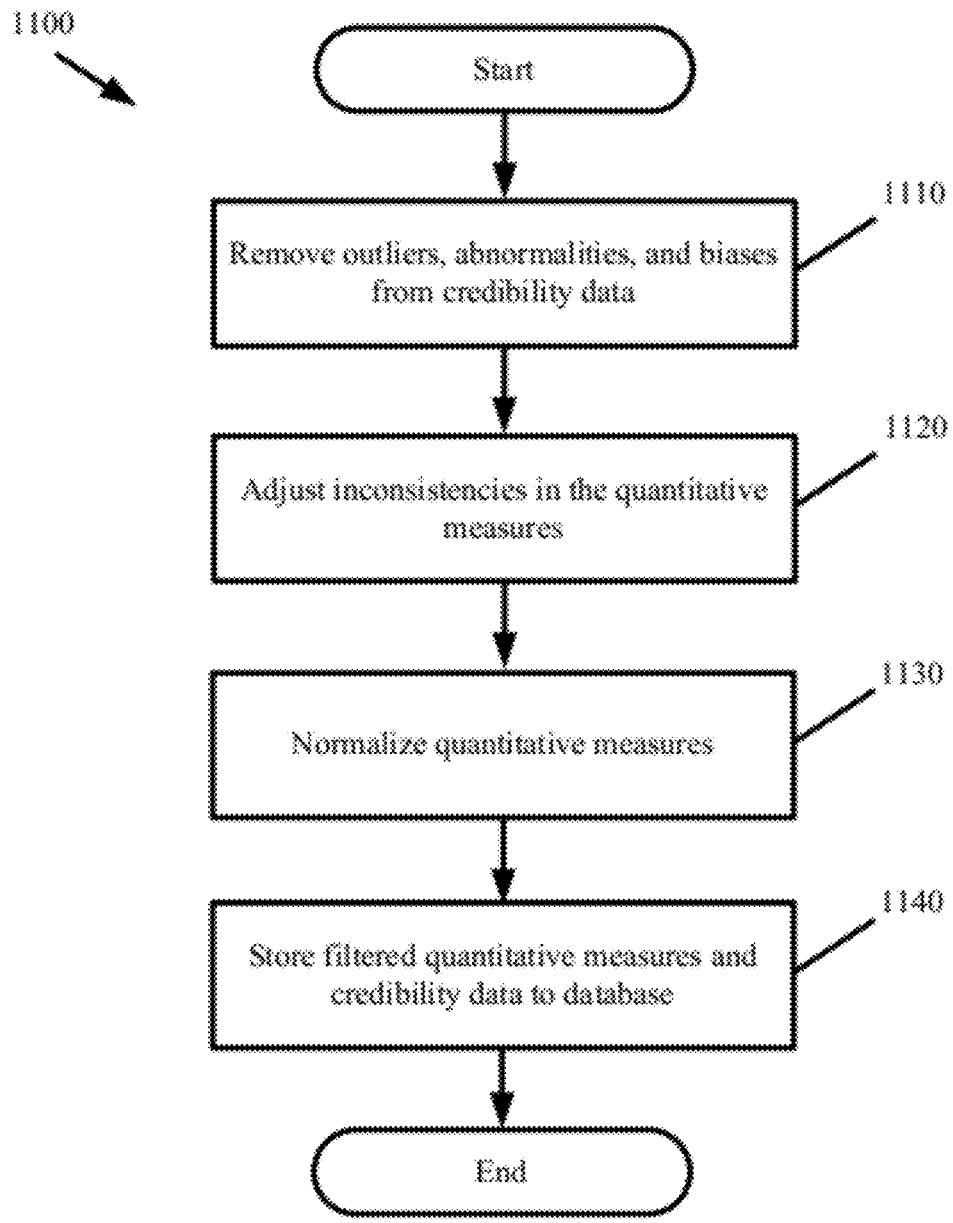
FIG. 11 presents a process performed by the scoring filters to filter the quantitative measures and credibility data in accordance with some embodiments.

FIG. 11 presents a process 1100 performed by the scoring filters 630 to filter the quantitative measures and credibility data in accordance with some embodiments. The process begins by using a set of filters to remove (at 1110) quantitative measures obtained from outlying, abnormal, and biased credibility data. This includes removing quantitative measures that originate from credibility data that is irrelevant to the entity at issue. For example, removing a quantitative measure that originates from credibility data that states various complaints with regards to difficulty in setting up equipment purchased from a store when setting up the equipment is unrelated to the goods and services offered by the store. Other filters may be defined to analyze credibility data in conjunction with information about the party submitting the review. For example, a filter may be defined that analyzes demographic information in association with credibility data. This is useful when a business entity is geared towards specific clientele and the party submitting the review does not fall into that classification of clientele. Accordingly, a scoring filter can be defined to remove such quantitative measures. Other quantitative measures from anonymous reviewers or credibility data that relates to extreme cases or irregular events can also be removed.

Next, the process uses a set of filters to adjust (at 1120) inconsistencies in the quantitative measures for the remaining credibility data. For example, different reviewers may each give a particular entity a three out of five rating, but in the associated comments a first reviewer may provide positive feedback while a second reviewer may provide negative feedback. In such cases, filters can be defined to increase the quantitative measure provided by the first reviewer based on the positive feedback and decrease the quantitative measure provided by the second reviewer based on the negative feedback.

The process uses a set of filters to normalize (at 1130) the quantitative measures for the remaining credibility data. Normalization includes adjusting the scaling of quantitative measures. In some embodiments, the quantitative measures for qualitative credibility data that are derived by the scoring engine 625 will not require normalization. However, quantitative measures originating from quantitative credibility data may require normalization. For instance, quantitative measures of quantitative credibility data obtained from a first data source (e.g., www.yelp.com) may include a rating that is out of five stars and quantitative measures of quantitative credibility data obtained from a second data source (e.g., www.zagat.com) may include a point scale of 0-30 points. In some embodiments, the process normalizes these quantitative measures to a uniform scale of values (e.g., 0-100). In some other embodiments, the process normalizes these quantitative measures with disproportionate weighting such that quantitative measures obtained from credibility data of a more trusted data source are provided more weight than quantitative measures obtained from credibility data of a less trusted data source. Disproportionate weighting is also used to limit the impact stale credibility data has over the credibility score. Specifically, quantitative measures from older credibility data are normalized with less weighting than quantitative measure from newer credibility data. Different scoring filters may be defined to implement these and other weighting criteria.

The process stores (at 1140) the filtered quantitative measures data to the database 220 and the process ends. In some embodiments, the process directly passes the filtered quantitative measures to the credibility scoring aggregator 640 of the reporting engine 230.

v. Credibility Scoring Aggregator

The credibility scoring aggregator 640 produces a credibility score for a particular entity based on normalized quantitative measures for that particular entity. In some embodiments, the credibility score is a numerical value that is bounded in a range that represents a lack of credibility at one end and full credibility at another end, where credibility accounts for successes of various practices, customer satisfaction, performance relative to competitors, growth potential, etc. In some embodiments, the credibility score may be encoded to specify different credibility aspects with different digits. For example, the first three digits of a six digit score specify a credit score and the last three digits of the six digit score specify the credibility score. In some embodiments, the credibility score is a set of scores with each score representing a different component of credibility. For example, the credibility score may comprise a credit score, a review score, and a rating score where the review score is compiled from quantitative measures derived from the aggregated qualitative data and the rating score is compiled from the normalized quantitative measures within the aggregated quantitative data. It should be apparent to one of ordinary skill in the art that the credibility score can be formatted in any number of other ways, such as a set of formatted characters or as a set of formatted alphanumeric characters.

To produce the credibility score, the credibility scoring aggregator 640 aggregates any filtered and normalized quantitative measures for a particular entity from the database 220 or from the scoring filters 630. The credibility scoring aggregator 640 then uses one or more proprietary algorithms to factor together the quantitative measures to produce the credibility score. This may include averaging, summing, or using proprietary formulas to produce the credibility score from the aggregated set of quantitative measures. These algorithms allow for a credibility score to be computed with any number of available quantitative measures. The produced credibility score is then stored back to the database 220 where it is associated with the particular entity.

From the interface portal 240 of FIG. 2, entities can access and view their credibility scores. In some embodiments, the credibility score is updated and presented in real-time. In some embodiments, the credibility score is a tangible asset that users and entities purchase before provided access to the credibility score. Users and entities can purchase a onetime viewing of the credibility score or can purchase a subscription plan that allows them to view credibility scores anytime during a particular subscription cycle (e.g., monthly, yearly, etc.). Users and entities can also purchase and view their credibility reports or purchase credibility scores and reports for other entities that they may be interested in doing business with or to see a competitor's credibility.

vi. Report Generator

The report generator 650 operates in conjunction with the credibility scoring aggregator 640. In some embodiments, the report generator 650 is tasked with (1) producing reports that detail how a credibility score was derived, (2) organizing aggregated credibility data, derived credibility data, and referenced credibility data pertaining to an entity, and (3) organizing ancillary data for informative and descriptive identification of the entity. Such data is aggregated by the master data manager 220. As will be described below, credibility data and other ancillary informative or descriptive data may include maps, news, identification information, financial data, photos, videos, social network content, and network partnerships associated with the entity. All such data serves as supplemental credibility data that creates a holistic and multi-dimensional view of the entity's credibility.

In some embodiments, the credibility report is a data structure that is stored to the database 220 of FIG. 2. Organizing the aggregated data includes grouping related credibility data into different datasets that represent different dimensions of credibility. For example, grouping qualitative data that is used to derive a review score to a first dataset that represents a first dimension of credibility, grouping quantitative credibility data that is used to derive a rating score into a second dataset that represents a second dimension, and grouping social network content to a third dataset that represents a third dimension of credibility. In some embodiments, a single dataset may be used to represent two or more dimensions of credibility. For example, qualitative data grouped to a dataset may be associated with a credibility scoring dimension and a rating dimension.

Instead of storing all data to the data structure of the credibility report, some of the data for the credibility report may be obtained on-the-fly from a data source partner. In such cases, the report generator 650 inserts a reference into the credibility report where the reference is a URL, hyperlink, or other network identifier usable to obtain desired information from the data source partner over a network (i.e., Internet). For example, the reference may include a URL that links to a map identifying the location of a business where the map is hosted by a third party mapping service. In some embodiments, the reference includes access parameters in addition to the reference in order to obtain particular data from a third party or remote data source. The access parameters may include registration or login information, data values, queries, or inputs to be used with the reference when obtaining information from the third party or remote data source. In the mapping example above, the access parameters may include a street address that is passed as part of the URL query string to the third party mapping service. The access parameters may further include scripts (e.g., JavaScript) that are executed when the remote data source is contacted or when the data is retrieved from the third party or remote data source.

In some embodiments, the credibility report is hierarchically structured. In this manner, access to the credibility report data can be restricted based on access rights associated with each hierarchical level. Data grouped to a first hierarchical level may be accessible by all parties and may include summary or high level information. Data grouped to a second hierarchical level or lower hierarchical level may include more restrictive access rights to allow the system operator to monetize the presentation of this data through the interface portal. Access restrictions may be specified by the credibility system operator (i.e., interface portal operator), the entity to which the report relates, or by a set of defined access restriction rules that enumerate what credibility data is assigned to what access restriction level. For example, access restriction rules may be defined whereby the overall credibility score for each entity is assigned a first access restriction level that is accessible by all users and component scores (e.g., a review credibility score and a rating credibility score) are assigned a second access restriction level that is accessible by entities or users that have paid for greater levels of access.

In some embodiments, the report generator 650 provides various interactive tools at different hierarchical levels of the credibility report to allow users the ability to edit, reorganize, or otherwise manage the data that is grouped at that hierarchical level. The tools may include (1) a graphical element for presentation by the interface portal and interaction with at least a graphical pointing tool or keyboard and (2) an Application Programming Interface (API) function call, sub-routine, script, or system call that implements the tool functionality.

Identification information such as the entity name, unique entity identifier, address, etc. is also stored to the credibility report. This information is included so that different query strings and search terms can be used to locate and identify the appropriate credibility report.

Once a credibility report is stored to the database 220, that credibility report can be updated by the report generator 650 as new credibility data becomes available. This may include changing credibility or other data that was previously stored to the credibility report data structure or changing previously stored references or access parameters that are used to obtain data from other data sources. In some embodiments, the report generator 650 may generate the credibility reports before they are accessed by an individual or business or the report generator 650 may generate the credibility reports on-demand as they are requested by individuals or businesses.

The credibility reports include sufficient data which when presented through the interface portal provide complete transparency into how a credibility score is derived. By providing different presentations of the credibility report according to the hierarchical levels, different groupings of data, and different access restrictions, each credibility report can be monetized differently. More specifically, each credibility dimension and each hierarchical level of credibility data within each credibility dimension can be converted into a tangible asset whose data can be separately monetized or freely distributed on a per user, per entity, or per access restriction basis. Users or entities access the credibility reports through the interface portal 240, though some embodiments present the data in the credibility reports using other mediums such as in writing or by telephone consultation.

Figure 12:
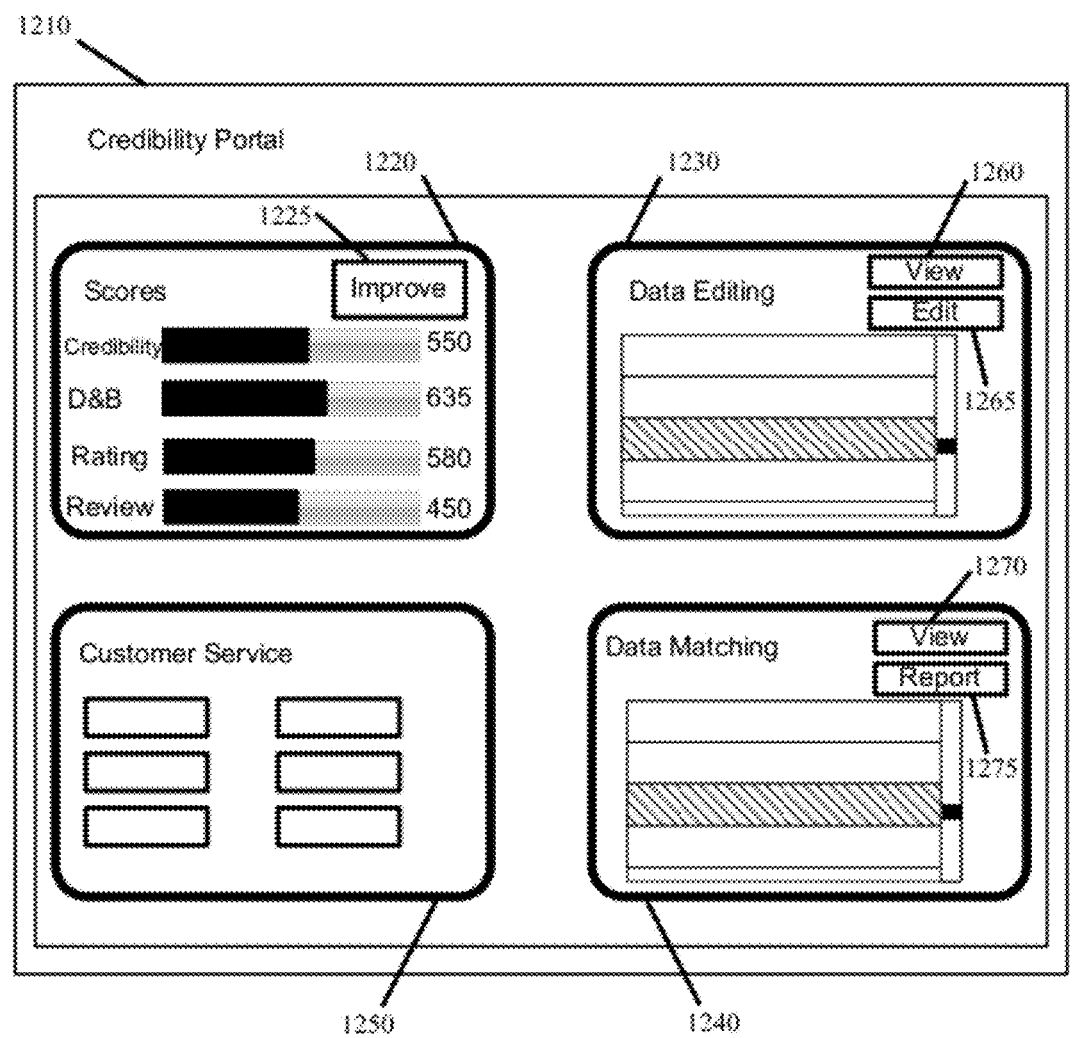
FIG. 12 illustrates a credibility report window within the interface portal in accordance with some embodiments.

FIG. 12 illustrates a credibility report window 1210 within the interface portal 240 in accordance with some embodiments. As shown, the credibility report window 1210 includes multiple viewing panes 1220, 1230, 1240, and 1250 with various information and actions therein.

Pane 1220 is the scores pane that presents the credibility score and/or components of the credibility score such as a credibility ranking score and a credibility review score. In some embodiments, the credibility score identifies the overall credibility of the entity, while the ranking score is derived from normalized quantitative measures of quantitative data and the review score is derived from quantitative measures obtained from processing qualitative data. In some embodiments, the scores are presented using indicator bars and/or numerical values. The indicator bars may be color coded to better differentiate the scores. For example, a red color indicates a poor score, a yellow color indicates a neutral score, and a green color indicates a good score. Also included within pane 1220 is button 1225. When the button 1225 is clicked, the report provides various suggestions as to how the entity can improve upon the score, areas that need improvement, or areas that are currently successful. Such information can be presented in a pop-up dialog box or by changing the contents of the pane 1220.

Pane 1230 is the data editing pane. In this pane, users can either adjust a review that was aggregated from a data source or provide new data that previously was not incorporated into the credibility score. This can include correcting errors in the aggregated data. Included in pane 1230 are buttons 1260 and 1265. Button 1260 allows for a specific entry within the pane 1230 to be expanded for editing. Button 1265 allows a user to submit new credibility data including data that is not available at the various aggregated data sources or new data that has not yet propagated to the data sources.

Pane 1240 is the data matching pane whereby user reviews and other aggregated credibility data can be viewed and mismatched data can be identified and reported. Specifically, the entity can scroll through a list of aggregated quantitative and qualitative data to see what others are saying about the entity. This includes viewing positive and negative feedback, suggestions for improving the entity's credibility, issues experienced by users, what users like about the entity, etc. Additionally, the pane 1240 includes buttons 1270 and 1275 for expanding a specific entry and for reporting an error. The error may include data that pertains to another entity and that was improperly matched to the entity for which the credibility report is generated. The error may also include data that should have been filtered out as biased data or as an anomaly. The pane 1240 may also present identification information about the entity, such as addresses, agents, phone numbers, etc.

Pane 1250 is the customer service pane. In some embodiments, this pane provides summary information about the credibility score and report such as what the entity is doing well and what areas need improvement. This pane can also provide suggested actions for the entity as well contact information for users seeking additional support. In some embodiments, the pane 1250 provides an interactive chat window to a customer support representative.

Figure 13:
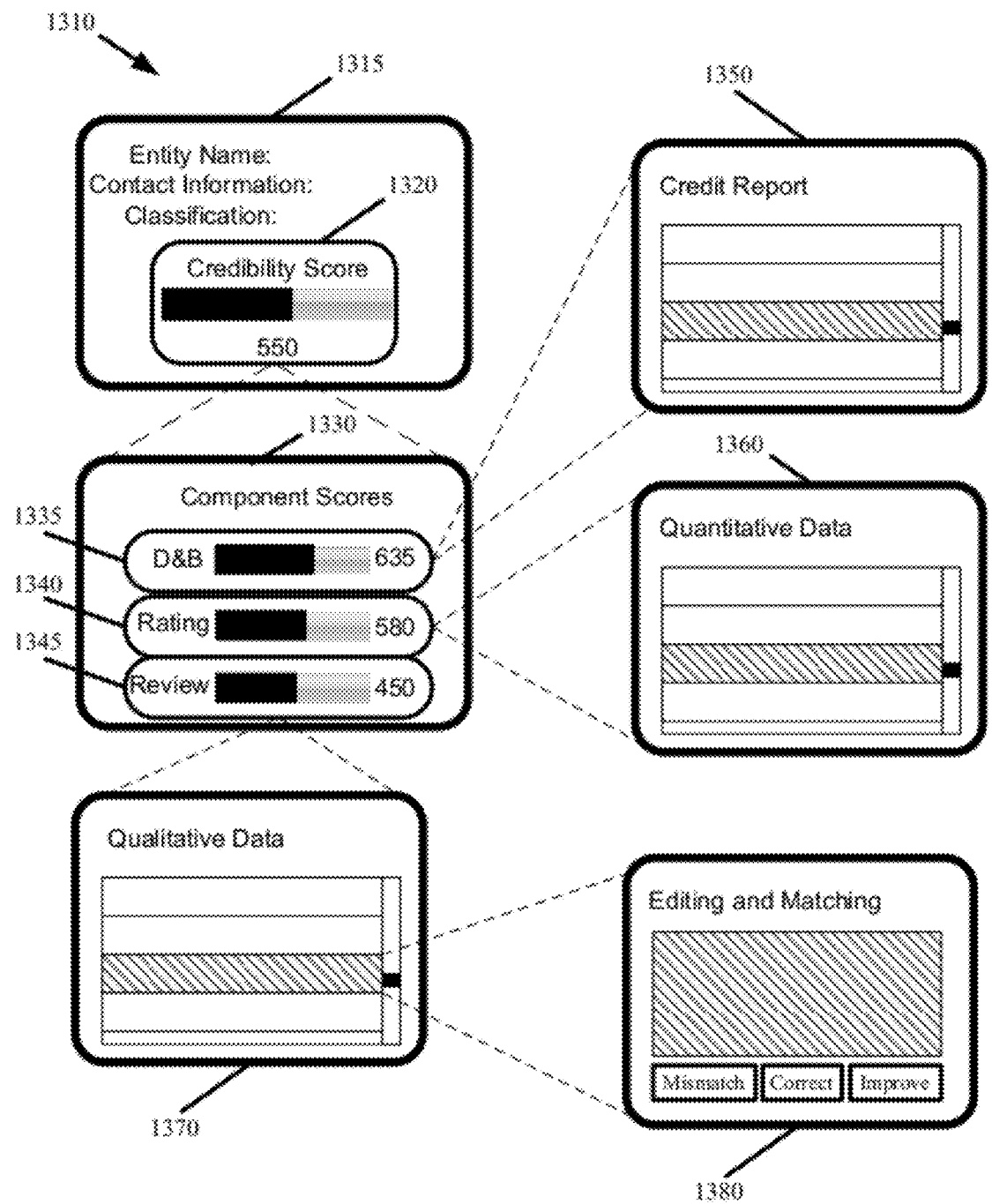
FIG. 13 presents an alternative credibility report viewer in accordance with some embodiments.

FIG. 13 presents an alternative credibility report viewer 1310 in accordance with some embodiments. The credibility report viewer 1310 provides a drill-down view for the credibility report whereby a user can obtain more detailed information about the credibility of an entity at each drill-down layer. The credibility report viewer 1310 is displayed with a first layer 1315 that provides a cumulative credibility score 1320 for the entity. The cumulative credibility score 1320 is a single numerical or alphanumeric value that quantifies the credibility of an entity into a standardized score.

The user can click on the credibility score 1320 to drill-down to a second layer 1330. When the user clicks on the credibility score 1320, some embodiments change the display of the credibility report viewer 1310 from displaying contents of the first drill-down layer 1315 to displaying contents of the second drill-down layer 1330. Navigation functionality allows a user to return back to the first drill-down layer 1315 or any other layer at any time. Instead of changing the display of the credibility report viewer 1310, some embodiments provide a second window or display area to display the second drill down layer 1330.

The second drill-down layer 1330 presents various component scores from which the credibility score 1320 is derived. In some embodiments, the component scores include a first score 1335, a second score 1340, and a third score 1345. In some embodiments, the first score 1335 is a score that quantifies the credit worthiness of the entity. The first score 1335 may therefore be a Dun and Bradstreet credit score or other similar business credit score. In some embodiments, the second score 1340 is a rating score that quantifies the quantitative data that was aggregated from the various data sources into a single score. In some embodiments, the third score 1345 is a review score that quantifies the qualitative data that was aggregated from the various data sources into a single score.

The user can drill-down further to view the data that was used to derive each of the component scores. Specifically, by clicking on the first score 1335, the user drills-down to a third layer 1350 that presents a credit report. Alternatively, the user may be presented with a request window from which the user can purchase a credit report. By clicking on the second score 1340, the user drills-down to a third layer 1360 that presents the various aggregated quantitative data used in deriving the rating score component of the credibility score 1320. Similarly, by clicking on the third score 1345, the user drills-down to a third layer 1370 that presents the various aggregated qualitative data used in deriving the review score component of the credibility score 1320.

The user can click on any credit data, quantitative credibility data, or qualitative credibility data that is presented within the various third drill-down layers 1350-1370 in order to access another drill-down layer, such as layer 1380, that allows for users to correct errors and mismatched data, provide new data, or receive suggestions on how to improve upon the various credibility score components. Suggestions may be provided through another drill-down layer that provides an interactive chat window that connects to a credibility specialist or by providing guides on improving the various credibility score components. It should be apparent to one of ordinary skill in the art that any number of drill-down layers may be provided and that each layer may include additional or other information than those presented in FIG. 13.

III. Indexer

Figure 14:
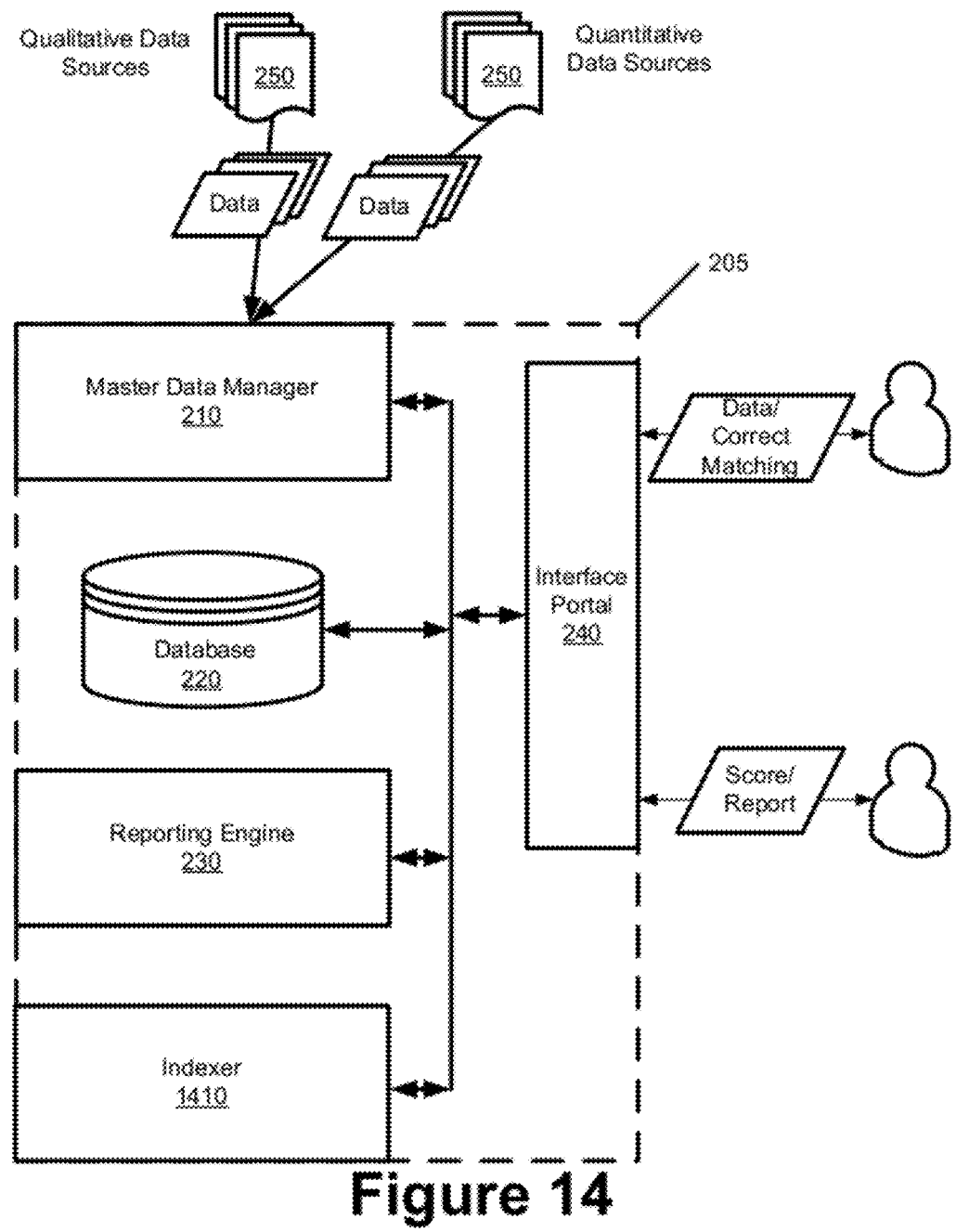
FIG. 14 illustrates the credibility scoring and reporting system enhanced with an indexer.

The credibility scoring and reporting system is a configurable construct that can be enhanced with one or more components that compliment the above described scoring and reporting functionality. FIG. 14 illustrates the credibility scoring and reporting system enhanced with one such component, indexer 1410. The indexer 1410 is integrated into the credibility scoring and reporting system as one or more software modules that execute on the same or different hardware as the master data manager 210, database 220, reporting engine 230, and interface portal 240. The indexer 1410, in conjunction with or independent of the components 210, 220, 230, and 240, acts to transform general purpose computer or electronic hardware to a specific purpose machine that utilizes the aggregated credibility data and derived credibility scores to produce various tangible assets that provide further insight into the credibility of an entity. Some such assets include comparative indices, automated credibility forecasts based on index trends, automated identification of successful and unsuccessful practices, predictive credibility contribution from various practices, automated partner lead generation, predictive credibility contribution from various partnerships, preliminary credibility scores, event adjusted credibility scores, and passive credibility monitoring tools.

A. Indices for Comparative Analysis i. Credibility Score Indices

In some embodiments, the tangible assets produced by the indexer 1410 include credibility score indices. An index of the produced set of indices presents an aggregate set of credibility scores of various entities that are selected according to one or more credibility dimensions specified for that index. Each index serves to comparatively convey the credibility score of one entity in relation to the credibility scores of other entities that are identified based on the one or more dimensions of credibility specified for that index. Each index therefore presents the credibility score for a particular entity in a comparative light that would otherwise be unavailable when viewing the credibility score for a particular entity in isolation. In other words, one can determine from an index, how the credibility of a particular entity compares to its competitors and other entities that are related based on the dimensions of credibility specified for that index. These comparisons can be drawn because the credibility scores presented in each index are uniformly derived using the same algorithms that eliminate individual biases. Also, these comparisons can be drawn because the credibility scores presented in each index are derived using credibility data that is aggregated from multiple data sources thereby eliminating the potential for credibility scores that do not holistically account for the full credibility of the various entities represented in the indices.

By adjusting the credibility dimensions for a presented index, one can determine how the credibility of a particular entity compares to different sets of competitors and other entities. This comparative information is valuable market research and has revenue generation implications, because the information can be used to identify (1) market position of the particular entity, (2) market position of competitors or related entities, (3) relative success of the particular entity's practices, and (4) growth of the particular entity.

Throughout this disclosure, an index will be described as an aggregate set of credibility scores. However, this definition is intended for exemplary and simplification purposes and is not intended to be limiting. It should therefore be apparent to one of ordinary skill in the art that an index can be formed based on an aggregate set of any credibility data that is included within the credibility reports of some embodiments. For example, the indexer 1410 may generate indices based on aggregated quantitative credibility data (e.g., aggregated rankings) instead of the aforementioned credibility scores.

In some embodiments, the indices are commoditized and monetized separately from the credibility scores and credibility reports. In other words, each index or a set of indices related to an entity can be bundled and provided or sold separately from the credibility score and report generated for that entity. In some other embodiments, one or more indices that are related to a particular entity are integrated into the credibility report for that particular entity and provided or sold as one asset.

Figure 15:
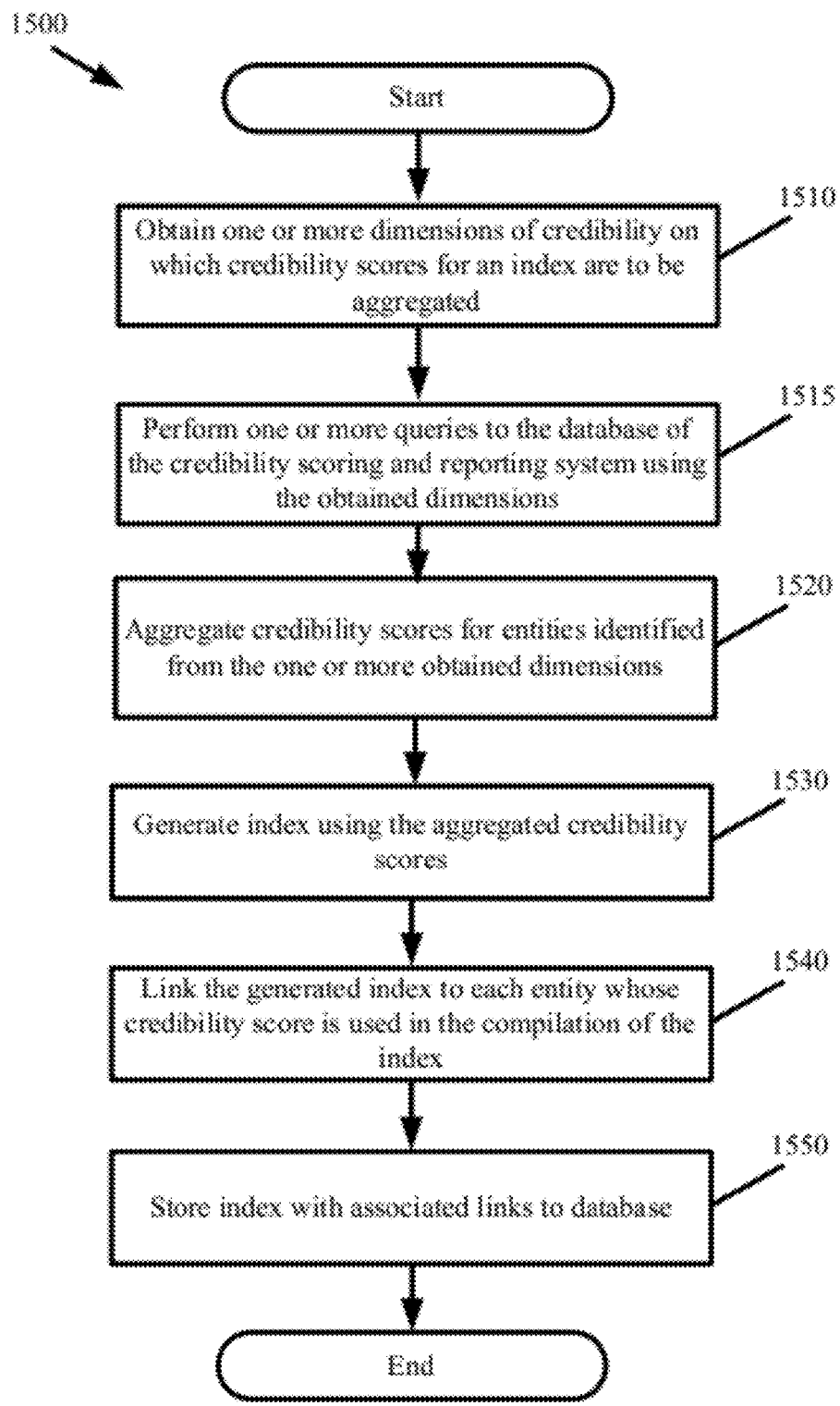
FIG. 15 presents a process performed by the indexer to generate an index in accordance with some embodiments.

FIG. 15 presents a process 1500 performed by the indexer 1410 to generate an index in accordance with some embodiments. The process 1500 begins by obtaining (at 1510) one or more dimensions of credibility on which credibility scores for an index are to be aggregated. Some such dimensions include geographic location, classifications and sub-classifications for the type of business, time, demographic information, and information relating to provided goods or services. For example, an index may be generated to include credibility scores for entities that are located in the 90000 zip code, that operate as restaurants, that operate as restaurants primarily serving French cuisine, and that cater to high-end clientele (i.e., high-priced goods and services). These dimensions do not provide a complete listing of dimensions across which indices can be derived. Other dimensions of credibility or other combinations of dimensions can be used to compile different sets of credibility scores associated with different sets of entities for an index. In some embodiments, the indexer obtains these dimensions from a system administrator, from a user accessing the interface portal, or based on a set of predefined dimensions that are used to generate a default set of indices for each entity for which credibility data has been aggregated. The default set of indices can be appended to with new indices at any time by users, entities, or system administrators specifying different dimensions or different combinations of dimensions for the new set of indices.

Based on the obtained dimensions, the process performs (at 1515) one or more queries to the database of the credibility scoring and reporting system (i.e., database 220). The queries retrieve credibility scores for entities that satisfy the obtained dimensions. As shown in FIG. 5 above, the database stores the credibility scores and reports associated with the entities in data structures that also store credibility data and identification information relevant to searching and identifying entities based on various credibility dimensions. The process aggregates (at 1520) the credibility scores for those identified entities.

The process generates (at 1530) an index using the aggregated credibility scores. In some embodiments, generating an index involves computing statistical information related to the aggregated credibility scores. Such statistical information includes computing a mean, median, standard deviation, percentages, z-score, and distribution for the aggregated credibility scores. Generating an index also involves, compiling the aggregated credibility scores and the computed statistical information into a representation. The representation may include a graphical representation such as a chart, graph, or other visual means. The graphical representation may demarcate a particular business of interest in the index with a graphical indicator so that the credibility score of that particular entity can be easily and readily identified in the index and so that the index can be used to easily and readily comparatively analyze the credibility score of that particular entity to the credibility scores other entities identified in the index. This is referred to as "keying" an index to a particular entity. Additionally, the graphical representation can be made interactive so that a user or entity can move a pointing tool along the graphical representation to identify different entities at different positions along the graphical representation of the index.

The process links (at 1540) the generated index to each entity whose credibility score or other credibility data is used in the compilation of the index Linking may include associating the index to the data structures in the database for the corresponding entity. The index is then stored (at 1550) to the database of the credibility scoring and reporting system and the process ends. In some embodiments, storing replicates the index in the data structure of each corresponding entity. In some other embodiments, a single instance of the index is stored to the database and the data structure of each entity associated with that index is updated with a link to the stored index. Accordingly, each generated index may have a one-to-many relationship wherein an index is linked to several entities. Each generated index may also have a many-to-one relationship wherein several indices can be linked to a particular entity.

Once stored to the database, the index is available for subsequent presentation. A user or entity can submit a query to retrieve and present the index using the interface portal. The search can be conducted by specifying credibility dimensions for a desired index. The search can also be conducted by specifying the name of an entity or other identifier in order to retrieve indices related to that entity. Also, a search can include some combination of dimensions and entity identification information to target a particular index or set of indices. For example, a user can specify a query using the interface portal to view an index related to entities in the state of Nevada that are engaged in the sale of furniture. Alternatively, the user can specify a query to view one or more indices associated with an entity having a name of "Acme Furniture" in the state of Nevada.

Figure 16:
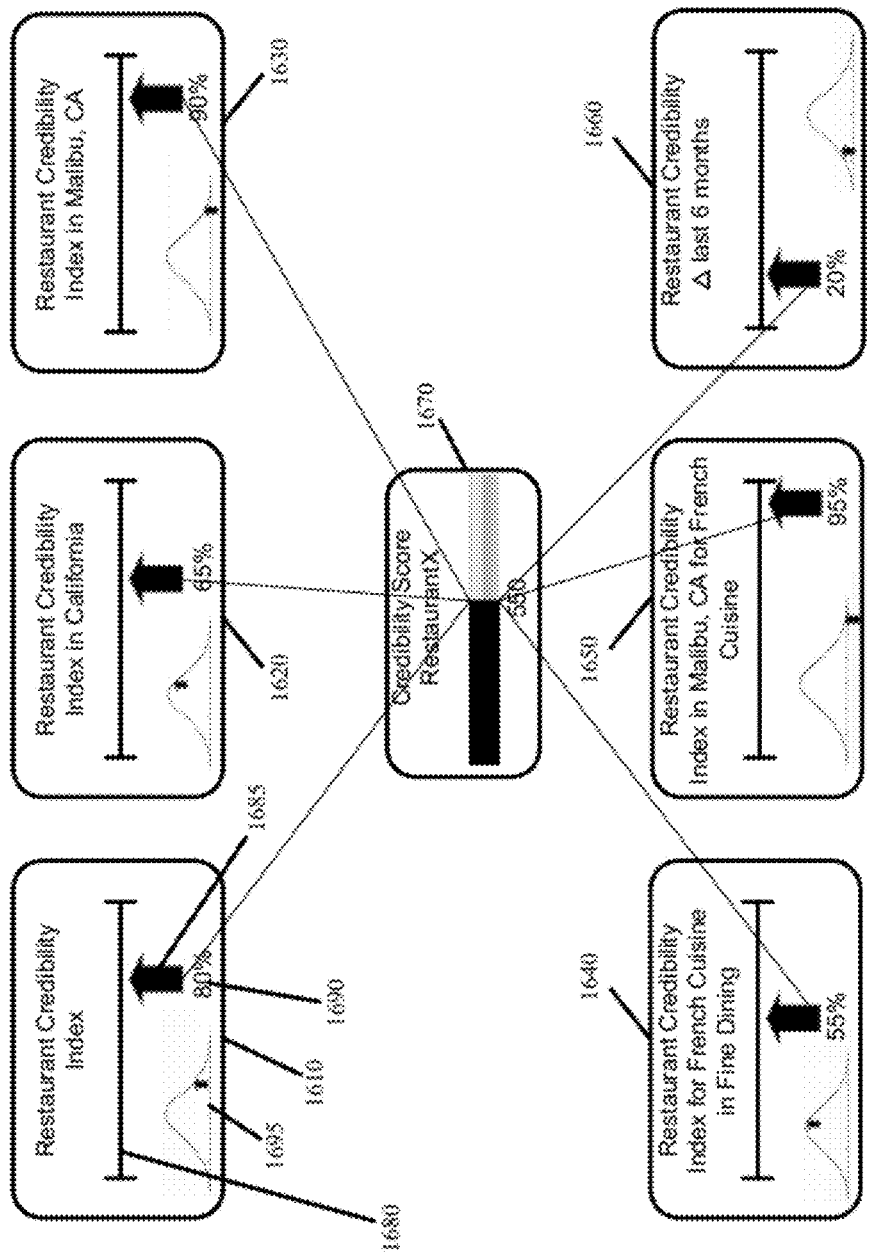
FIG. 16 presents a set of indices that are linked to a particular business in accordance with some embodiments.

FIG. 16 presents a set of indices (1610, 1620, 1630, 1640, 1650, and 1660) that are linked to a particular entity in accordance with some embodiments. The credibility score of the particular entity is shown at 1670 and is demarcated in each of the indices using a graphical indicator (e.g., 1685). Each index in the set of indices 1610-1660 conveys the credibility score of the particular entity according to different dimensions. As shown, the different dimensions include geographic location, classification and sub-classification of the particular entity, and time. The different dimensions comparatively identify the credibility score of the particular entity in relation to the credibility scores of different entities that satisfy the different dimensions that are associated with each index in the set of indices 1610-1660.

In FIG. 16, the credibility score for the particular entity is illustrated as a numeric value of 550 at 1670 and the particular entity is a restaurant. Index 1610 comparatively illustrates how the credibility score of 550 relates to the credibility scores other restaurants where the dimension of credibility associated with index 1610 is a single dimension that focuses the index to identify and include all entities that operate as restaurants. In index 1610, a graphical representation in the form of linear range 1680 with a demarcation indicator 1685, percentage value 1690, and distribution graph 1695 convey how the credibility score of 550 for the particular entity compares with the credibility scores of all other restaurants that are associated with the index 1610. The demarcation indicator 1685 identifies the credibility for the particular entity. As shown, the credibility score of 550 places the particular entity in the $80^{th}$ percentile of all restaurants. This information may be important to the particular entity in order to understand how successful this particular entity is relative to other restaurants. Moreover, the particular entity can appreciate the overall state of the restaurant business and understand how satisfied clients are with the services of the particular entity relative to other restaurants.

Figure 17:
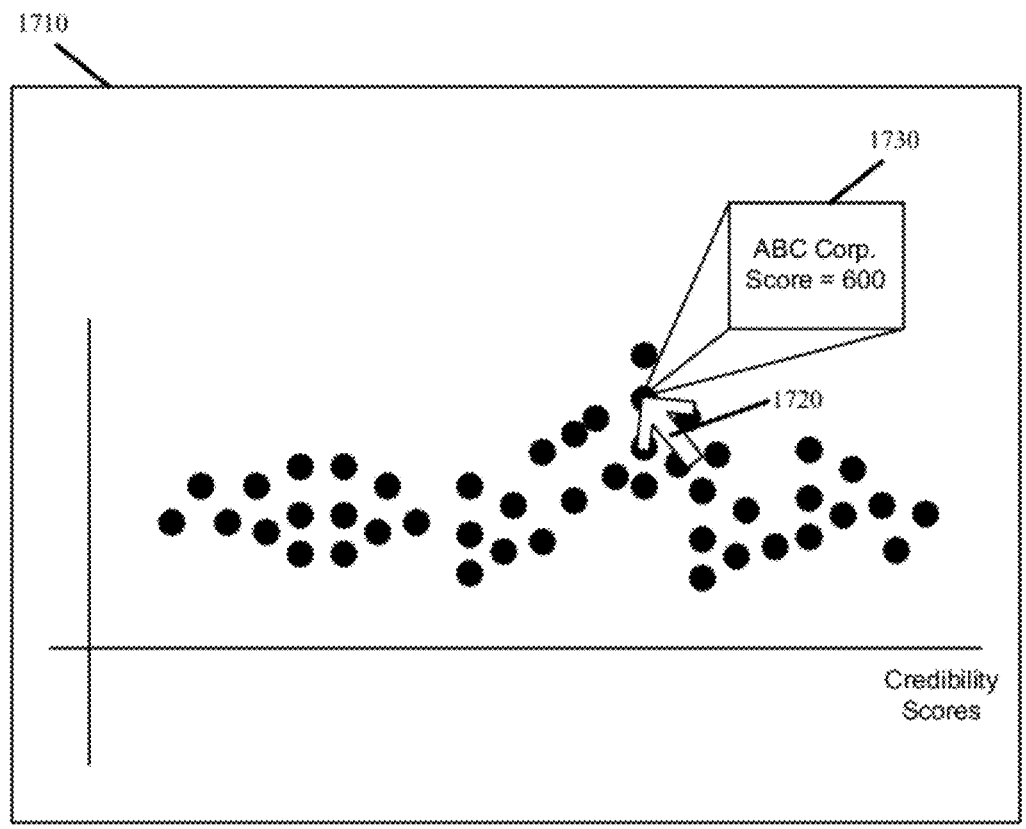
FIG. 17 illustrates a zoomed-in view of an index that presents a plotted distribution of all businesses that satisfy the dimension of the index.

In some embodiments, the index 1610 is interactive such that users can place a pointing tool (i.e., mouse cursor) over various parts of the linear range 1680 in order to obtain callouts that identify who are the other restaurants with credibility scores that exceed or that are lower than the 550 credibility score of the particular entity. For example, FIG. 17 illustrates a zoomed-in view of an index 1710 that presents a plotted distribution of all entities that satisfy the dimension of the index 1710. When the user places the pointing tool 1720 over a plotted point, a callout box 1730 is presented to identify the entity that is associated with that plotted point and other information pertaining to the credibility of that entity, such as its credibility score. Other interactions, such as clicking on a plotted point, can be used to drill down into the credibility score or credibility report that is associated with that plotted point. In this manner, users or entities can quickly and interactively drill down from the index 1710 to access more detailed information for understanding the derivation of a particular credibility score presented in the index 1710. This allows for lower level comparative analysis whereby users and entities can go beyond comparative analysis of the credibility scores presented in the index 1710 to perform comparative analysis of credibility data used in the derivation of the credibility scores. In so doing, users and entities can specifically identify what are the significant contributing factors to the credibility scores of more or less successful entities. Users and entities can then adjust their own strategies and practices to integrate the positive contributing factors and remove the negative contributing factors in order to improve their credibility score and, as a result, improve their revenue.

With reference back to FIG. 16, index 1620 illustrates the credibility of the particular entity relative to different dimensions of credibility than that of index 1610. Specifically, index 1620 comparatively illustrates how the credibility score of 550 for the particular entity relates to the credibility scores of other entities operating as restaurants in a defined geographic region, the state of California. Accordingly, the set of entities used to compile index 1620 will be smaller than the set of entities used to compile index 1610, because only restaurants that are in California are used to compile index 1620 whereas index 1610 is compiled using all restaurants irrespective of geographic region. By comparing index 1610 with index 1620, it can be seen that the restaurant business is more competitive or subject to higher credibility in California as the particular entity ranks at the $65^{th}$ percentile when the credibility score of 550 is compared to the credibility scores of other restaurants in California; the same credibility score of 550 ranks at the $80^{th}$ percentile when compared to all restaurants.

Other indices presented in FIG. 16 provide other comparative views for the credibility score of the particular entity according to different dimensions. For example, index 1630 shows that the credibility score of the particular entity ranks in the top 10% when the geographic region is further restricted to the city of Malibu, Calif. From indices 1610-1630, the particular entity may determine that it has historically performed better than a majority of its competitors. Each credibility dimension of the different indices may reveal additional information that is unknown to the particular entity. For example, index 1660 comparatively illustrates how the credibility score of the particular entity has deviated (i.e., risen or declined) in the last six months relative to its competition. As shown in index 1660, the particular entity ranks in the $20^{th}$ percentile. This indicates that in the past six months, the credibility of the entity has performed poorly. This can be an early indicator of the public's perception as to the performance or quality of the particular entity and of a potential decline in future revenue. Accordingly, the particular entity can utilize the index 1660 to identify and address these issues before they increase to impact the "bottom-line" (e.g., revenue or profitability) of the particular entity.

Figure 18:
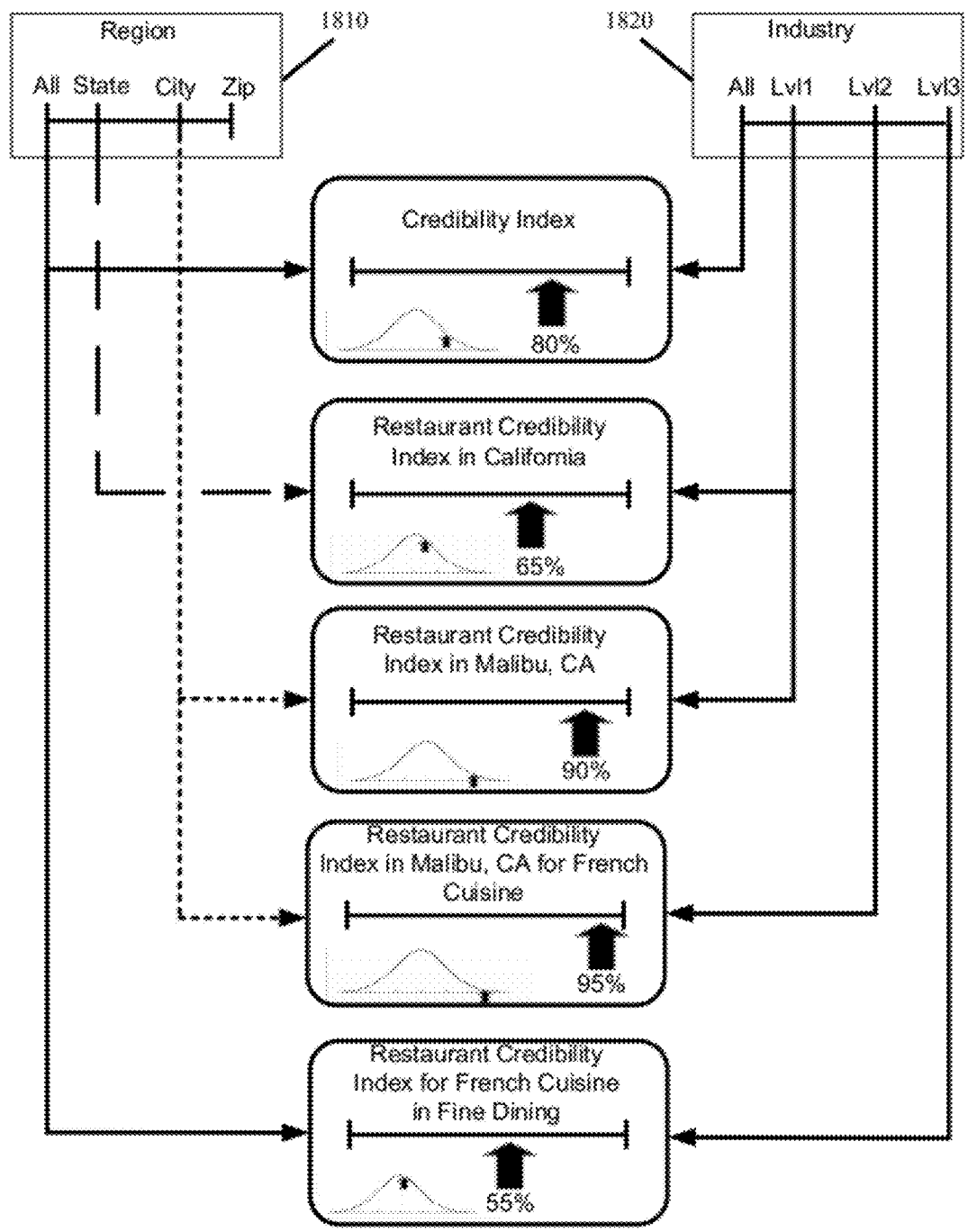
FIG. 18 illustrates two interactive sliders associated with an index that is "keyed" to a particular business.

In some embodiments, the indexer provides other interactive tools that are associated with the indices besides those described with reference to FIG. 17. These tools allow users the ability to interact with the presented data in order to obtain more detailed information and on-the-fly adjust one or more dimensions of credibility associated with a displayed index. These tools are presented as interactive user interface elements in a web browser or other application with network access. In some embodiments, the interface portal performs the formatting for displaying an index in a web browser application with any corresponding interactive tools. FIG. 18 illustrates two interactive sliders 1810 and 1820 associated with an index that is "keyed" to a particular entity. When an index is keyed to a particular entity, the interactive tools 1810 and 1820 are used to change the dimensions of the index relative to the particular entity.

The first slider 1810 is an interactive tool for changing the geographic dimension of the index. Since the index is keyed to the particular entity, adjustments made to the slider 1810 alter the geographic dimension of the index according to geographic data associated with the particular entity. For example, the geographic data associated with a first entity includes the state of Florida, the city of Miami, and the zip code 33133 and the geographic data associated with a second entity includes the state of California, the city of Malibu, and the zip code 90265. When the slider 1810 is keyed to the first entity, adjustments to the position of the slider 1810 can be used to on-the-fly alter the geographic region associated with the index from all entities, to entities in the state of Florida, to entities in the city of Miami, and to entities in the zip code 33133. Similarly, when the slider 1810 is keyed to the second entity, adjustments to the position of the slider 1810 can be used to on-the-fly alter the geographic region associated with the index from all entities, to entities in the state of California, to entities in the city of Malibu, and to entities in the zip code 90265. In some embodiments, a user can on-the-fly change which entity an index is keyed to by selecting a different entity in the index. The selection can be made using a click action on the plotted point in the index that represents that different entity.

The interactive tools (e.g., sliders 1810 and 1820) that are presented in conjunction with the same index will be keyed to the same particular entity. Accordingly, the slider 1820 will be keyed to the same particular entity as the slider 1810. However, the slider 1820 can be used to on-the-fly adjust a different dimension of the index than slider 1810. In this figure, slider 1820 adjusts the granularity of the industry that is presented by the index. Since the slider 1820 is keyed to the particular entity, the slider 1820 adjusts the granularity according to different industry classifications that are associated with the particular entity. In this figure, the different industry classifications that are associated with the particular entity include a restaurant classification at a first classification level, a French restaurant classification at a second classification level, and a fine dining French restaurant classification at a third classification level. Accordingly when the slider 1820 is at a first setting, the index of FIG. 18 changes to display credibility scores for the particular entity in relation to all other entities; when the slider 1820 is at a second setting, the index of FIG. 18 changes to display credibility scores for the particular entity in relation to all other restaurants; when the slider 1820 is at a third setting, the index of FIG. 18 changes to display credibility scores for the particular entity in relation to all other French restaurants; and when the slider 1820 is at a fourth setting, the index of FIG. 18 changes to display credibility scores for the particular entity in relation to all other fine dining French restaurants. It should be noted that the slider 1820 can be used in conjunction with the slider 1810 or any other slider to produce different permutations for the index where each permutation is associated with a different combination of credibility dimensions.

In summary, different indices allow the particular entity to target particular dimensions of credibility that are of interest to the particular entity and to see how the entity compares to other entities that satisfy the same dimensions of credibility. This allows the particular entity to form a comprehensive view of its credibility in a comparative and relative manner as opposed to an isolated and independent manner that would otherwise be obtained when viewing the credibility score of the particular entity without any frame of reference as to the credibility scores of other entities or competitors that meet similar credibility dimensions. Moreover, the interactive tools allow for on-the-fly adjustments to be made to the indices to change the dimensions, to change the entity to which the index is keyed, and to provide drill-down functionality in order to expand the credibility scores in the index into their respective credibility data components.

While FIG. 16 illustrates geographic, classification, and temporal dimensions of credibility, these dimensions are not intended to be restrictive or comprehensive. Rather, the indexer of some embodiments can generate indices on various other dimensions or different combinations of dimensions based on searchable fields related to data of the data structures, credibility reports, or other data associated with the credibility scores of the entities that are stored to the database of the credibility scoring and reporting system.

In some embodiments, the indices are tangible assets that are freely accessible or are available on a pay-per-access or subscription model. In this manner, the credibility scoring and reporting system can commoditize and monetize the indices. In some embodiments, the freely accessible indices include a predefined first set of indices that, for example, comparatively present credibility of an entity at a fixed set of one or more dimensions. Should the user desire to adjust the dimensions to access different indices or to specify queries for indices based on custom dimensions, the user could pay a fee or signup for a subscription plan in order to obtain access. In some embodiments, users may be provided free or unrestricted access to an index pertaining to a first dimension of credibility and access to a second or some combination of second dimensions is restricted to paying users. In still some other embodiments, access to all indices may be restricted to pay-per-access.

Each index derives its value from the ability to provide comparative insight as to an entity's competition and to guide future strategy of the entity by enabling the entity to more directly compete with its competition through identification of the competition and through identification of the credibility data associated with the competition. From this targeted credibility data, the entity can ascertain what the public positively and negatively perceives about each competing entity so that the entity can streamline its future strategies accordingly. As such, the indices are valuable assets that, when used, can improve the revenue generation capabilities of an entity.

ii. Credit Based Indices

The above processes, dimensions, and interactive tools used in the generation and presentation of the credibility scoring indices may be adapted to generate indices that are based on credit data or creditworthiness of an entity. Such credit data is part of the data that is aggregated and stored to the credibility scoring and reporting database by the master data manager. More specifically, the credit data is aggregated based on established partnerships with credit data sources, such as Dun & Bradstreet, TransUnion, and Equifax as some examples. In some embodiments, the master data manager is provided access to the compiled credit data from each such credit data source.

The indexer leverages the aggregated credit data to generate configurable dimensional credit indices. These credit indices comparatively present the creditworthiness of a particular entity in relation to other entities that are identified by the one or more dimensions that are defined for each credit index. In so doing, the traditional isolated view of a credit score is replaced with a more meaningful comparative view that allows entities to better appreciate their creditworthiness. In turn, these credit indices promote better lending practices by banks and better business evaluation by analysts because of the comparative light in which the credit scores are presented.

For example, the credit score for a particular business when compared against other businesses nationally may be an average credit score, but when that same credit score is compared to other businesses that operate in the same geographic region as the particular business, it may be that the credit score is very good for that region. A regional bank using the credit indices that are generated for the particular business can then safely extend more credit to the particular business than it may otherwise have been willing to do if the regional bank was only privy to the credit score of the particular business without being able to compare the credit score to the credit scores of other businesses in the same geographic region.

In some embodiments, the indexer generates the credit indices in the same customizable manner with which the credibility indices described above are generated. Specifically, the indexer generates the credit indices by aggregating credit scores for different entities that satisfy one or more defined dimensions for the indices. In some embodiments, the data from the different credit indices that are keyed to a particular entity and that are generated according to different dimensions is condensed to produce different credit ratings for that particular entity where the credit ratings are different than the credit scores derived by various credit reporting bureaus. For example, a first credit rating may be generated for a particular entity to quantify the credit for that particular entity relative to other entities operating in a particular geographic region and a second credit rating may be generated to quantify the credit for that particular entity relative to other entities that operate in the same field of business. In this manner, the indexer provides a holistic view for the creditworthiness of the particular entity. In some embodiments, the indexer groups the credit ratings and the credit score(s) for a particular entity and hierarchically structures the grouped credit ratings and the credit score(s) for hierarchical presentation of the creditworthiness for that particular entity.

As noted above, the indexer generates a credit index in a similar manner to generating a credibility score index. To generate a credit index, the indexer first obtains one or more dimensions that define the scope of the credit index. Some different dimensions for a credit index include those dimensions and other dimensions described above with reference to credibility score indices. Some such dimensions include geographic region (e.g., state, city, zipcode, etc.), industry (based on standard industrial classification (SIC) codes), sub-industry, temporal delimiters (i.e., years in business), size of the company, etc. These dimensions may be specified by a user using the interface portal, by a system administrator, or by a set of predefined rules for creating the credit index.

The indexer queries the database to retrieve credit scores for entities that satisfy the obtained dimensions and the retrieved credit scores are organized according to a preferred distribution in order to generate the credit index. In some embodiments, the retrieved credit scores include one or more of a Paydex score, a financial stress score, a commercial credit score, and a supplier evaluation risk score.

Figure 19:
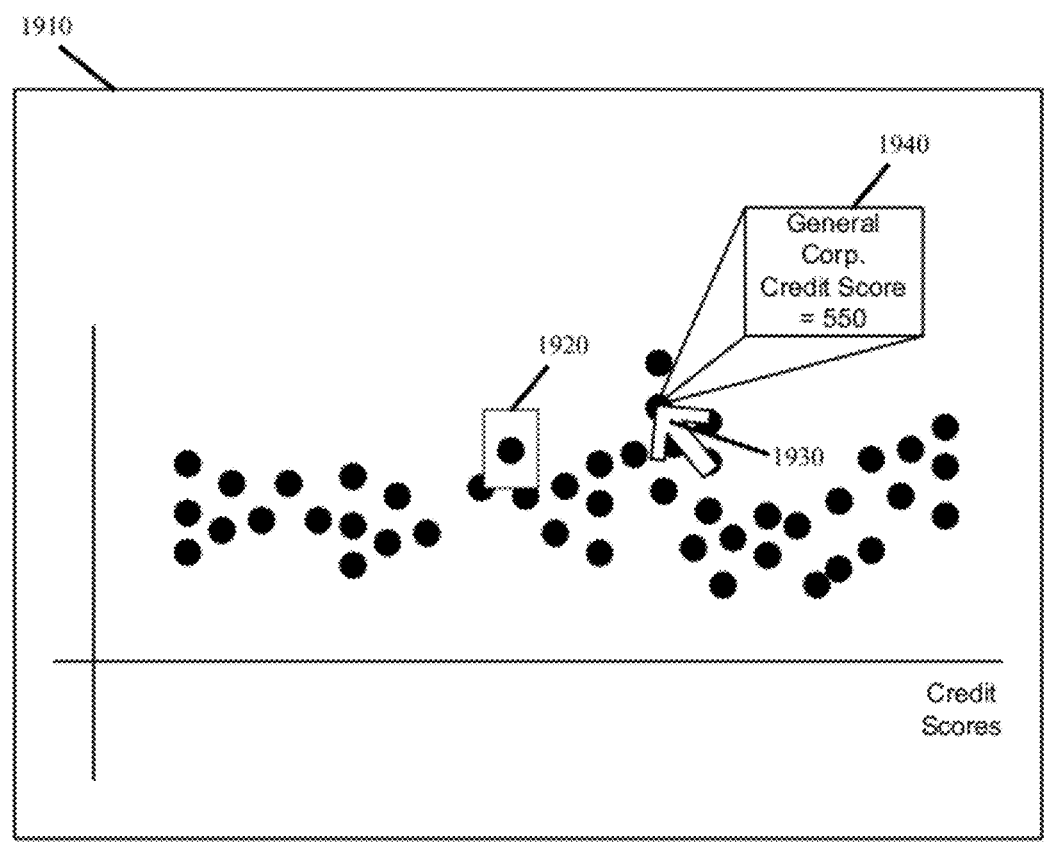
FIG. 19 illustrates a plotted distribution of credit scores that is illustrative of a credit index in accordance with some embodiments.

FIG. 19 illustrates a plotted distribution of credit scores that is illustrative of a credit index 1910 in accordance with some embodiments. In this figure, each plotted point of the distribution represents a credit score of an entity that satisfies the one or more dimensions specified for the credit index 1910. When the credit index 1910 is keyed to a particular entity, the plotted point representative of the credit score for that particular entity is shown with a special symbol or indicator, such as indicator 1920. In some embodiments, each plotted point of the credit index 1910 is interactive such that the user can position a pointing tool, such as mouse cursor 1930, over a plotted point and, in response, the name of the entity and the credit score of the entity that is represented by that plotted point is displayed (e.g., 1940). Further interactions allow users to drill-down into the credit score. For example, a mouse left-click action on a particular plotted point drills-down from the credit score into one or more credit ratios for the represented entity. It should be apparent to one of ordinary skill in the art, that a credit index may be generated according to various other distributions such as linear charts, bar charts, pie charts, etc.

Credit indices may be generated as requested or may be pre-generated and stored to the system database for subsequent presentation. In some embodiments, each credit index is used to derive one or more credit ratings. A credit rating represents how the credit score of a particular entity in a particular credit index compares to the credit scores of other entities in that particular credit index. In other words, the credit rating represents how the credit score of the particular entity compares to the credit scores of other entities that satisfy the same one or more dimensions. In some embodiments, the credit rating is based on an "A", "B", "C", "D", and "F" scale. However, any scale may be used to represent the credit rating without loss of the intended purpose. Multiple ratings may be derived and presented at one time in a report or display interface. Additionally, multiple ratings derived for a particular entity may be hierarchically organized to provide drill-down access to the ratings.

Figure 20:
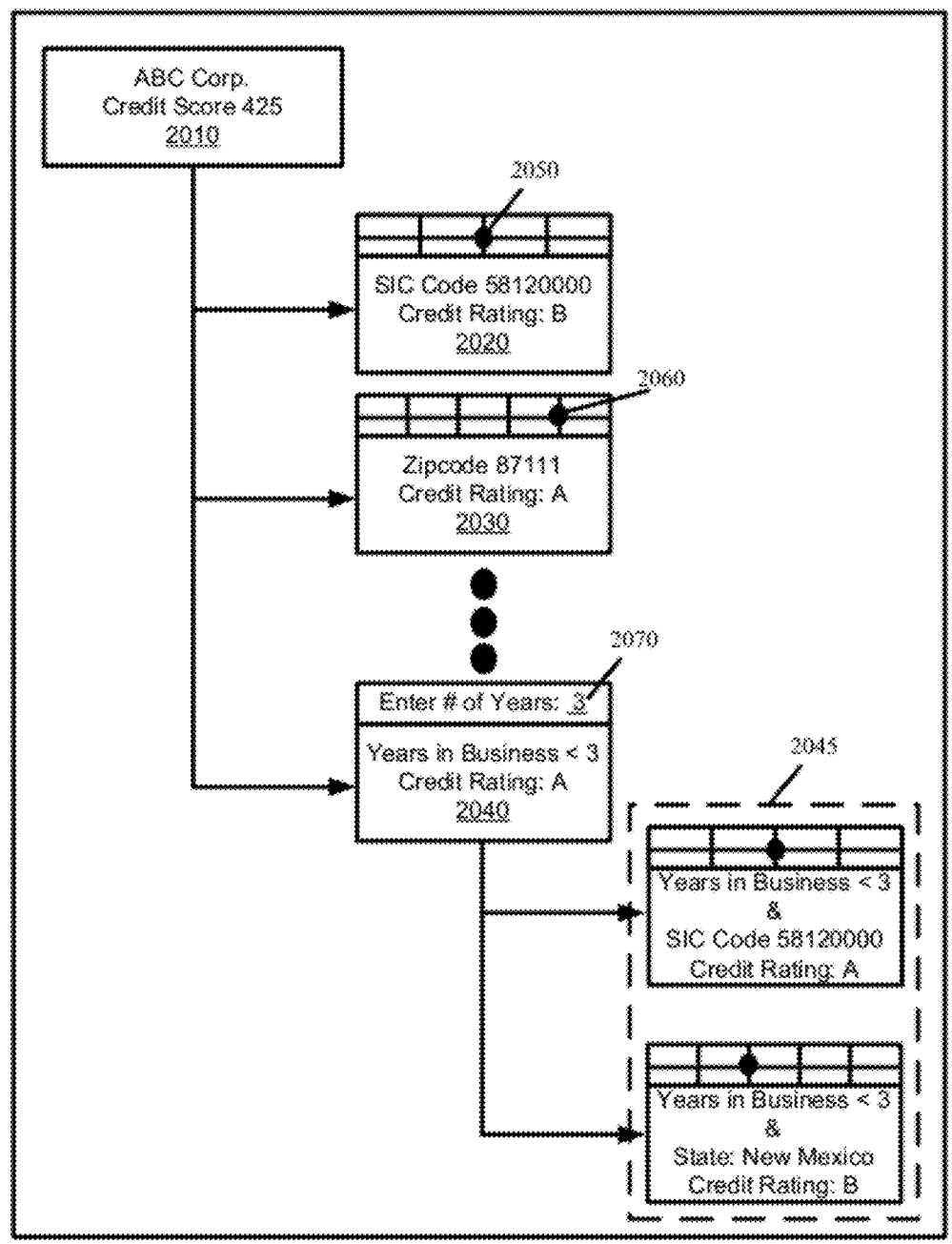
FIG. 20 illustrates using drill-down functionality to hierarchically access credit ratings of a particular businesses in accordance with some embodiments.

FIG. 20 illustrates using drill-down functionality to hierarchically access credit ratings of a particular entity in accordance with some embodiments. Specifically, the figure illustrates credit score 2010 at a first hierarchical level, single dimensional credit ratings 2020, 2030, and 2040 at a second hierarchical level, and a third hierarchical level 2045 to specify a multi-dimensional credit rating. The credit ratings 2020-2045 are derived based on comparative analysis of the credit score 2010 to credit scores of other entities that are identified according to one or more different dimensions that are specified for each credit rating. Each credit rating 2020-2045 also includes an interactive tool (e.g., 2050, 2060, 2070) for adjusting the dimension for that credit rating.

When the credit score 2010 is presented through the interface portal, the user can click or otherwise interact with the credit score 2010 to expand the credit score and display the credit ratings 2020-2040. In this figure, credit rating 2020 presents how the credit score 2010 for a particular entity rates when compared against the credit scores for other entities in the same SIC code as the particular entity; credit rating 2030 presents how the credit score 2010 for the particular entity rates when compared against the credit scores for other entities in the same zipcode as the particular entity; and credit rating 2040 presents how the credit score 2010 for the particular entity rates when compared against the credit scores for other entities that have been operating for less than 3 years. Each credit rating 2020-2040 therefore provides different insight into the creditworthiness of the particular entity. For example, when viewed in isolation, one may interpret the credit score 2010 to be a low score that is representative of an entity that is not creditworthy. However, the credit ratings 2020-2040 reveal that the entity when compared to other entities in its industry, geographic region, and years of business is actually creditworthy.

In this figure, the interactive tool 2050 above the credit rating 2020 can be used to broaden or restrict the SIC code. For example, moving the slider further down accesses a sub-classification for the industry that the particular entity is in and, in so doing, the credit score 2010 of the particular entity will be compared to the credit scores for a subset of entities that are within the same sub-classification in order to compute a new rating. The interactive tool 2060 allows users to interactively change the geographic region used to determine the credit rating 2030 and the interactive tools 2070 is an insertion box where the user can type in the temporal dimension for determining the credit rating 2040.

A credit rating may be determined based on multiple different dimensions. To do so, a user can click on any of the credit rating representations and then set one or more other dimensions to further refine the credit rating. In FIG. 20, the user clicks on the credit rating 2040 graphical representation to access the third hierarchical level 2045 whereby the temporal dimension can be combined with one other dimension to produce multi-dimensional credit rating. As shown, the third hierarchical level 2045 presents two multi-dimensional credit ratings. A first multi-dimensional credit rating is determined based on the number of years in business and a SIC code and a second multi-dimensional credit rating is determined based on the number of years in business and a geographic region.

In some embodiments, right-clicking on a credit rating (e.g., 2020-2040) causes the associated credit index to be displayed on-screen. The layout and operation of FIG. 20 is not meant to be limiting and is provided for exemplary purposes. Accordingly, the credit ratings, credit indices, and interactive tools can be presented in any number of different ways.

Some embodiments monetize the credit information by restricting access to the credit ratings or credit indices to paying users. In some embodiments, users are provided access to the credit score information, but have to pay or subscribe in order to access the associated credit ratings or credit indices. Access to the credit ratings and credit indices is often essential to lenders and other consumers of credit information, because the same credit score for a business operating in Manhattan, N.Y. and for a business operating in Lincoln, Nebr. does not properly describe the creditworthiness of these two businesses without further context. Each state, and more specifically, each city is subject to its own micro-economic influences that cause credit scores in that city or state to be offset from credit scores in other cities or states. These micro-economic influences are more likely to impact the creditworthiness of the small business as opposed to large interstate corporations where the creditworthiness of the small business is wholly dependent on its operations within a limited geographic region. Therefore, the credit ratings and credit indices generated by the credibility scoring and reporting system of some embodiments is a valuable asset for properly determining the creditworthiness of an entity.

B. Credibility Trends

In some embodiments, the indexer leverages the aggregate data in the credibility scoring and reporting system to generate other tangible assets. Some such assets include credibility trends. Credibility trends impart additional insight into entity credibility by forecasting fluctuations and direction of entity credibility based on current and historical credibility data related to the entity, current and historical credibility data related to other entities that are identified according to one or more dimensions, and trending factors that are often outside the immediate influence of the entity. As such, the credibility trends are valuable commodities in identifying future issues to credibility and in enabling an entity to preemptively address such issues. Based on their informative value, credibility trends can be monetized as a sellable asset apart or in conjunction with the credibility scores, credibility reports, and indices.

In some embodiments, the indexer derives a credibility trend based on analysis of current and historical credibility data of a particular entity in relation to aggregate credibility data from one or more indices that are associated with that particular entity. The credibility scoring and reporting system stores historical credibility data to the system database. Specifically, as credibility scores, credibility reports, and indices are updated over time, the credibility scoring and reporting system stores snapshots of this data in the database such that a historic account of the particular entity's credibility and its associated indices are available. Snapshots may be taken on a periodic basis, such as on a daily, weekly, or monthly basis.

Figure 21:
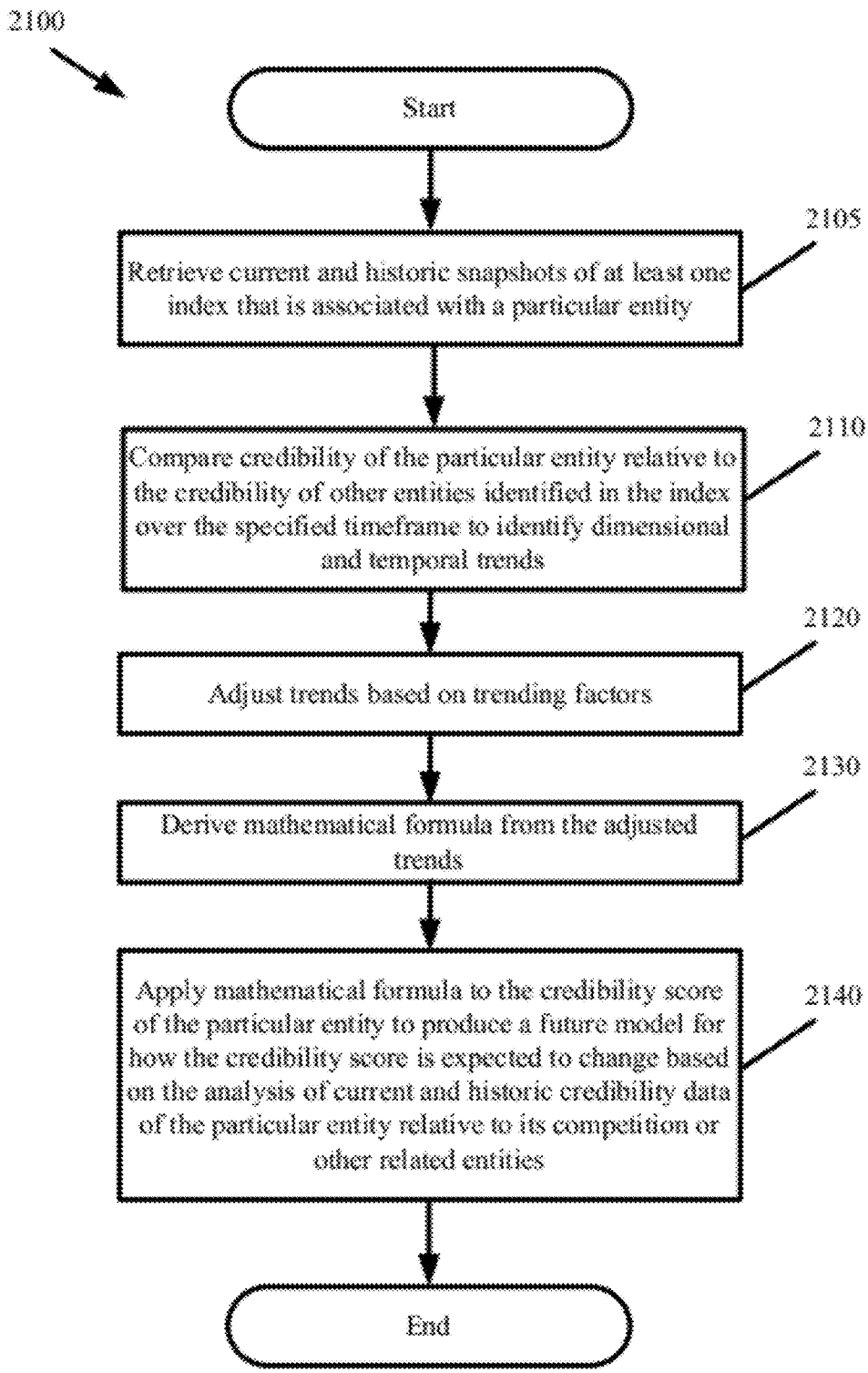
FIG. 21 presents a process performed by the indexer in order to identify a trend for a particular business in accordance with some embodiments.

FIG. 21 presents a process 2100 performed by the indexer in order to identify a trend for a particular entity in accordance with some embodiments. The process 2100 begins by retrieving (at 2105) current and historic snapshots of at least one index that is associated with the particular entity. The at least one index is retrieved using a query from the indexer to the database wherein the query identifies (1) the particular entity, (2) a desired set of credibility dimensions for the at least one index, and (3) a timeframe for the historic snapshots of the index or indices that satisfy the desired set of credibility dimensions. The query parameters may be set by the system or by a user.

Upon retrieving the snapshots for a query identified index, the process compares (at 2110) the credibility of the particular entity relative to the credibility of other entities identified in the index over the specified timeframe. This comparison is performed using one or more algorithms that identify dimensional and temporal trends between the credibility of the particular entity and the credibility of other entities in the index over the specified timeframe. These algorithms define the comparisons that are made for trend identification and the thresholds for identifying similar or dissimilar patterns or behavior as trends. For example, identifying a trend may include identifying that the credibility score of a particular entity increased by 10% over a one month interval and the credibility scores of other entities had an overall decrease of 10% over the same one month interval. This comparison reveals a trend that shows the particular entity outperforming other related entities. An alternate example of trend identification is provided below with reference to FIG. 22. Trends can be identified based on any one or more dimensions of credibility and based on different credibility data besides credibility scores. Moreover, trends can be identified across different dimensions such that observed behavior in a first credibility dimension has a corresponding impact on a second dimension of credibility. For example, an increase in social network messages referencing a particular entity can correspond to an increased credibility score as the increase in social network messages may be indicative of increasing popularity or exposure.

Next, the identified trends are adjusted (at 2120) based on zero or more trending factors. Trending factors include influences that impact credibility of an entity and that are indirect or outside the immediate influence of the particular entity. Trending factors are typically not observable from an index. One trending factor involves determining how crowded the market is in which the particular entity operates and adjusting the trends accordingly. For example, when a large number of entities go out of business in an observed time period, this may be an indication that the market is over-saturated and, as a result, the indexer adjusts any compiled trends to account for the adverse state of the market. Conversely, when a large number of entities newly enter the market, this may be an indication that there is high demand and, as a result, the indexer adjusts any compiled trends to account for the positive state of the market. Another factor may include determining how "hot" the market that the particular entity operates in is and adjusting the trends accordingly. For example, from the quantity of credibility data that is aggregated for the particular entity relative to the quantity of credibility data that is aggregated for related entities identified from the index over the specified time period, the indexer can determine whether the particular entity is outperforming its competition. If the indexer aggregates five total new positive reviews in a one month period for a particular entity of interest and aggregates one hundred total new positive reviews for an average competitor of the particular entity of interest as identified from the query identified index, then the indexer can ascertain that the particular entity is underperforming and, as a result, that the credibility of the particular entity will be adversely affected. Other trending factors include analyst reports or news articles on the economy, a business sector, or a field of business. The above listing is exemplary in scope and not intended to be an exhaustive listing of all trending factors, as the complete set of factors is too numerous to enumerate and can change over time. In some embodiments, trending factors are supplied to the indexer by a system administrator or via automated means.

A mathematical formula is derived (at 2130) from the adjusted trends and applied (at 2140) to the credibility score of the particular entity to produce a future model for how the credibility score is expected to change based on the analysis of current and historic credibility data of the particular entity relative to its competition or other related entities. In some embodiments, trends and the forecasted model associated with the particular entity are presented through the interface portal when requested by a user or the particular entity. The adjusted trends and forecasted model can alternatively be stored to the database for subsequent presentation to one or more users upon request.

Figure 22:
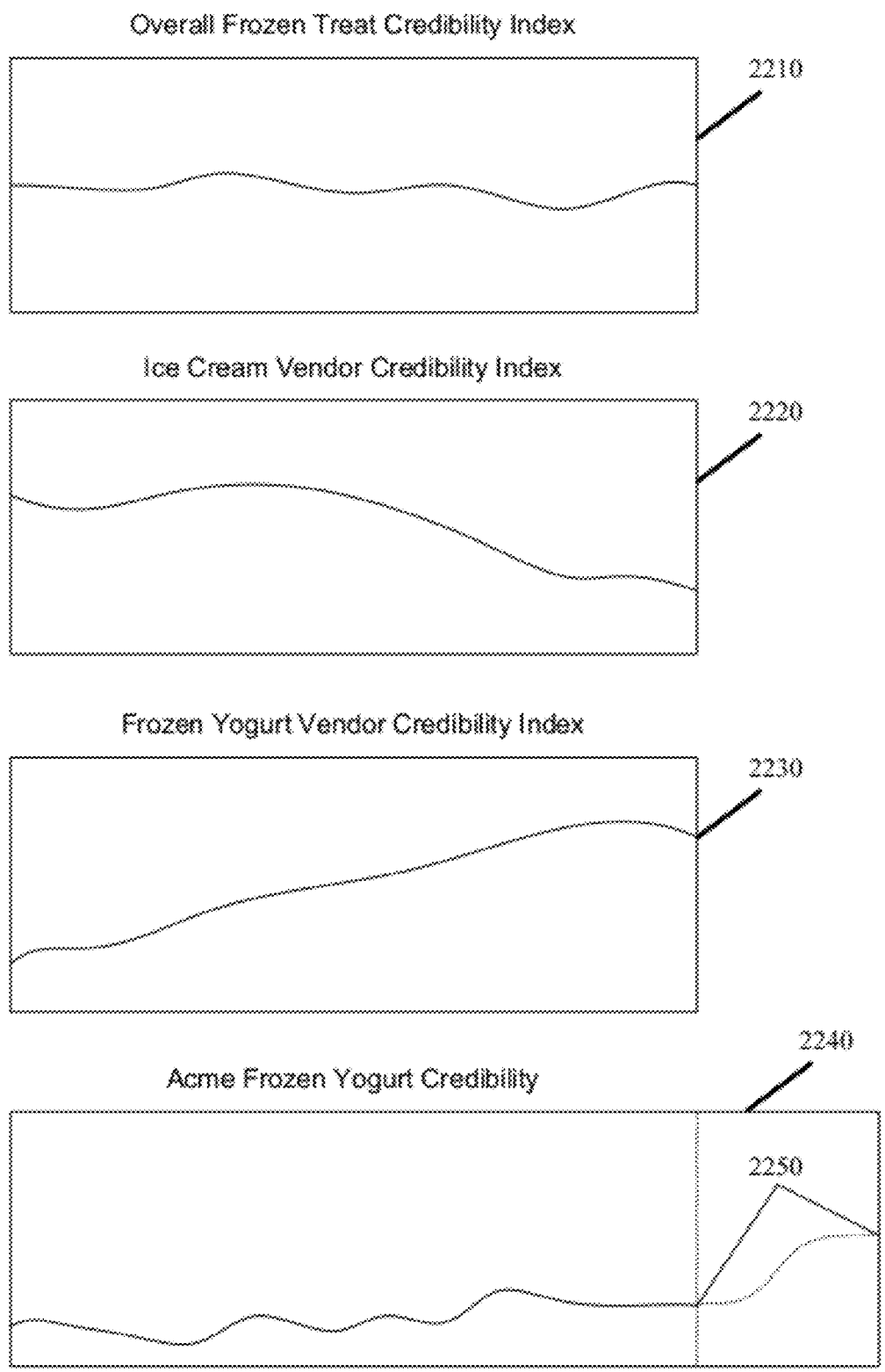
FIG. 22 conceptually illustrates identifying a trend based on comparative analysis between credibility of a particular business and a set of related indices.

FIG. 22 conceptually illustrates identifying a trend based on comparative analysis between the credibility of a particular entity and the credibility of other related entities that are identified from a set of indices that are generated to present the credibility of the particular entity according to different dimensions. The set of indices include index 2210, index 2220, and index 2230. Index 2210 illustrates the credibility index for frozen treat businesses over a specified period of time. As shown, index 2210 is relatively stable over the specified period of time. Index 2220 illustrates the credibility index for ice cream businesses over the same specified period of time where the ice cream businesses are a subset of businesses that are included as part of the frozen treat businesses. Index 2220 is declining over the specified period of time. Index 2230 illustrates the credibility index for frozen yogurt businesses over the same specified period of time where the frozen yogurt businesses are a subset of businesses that are included as part of the frozen treat businesses. Index 2230 is increasing over the specified period of time. Index 2240 illustrates credibility of a particular frozen yogurt business as being stable during the specified period of time. By aggregating the information from the indices 2210-2230, the indexer is able to identify a pattern in which aggregate credibility for frozen treat businesses stays relatively stable even though frozen yogurt businesses are gaining credibility and ice cream businesses are losing credibility. Since the particular business at issue is a frozen yogurt business, the indexer can forecast a trend 2250 whereby the credibility of the particular business will increase. This trend would be unobtainable when viewing credibility of the particular business in isolation. However, by allowing the indexer access to this aggregate data, these and other trends are readily identifiable and presentable to users in an automated manner.

In some embodiments, the above trend information is converted into a tangible asset that is sold as a commodity. In some such embodiments, such a commodity is made available to users that pay to have access to the underlying information using the interface portal or through other means (e.g., paper reports). Other non-paying users will be prevented from accessing the trend information or will be provided limited or restricted access. As will be apparent from the above description, the identified trends have separate value from the credibility scores, credibility reports, and indices by virtue that the trends extend beyond the past and present credibility outlook that is otherwise obtainable from the credibility scores, credibility reports, and indices. Instead, the identified trends provide an expected future credibility outlook to allow an entity to preemptively address expected changes to its credibility before they occur and to allow an entity to determine what future revenue may be expected based on expected changes to credibility.

C. Predictive Credibility

In some embodiments, the indexer creates tangible assets that can be monetized in the form of reports (1) that identify successful practices of an entity that improve upon its credibility, (2) that identify unsuccessful practices of the entity that degrade its credibility, (3) that identify successful and unsuccessful practices of competitors or other related entities that improve or degrade credibility, and (4) that predict how a change, addition, or removal of a practice will affect the credibility or credibility score of the entity in the future. These assets derive their value from the fact that they directly identify for the entity what targeted actions can most effectively improve the credibility of the entity where the actions correspond to practices that should be changed, implemented, or removed. Moreover, the predictive scoring identifies the impact that a specific action will likely produce in the credibility score of the entity so that the entity can make a cost-benefit analysis to determine how much revenue may be generated as a result of taking the action.

The indexer automatedly identifies the successful and unsuccessful practices using data that is aggregated as part of the indices that are associated with an entity. A successful practice is representative of any action that is identified by one or more producers of credibility data as being beneficial to the credibility of an entity and an unsuccessful practice is representative of any action that is identified by one or more producers of credibility data as being detrimental to the credibility of an entity. The actions constituting successful and unsuccessful practices may include the entity's shipping policy (e.g., free shipping, expedited shipping, refrigerated shipping, etc.), no hassle returns, upfront pricing, use of fresh ingredients, free parking, customer service, etc. These actions may also include whether or not an entity has a social media presence (e.g., periodically "tweets", posts on a social media site, etc.). The listing of actions is not intended to be limiting, but is rather presented for exemplary purposes.

In some embodiments, the indexer automatically computes the predicted change to the credibility score of an entity when the entity undertakes a new action or ceases a previously undertaken action. The predicted change to the credibility score is based on the computed average credibility score contribution that a particular action has had on the credibility scores of competitors and other related entities.

Figure 23:
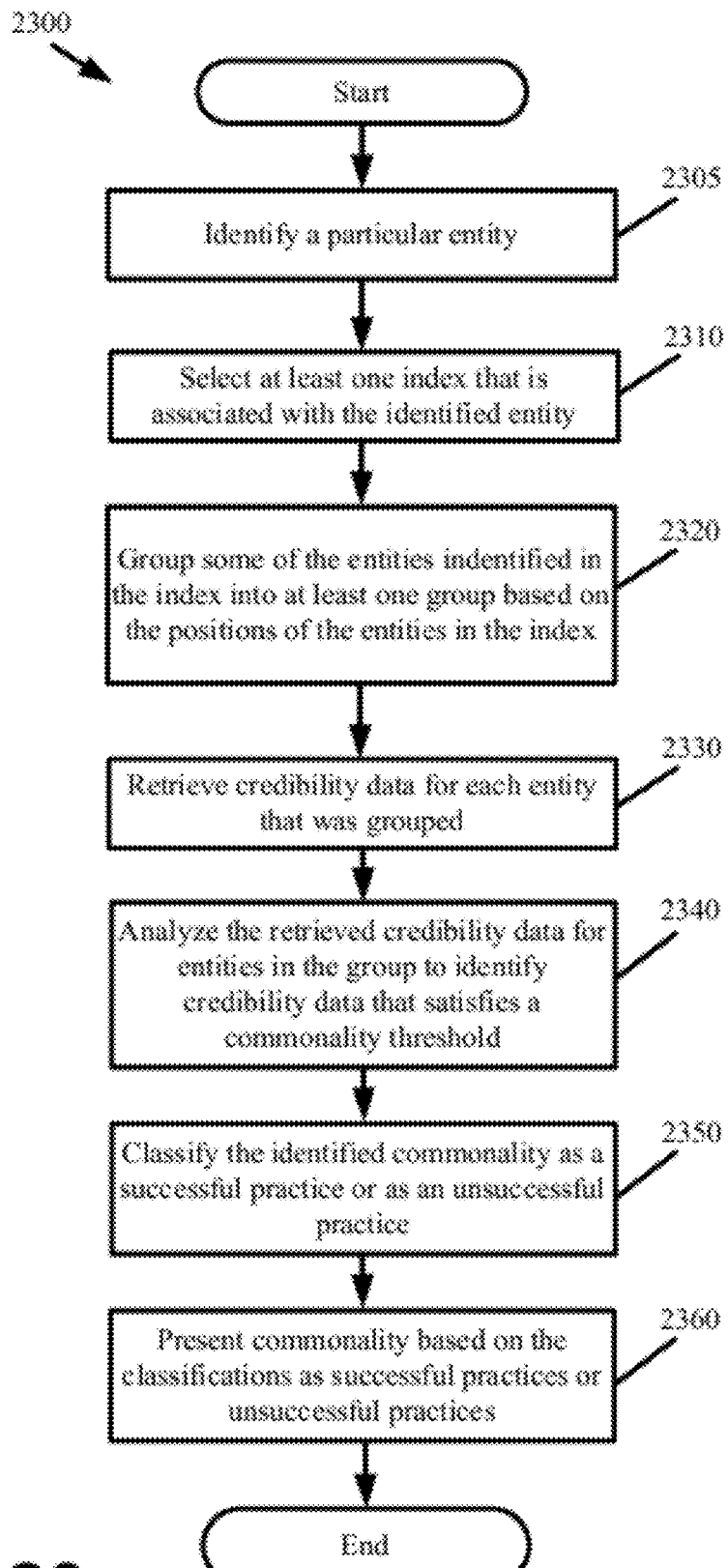
FIG. 23 presents a process performed by the indexer to identify for a particular business in accordance with some embodiments the successful and unsuccessful business practices of its competitors or of related businesses.

FIG. 23 presents a process 2300 performed by the indexer to identify for a particular entity the successful and unsuccessful practices of its competitors or of related entities. The process 2300 begins by identifying (at 2305) the particular entity that is interested in identifying what practices can help improve upon its credibility and what practices are currently implemented by the particular entity that detrimentally affect its credibility. The process selects (at 2310) at least one index that is associated with the identified particular entity. The index is selected using the links that associate the particular entity to one or more indices, though a query can be made to the credibility scoring and reporting system to select an index for the particular entity. In some embodiments, the process by default selects a "credibility score index" that identifies the credibility score of the identified particular entity relative to the credibility scores of its competitors within a specified geographic region, where the specified geographic region provides a sufficient sample size of competitors (e.g., 100 competitors).

Based on the entities identified in the selected index and the positions of the entities in the index, the process groups (at 2320) some of the entities to at least one group. For exemplary purposes of process 2300, the discussion below is presented with respect to grouping some of the entities from the index into one particular group. In some embodiments, the grouping identifies entities ranking in the top percentile of the index. From the credibility data that is associated with these top ranking entities, the indexer can identify common practices that, if implemented by the particular entity, could positively impact the credibility of the particular entity. Other groupings can identify entities ranking in the bottom percentile of the index in a second group. As should be apparent to one of ordinary skill in the art, these groupings are readily identifiable from the index, because the selected index orders the entities associated with that index according to a score (e.g., credibility score). The process 2300 can alter how the grouping is performed for different indices, a desired sampling size, or a percentile value for the group. For example, based on a first index, the process groups entities that rank in the top 10 percentile of the first index to a first group and groups entities that rank in the bottom 10 percentile of the first index to a second group; based on a second index, the process groups entities that rank in the top 50 percentile of the second index to a first group and groups entities that rank in the bottom 50 percentile of the second index to a second group. It should be noted that the process 2300 can be adjusted so that any arbitrary number of groups are identified at step 2320, though the discussion below is presented with only a single group.

The process retrieves (at 2330) credibility data that was aggregated for the entities that were grouped to the at least one group. The process utilizes the entity names or unique identifiers associated with the entities in the group to retrieve the associated credibility data from the database. The retrieved credibility data includes aggregated qualitative credibility data and may include aggregated quantitative credibility data and other data.

The process analyzes (at 2340) the retrieved credibility data to identify commonality for the group. This involves natural language processing of the retrieved credibility data, and more specifically natural language processing of the retrieved qualitative credibility data. As part of the natural language processing, the indexer searches the retrieved qualitative credibility data to identify common terms or phrases that are repeated a sufficient number of times to satisfy a commonality threshold. More specifically, the indexer searches the credibility data for specific terms or phrases related to different aspects of an entity, different practices utilized by the entity, or to goods and services that are offered by the entity. The search may be facilitated by a dictionary that enumerates the terms or phrases that are related to the different aspect, practices, and goods and service offerings of an entity. For example, the dictionary may include the terms shipping, quality, decor, design, reliability, returns, and customer service. As a more complete example of identifying commonality, commonality may be identified when the phrase "free shipping" or "fresh ingredients" is repeated a sufficient number of times for the group of entities that are in the top 10 percentile of an index. Such commonality identifies aspects, practices, or goods and service offerings that can positively impact or improve the credibility of an entity. Other commonality may be identified by analyzing other retrieved credibility data besides the qualitative credibility data. For example, commonality within the demographic information of those submitting the credibility data may be identified (i.e., credibility data producers). Specifically, the indexer may identify that a majority of positive credibility data for the entities in the group is originated by persons 30-40 years of age and that a majority of negative credibility data for the entities in the group is originated by persons 18-29 years of age. As still another example, commonality may also identify that a certain threshold number of successful entities actively use social media networks. Such identification may be made based on how much credibility data is aggregated from social media data sources for the successful entities relative to other entities. Specifically, if entities in the top five percentile receive and post on average hundreds of social media responses per week and all other entities receive and post on average ten or fewer social media responses, then the indexer can identify from the aggregated data that having an active social media presence is a successful practice.

After analyzing the retrieved credibility data for commonality and identifying the commonality, the process classifies (at 2350) the identified commonality as a successful practice or as an unsuccessful practice. The classification is determined based on the entities from which the commonality is derived. If the entities from which the commonality is identified are top performing entities in a particular index, then the process classifies such commonality as successful practice(s) that can potentially improve the credibility of the particular entity if enacted by the particular entity. Conversely, if the entities from which the commonality is identified are bottom performing entities in a particular index, then the process classifies such commonality as unsuccessful practice(s) that can potentially degrade the credibility of the particular entity if enacted by the particular entity. The process presents (at 2360) the commonality based on the classifications as successful practices or unsuccessful practices. The identified commonality or identified successful and unsuccessful practices may be stored in the database for subsequent presentation to an interested user and may be stored in conjunction with the index from which the practices were identified such that the practices can be accessed by drilling down from the index. In some embodiments, the interface portal formats the practices for presentation to users in a web browser or other network enabled application. In some such embodiments, users can submit a query to identify an entity of interest and then click on a link to access the successful and unsuccessful practice information identified for that entity based on process 2300.

From the examples above, the identified commonality may reveal that if the particular entity implemented a free shipping program it will be employing a practice used by its more successful competitors. Similarly, the identified commonality may reveal that if the particular entity used fresh ingredients it will distinguish itself from its poor performing competitors.

In summary, the indexer automatically identifies successful practices for a particular entity by identifying commonality in the aggregated credibility data of entities that rank in a top specified percentile of one or more indices related to the particular entity. Similarly, the indexer automatically identifies unsuccessful practices for a particular entity by identifying commonality in the aggregated credibility data of entities that rank in a bottom specified percentile of one or more indices related to the particular entity.

In some embodiments, the identified successful and unsuccessful practices are converted into monetized tangible assets whereby access to such information is restricted to paying users or users that are members in a subscription plan. When access is restricted, users either register with the credibility scoring and reporting system by providing login information or by providing payment information using the interface portal to gain access to the identified successful and unsuccessful practices. Therefore, entities that are interested in identifying what successful competitors are doing to achieve their advantage in the marketplace can do so by purchasing access to these assets. With access to these assets, entities can perform targeted change to their own practices based on the identification of practices that have been proven to improve or degrade the credibility of others. Specifically, the entity can change its own existing practices, implement new practices, or remove existing practices to better conform their operation to the operation of their more successful competitors. In this manner, the tangible assets that identify successful and unsuccessful practices can be used to improve the credibility for a particular entity and ultimately its revenue generation capabilities in a targeted or directed manner by identifying what practices the entity should enact to improve its credibility and what practices the entity should avoid to prevent damage to its credibility.

In some embodiments, the indexer directly identifies successful and unsuccessful practices enacted by the entity of interest in addition to or instead of identifying the successful and unsuccessful practices of competitors or other entities related to the entity of interest. In this manner, the indexer targets the identified practices specifically to the current and actual practices used by the entity as opposed to the practices that others have used.

Figure 24:
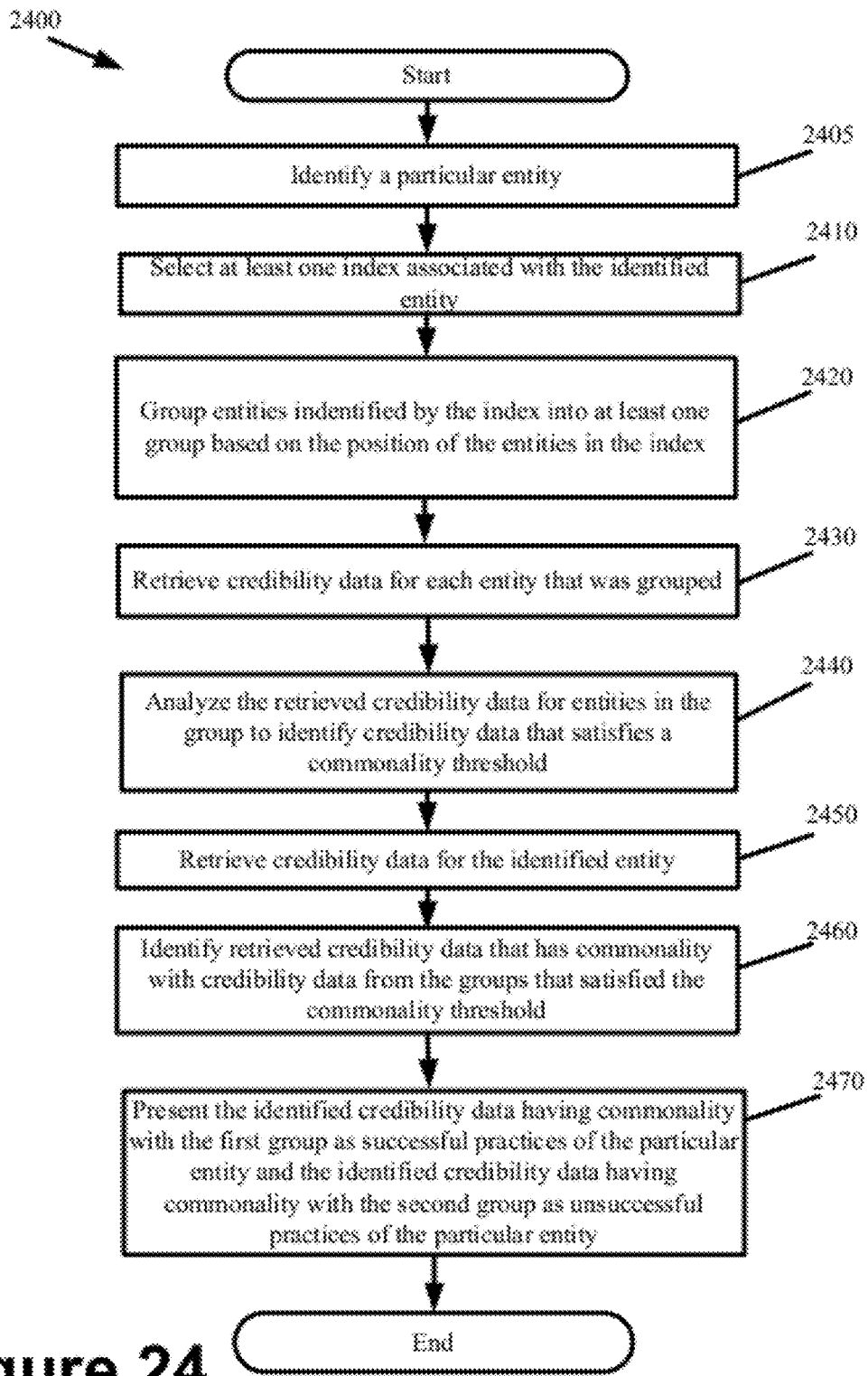
FIG. 24 presents a process performed by the indexer for identifying successful and unsuccessful business practices of a particular business in accordance with some embodiments.

FIG. 24 presents a process 2400 performed by the indexer for identifying successful and unsuccessful practices of a particular entity in accordance with some embodiments. As in process 2300 of FIG. 23, steps 2405-2440 of process 2400 mirror steps 2305-2340 of process 2300. In other words, the process 2400 begins by identifying (at 2405) the particular entity of interest, selecting (at 2410) at least one index associated with the particular entity, grouping (at 2420) some entities associated with the index to at least one group, retrieving (at 2430) aggregated credibility data for the grouped entities, and analyzing (at 2440) the credibility data to identify commonality within the group.

However, process 2400 performs the additional steps 2450, 2460, and 2470. Namely, the process retrieves (at 2450) the credibility data that was aggregated for the identified particular entity. Then, the process identifies (at 2460) any credibility data from the retrieved credibility data of the particular entity that has commonality with credibility data from the group that satisfied the commonality threshold. Credibility data of the particular entity that has commonality with credibility data of the group of entities is identified as a successful practice when the group of entities represents successful entities of the selected index and credibility data of the particular entity that has commonality with credibility data of the group of entities is identified as an unsuccessful practice when the group of entities represents unsuccessful entities of the selected index. The process then presents (at 2470) the identified credibility data of the particular entity having commonality with the group such that the identified credibility data is specific to the particular entity and targets practices of the particular entity.

In summary, the practices of an identified entity are compared against practices of its competitors or other related entities (1) in order to identify which practices are performed in common between the identified entity and a set of top performing entities or entities with high credibility where these practices are identified as successful practices and (2) in order to identify which practices are performed in common between the identified entity and a set of poor performing entities or entities with low credibility where these practices are identified as unsuccessful practices.

Figure 25:
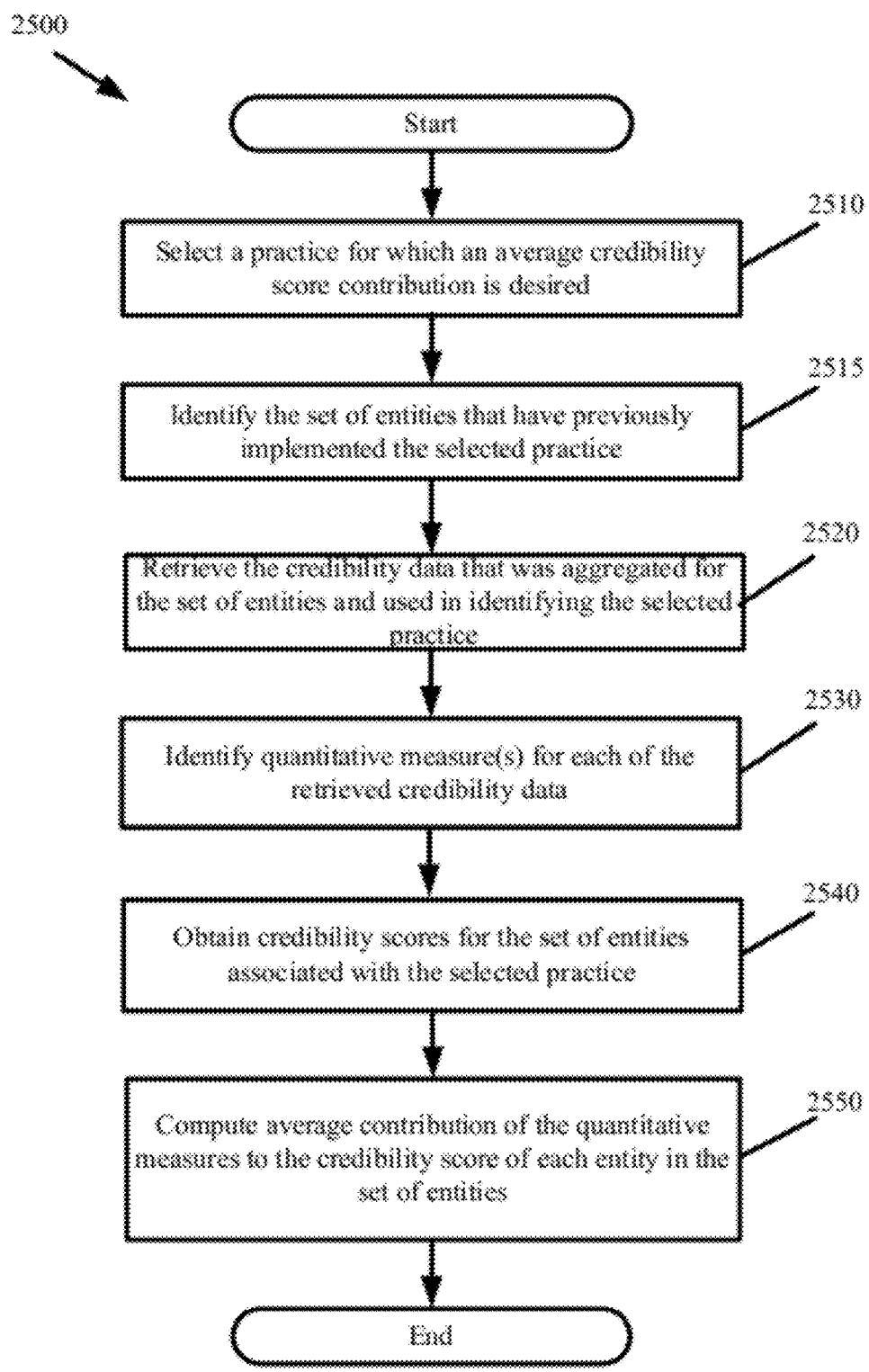
FIG. 25 presents a process performed by the indexer for predicting the credibility score contribution of a particular business practice to a credibility score in accordance with some embodiments

In some embodiments, the identified practices are utilized by the indexer to predict how a change to an business practice will positively or negatively affect the credibility score of an entity. To do so, the indexer identifies an average credibility score contribution provided by a practice, where the practice has been quantified into a quantitative measure that is included as part of the computed credibility scores for these various entities. FIG. 25 presents a process 2500 performed by the indexer for predicting the credibility score contribution of a particular practice to a credibility score in accordance with some embodiments.

Figure 26:
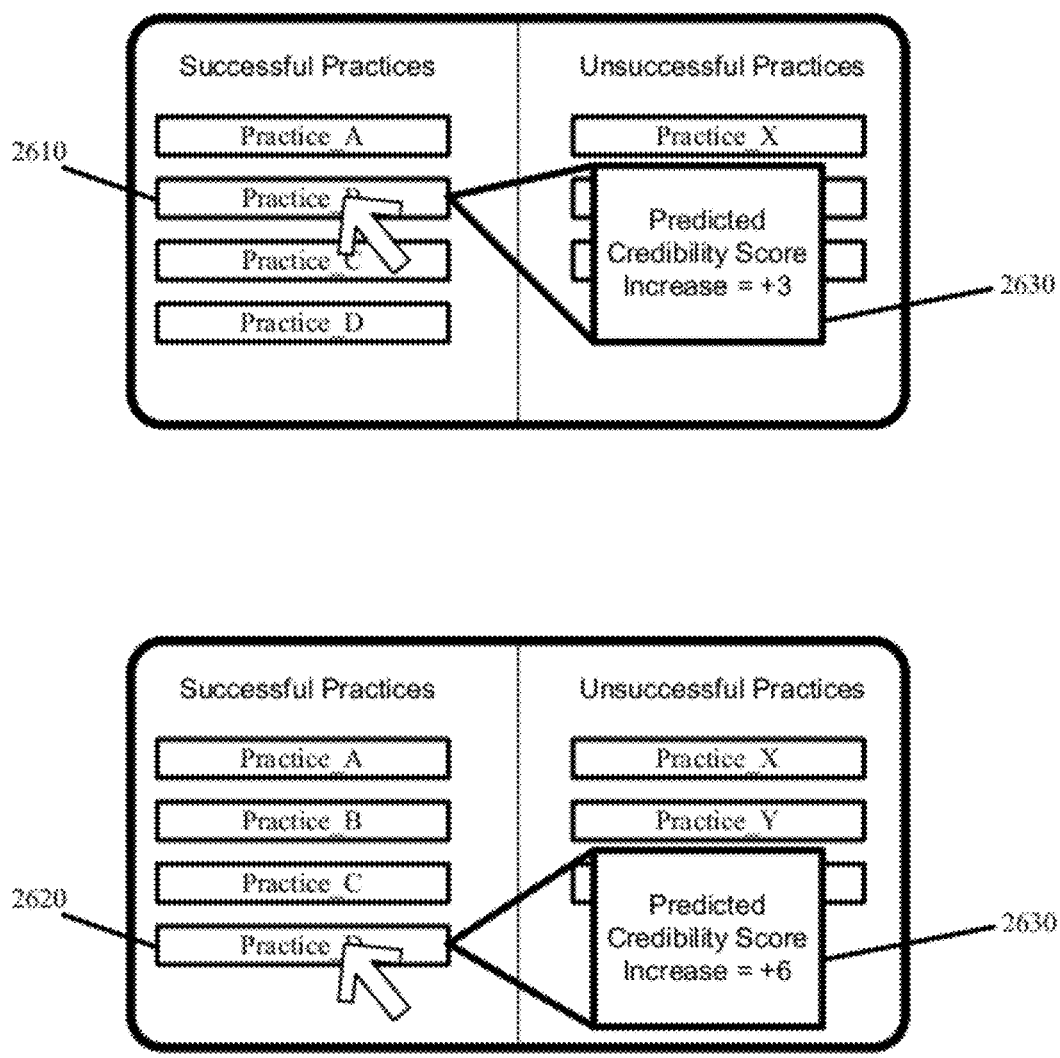
FIG. 26 presents one or more business practices and an average credibility score determine for a business practice in accordance with some embodiments.

The process 2500 begins by selecting (at 2510) a practice for which a predicted credibility score contribution is desired. In some embodiments, the practice is selected by a user when the user is presented with the successful and unsuccessful practices that are identified using the processes described with reference to FIGS. 23 and 24. In some embodiments, the interface portal provides functionality whereby the user can select identified practices in order to view the predicted impact that implementing that selected practice will have on the credibility score of the user's business. For example, as shown in FIG. 26, the interface portal presents a set of practices that are identified for an entity (e.g., 2610 and 2620). A particular practice from the set of practices can be selected using a pointing tool (e.g., mouse pointer). Once selected the particular practice is selected, the average contribution of that particular practice to the credibility scores of entities implementing that particular practice is displayed in window 2630.

With reference back to process 2500, after a practice is selected, the process identifies (at 2515) the set of entities that have previously implemented that practice. The process then retrieves (at 2520) the credibility data that was aggregated for the identified set of entities and that was used in identifying the selected practice. Steps 2515 and 2520 involve a reverse lookup. Specifically, these steps involve identifying the commonality that is the basis for the practice, identifying the entities that have implemented that practice, and then identifying the credibility data from which the commonality was derived.

The process identifies (at 2530) the quantitative measure(s) for the retrieved credibility data. Derivation of quantitative measures from credibility data is described above with reference to FIGS. 7-11.

Next, the process obtains (at 2540) the credibility scores for the set of entities associated with the selected practice and computes (at 2550) the average contribution of the quantitative measures to the credibility score of each entity in the set of entities. The average contribution value will be stored to the database and will be presented as the predicted credibility contribution that the selected practice will have to the credibility score of an entity that implements that selected practice.

Figure 27:
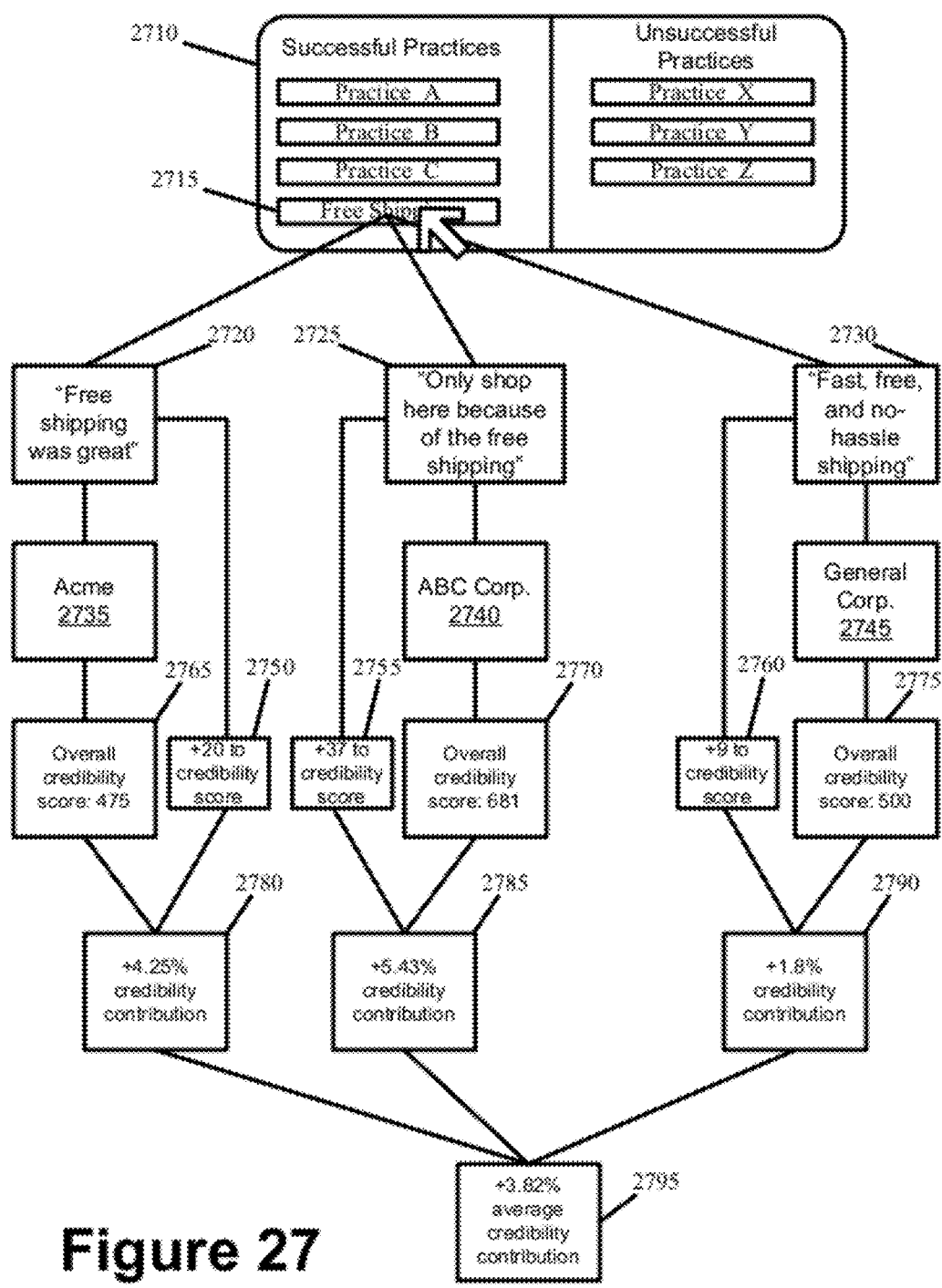
FIG. 27 conceptually illustrates using process 2500 to predict the credibility contribution for a selected business practice in accordance with some embodiments

FIG. 27 conceptually illustrates using process 2500 to predict the credibility contribution for a selected practice in accordance with some embodiments. The figure includes (1) a practice selection interface 2710, (2) credibility data 2720, 2725, and 2730 that is associated with a set of entities 2735, 2740, and 2745 used in the identification of the selected practice, (3) quantitative measures 2750, 2755, and 2760 that are derived from the credibility data 2720-2730, (4) a set of credibility scores 2765, 2770, and 2775 associated with each entity of the set of entities 2735-2745, (5) percent contributions 2780, 2785, and 2790 that each quantitative measure 2750, 2755, and 2760 makes to its associated entity's credibility score, and (6) the average predicted credibility contribution 2795 that is computed from the percent contributions 2780-2790.

The practice selection interface 2710 is one of many interfaces generated by the interface portal of some embodiments and presented to entities so that they can better manage their credibility. Specifically, interface 2710 allows entities to see what practices successful and unsuccessful competitors or related entities have implemented. Additionally, interface 2710 allows entities to see what impact implementing a particular practice would have on their credibility scores. In some embodiments, entities access and interact with the interface 2710 using a web browser application that is directed to a credibility scoring and reporting system website (e.g., www.credibility.com/practices). A selection is made by moving a pointing tool, such as a mouse cursor, over a graphical representation of a practice that is displayed in the interface 2710. Then by clicking on the graphical representation or using other input means (e.g., touch inputs, keyboard inputs, etc.), the practice identified by the graphical representation is selected. In FIG. 27, the pointing tool is placed over the graphical representation for practice 2715 and a selection is made.

As described above with reference to FIG. 25, once the selection is made, the indexer identifies the credibility data 2720, 2725, and 2730 that is associated with the set of entities 2735, 2740, and 2745 used in the identification of the selected practice 2715. In this figure, the credibility data 2720-2730 is in the form of independent but related aggregated qualitative user provided reviews. Next, the indexer identifies the credibility scores 2765-2775 for the entities 2735-2745. The credibility scores 2765-2775 are processed with the quantitative measures 2750-2760 that are derived from the credibility data 2720-2730 in order to determine the percentage that each credibility score 2765-2775 is affected by a corresponding quantitative measure. As one example, the quantitative measure 2750 for the selected practice 2715 affects the overall credibility score 2765 of the "Acme" business 2735 by 4.25%.

By averaging the percentage contributions 2780, 2785, and 2790, the indexer computes the average credibility score contribution 2795. The average credibility score contribution 2795 can then be presented to entities that are interested in knowing how much their credibility will change if they were to implement the selected practice as one of their own practices. In FIG. 27, an entity that implements a "free shipping" or equivalent practice will, on average, receive a 3.82% improvement in their credibility.

D. Lead Generation

In some embodiments, the indexer automatically provides a particular entity with leads to new partnerships that if established can improve the credibility of the particular entity. Specifically, the credibility of an entity can be affected by its partners where the partners provide goods or services to the entity and those goods and services affect the quality of goods and services offered by the entity. For example, a business that provides goods often requires suppliers to supply the business with raw materials or component goods. When these supplied goods are of low or sub-par quality, the credibility of the business will likely be adversely affected because of: a higher failure rate of goods, a higher proportion of goods being returned after purchase, a higher number of calls to customer support, and, in general, lowered goodwill. Conversely, the credibility of a business that sources components for its goods from trusted or high quality suppliers will likely be positively affected because of generated goodwill that results from higher quality goods or services. Besides suppliers, other partners that can directly or indirectly affect the credibility of an entity include financiers, logistics providers, manufacturers, marketing agencies, and contractors as some examples.

The leads generated by the indexer therefore contain intrinsic value based on their potential to improve the credibility of the entity and, in so doing, improve the revenue generation capabilities of the entity. As such, the identified leads are part of the set of tangible assets provided by the credibility scoring and reporting system. By restricting access to these leads and by tailoring the leads to match the specific needs of a particular entity, the credibility scoring and reporting system can commoditize and monetize these assets. A tangentially beneficial feature is that the indexer can directly identify current partners of an entity that detrimentally affect the credibility for that entity. In some instances, the entity may be wholly unaware that one or more of its partners is actually hurting the credibility of the entity. By specifically identifying these partners to an entity and by suggesting better alternative partners that are in established relationships with competitors with top-tier credibility, the indexer identifies targeted actions that the entity can take to improve its credibility and its revenue.

Figure 28:
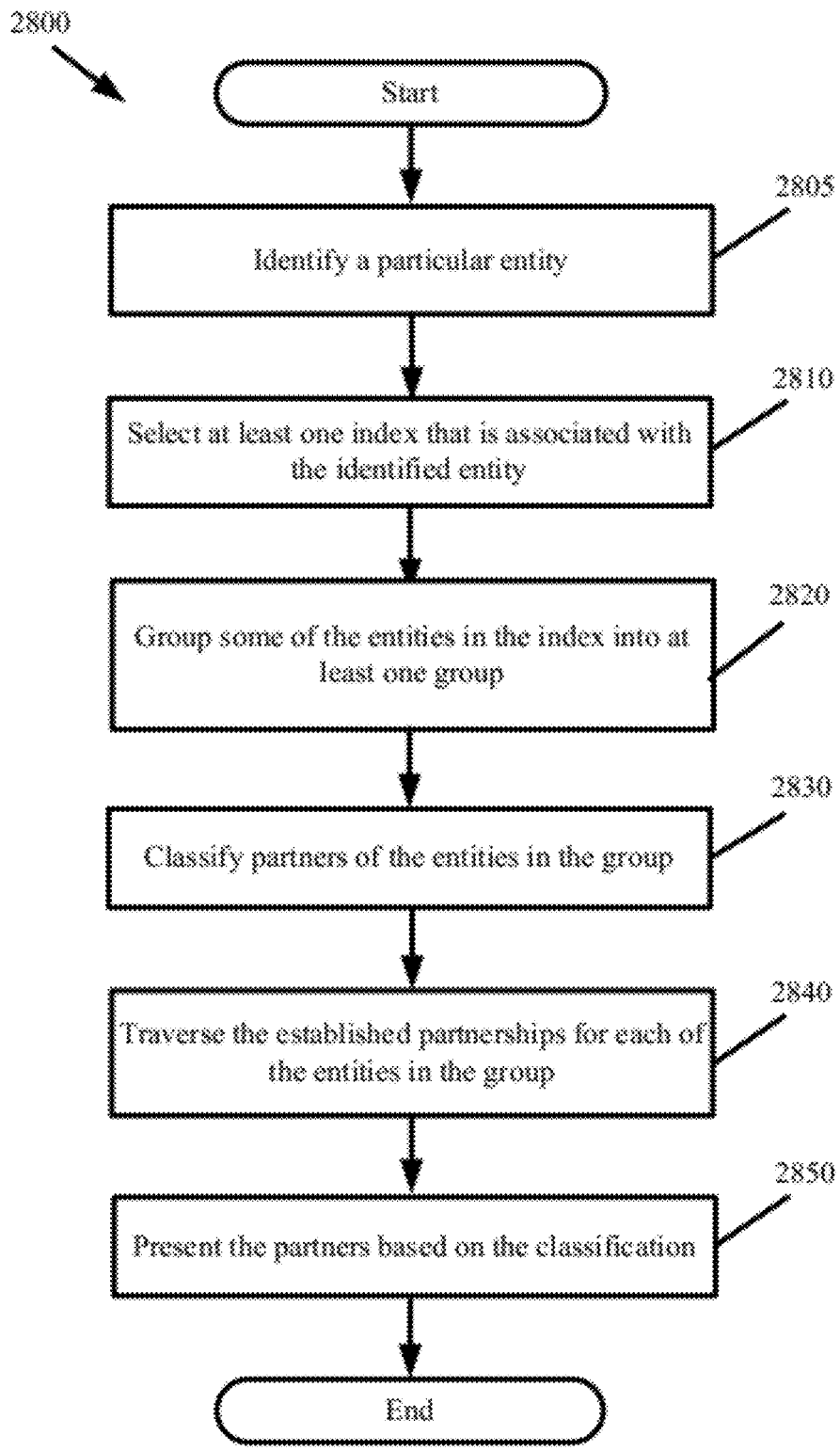
FIG. 28 presents a process that is in accordance with some embodiments and that is performed by the indexer to identify for a particular entity the beneficial and detrimental partners of its competitors or of related entities.

FIG. 28 presents a process 2800 that is in accordance with some embodiments and that is performed by the indexer to identify for a particular entity the beneficial and detrimental partners of its competitors or of related entities. The process 2800 begins by identifying (at 2805) the particular entity. The process selects (at 2810) at least one index that is associated with the identified particular entity. In some embodiments, the index is selected using links that associate one or more indices to the particular entity. In some embodiments, the process by default selects a credibility scoring index that identifies the credibility score of the identified particular entity relative to its competitors.

As in FIG. 23, the process groups (at 2820) some of the entities in the selected index into at least one group. For example, the process groups the entities that are identified to be in the top percentile of the index in a group or the process groups the entities that are identified to be in the bottom percentile of the index in a group. It should be apparent to one of ordinary skill in the art that more than one group can be identified at step 2820 and that the process 2800 can be adapted to generate leads from each of the groups where each group is representative of a different performance class.

The process classifies (at 2830) the entities in the group. In some embodiments, the classification is based on the position of the entities in the index. Next, the process traverses (at 2840) the established partnerships for each of the entities in the specified groupings. This partnership information may be user provided when a user registers an entity or the partnership information may be automatically identified based on aggregated credibility data from partnership sites such as www.linkedin.com, www.spoke.com, and the like. In some embodiments, the partnership information is contained in the credibility reports or data structures of the database as described with reference to FIG. 5 above. In some embodiments, the partnership information includes at least first degree partners and second degree partners. A first degree partner for an entity is one who is in a direct relationship with that entity. For example, a first degree partner includes a supplier who ships goods directly to the entity. A second degree partner is one who is in an indirect relationship with the entity. For example, a second degree partner includes a supplier who provides raw materials to a component supplier that then uses the raw materials to produce component goods that are directly shipped to the entity.

The process presents (at 2850) the partners for the entities of the identified group as generated leads for the particular entity. For example, the partners that are identified from a group of top-tier index performing entities are presented as partners that can potentially improve upon the credibility score of the particular entity if the particular entity was to engage in a relationship with those partners. The partners that are identified from a group of bottom-tier index performing entities are presented as partners that can potentially degrade the credibility score of the particular entity if the particular entity were to engage in a relationship with those partners. The presented partners will be relevant to the identified particular entity, because the index selected at 2810 will include other entities that are related to the identified particular entity based on at least one dimension. The leads may be presented through the interface portal or may be stored to the database for subsequent presentation based on upon a user submitted query or by navigation through the websites of the interface portal.

In some embodiments, the partnerships that are presented to the particular entity are filtered to present only those partners that are in established relationships with a threshold number of related entities (e.g., two or more). Additionally or alternatively, the presented partners can be filtered based on the credibility scores of the partners. For example, the indexer identifies 15 partners from the top performing competitors of the particular entity. The indexer then filters these 15 partners to identify and present five of the 15 partners with the highest overall credibility scores as leads for the particular entity.

Figure 29:
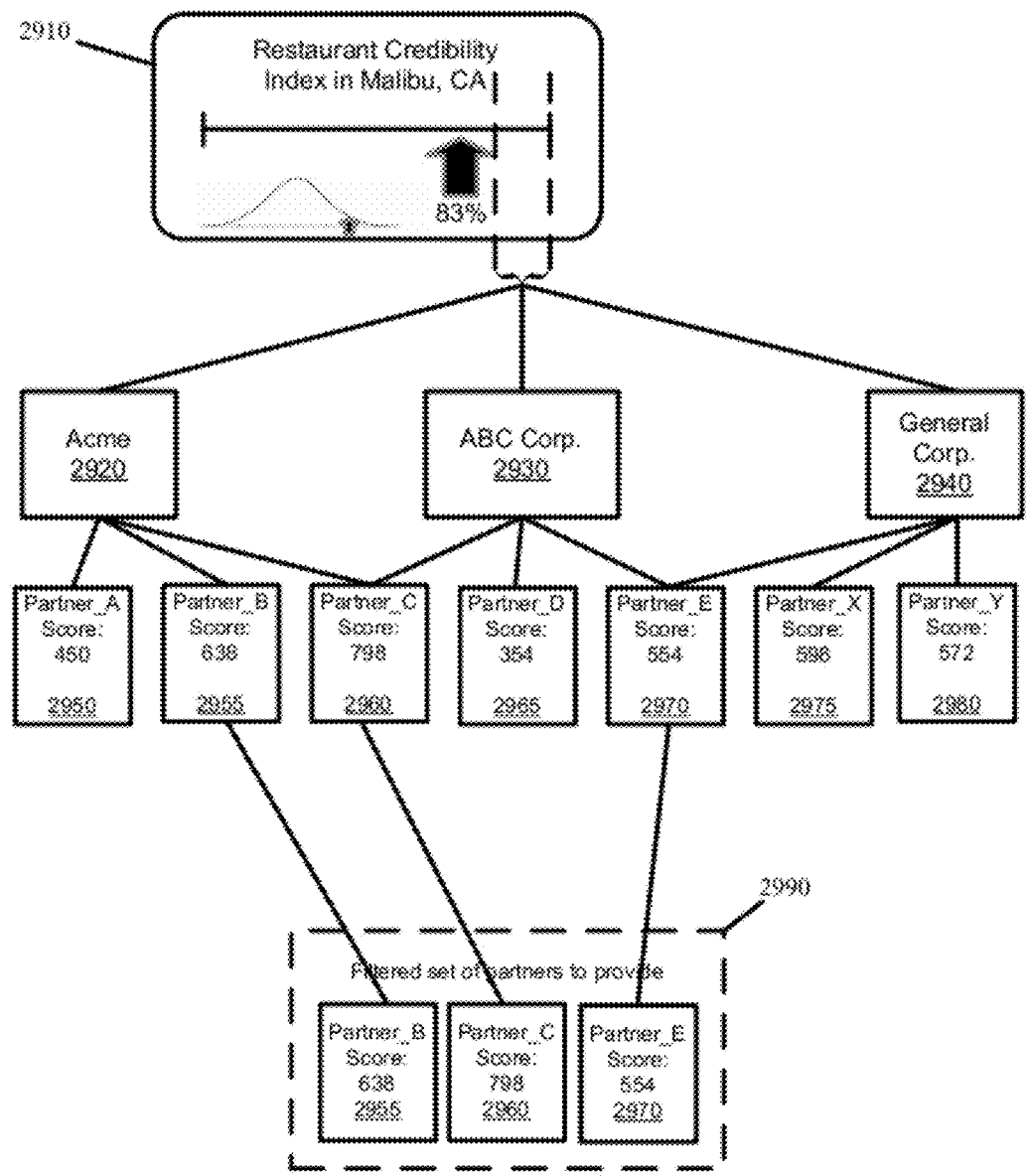
FIG. 29 conceptually illustrates using process 2800 to identify a filtered listing of partners of top performing businesses in accordance with some embodiments.

FIG. 29 conceptually illustrates using process 2800 to identify a filtered listing of partners of top performing entities in accordance with some embodiments. The figure includes (1) an index 2910 associated with a selected entity, (2) a set of entities 2920, 2930, and 2940 identified in the top 10% of the index, (3) first degree partners 2950, 2955, 2960, 2965, 2970, 2975, and 2980 of the set of entities 2920-2940 and the credibility scores for those partners, and (4) a filtered set of partners 2990 that includes partners 2955, 2960, and 2970 to provide as leads to the particular entity.

In accordance with process 2800, FIG. 29 illustrates identifying the index 2910 that is associated with the selected entity. As shown, the index 2910 presents credibility scores for restaurants in Malibu, Calif., wherein the selected entity is a business that ranks in the 83rd percentile of the index 2910. The top performing entities of the index are identified and include entities 2920, 2930, and 2940 which are ranked in the top 10 percentile of the index 2910. For each entity 2920, 2930, and 2940, the indexer identifies their respective first degree partners. As shown, entity 2920 has first degree partners 2950, 2955, and 2960; entity 2930 has first degree partners 2960, 2965, and 2970; and entity 2940 has first degree partners 2970, 2975, and 2980. It should be noted that partner 2960 is a partner of entities 2920 and 2930 and partner 2970 is a partner of entities 2930 and 2940.

Rather than provide all partners 2950-2980 to the selected entity, the list of partners is filtered to provide the set of partners 2990 that includes partners 2955, 2960, and 2970. The set of partners 2990 is derived using a plurality of filtering rules. Specifically, the identified partners with the highest credibility scores, partners 2955 and 2960, are included in the set of partners 2990. Additionally, partner 2970 is included because it is a common partner of two of the identified entities even though its credibility score is only the fifth highest of all identified partners 2950-2980.

Figure 30:
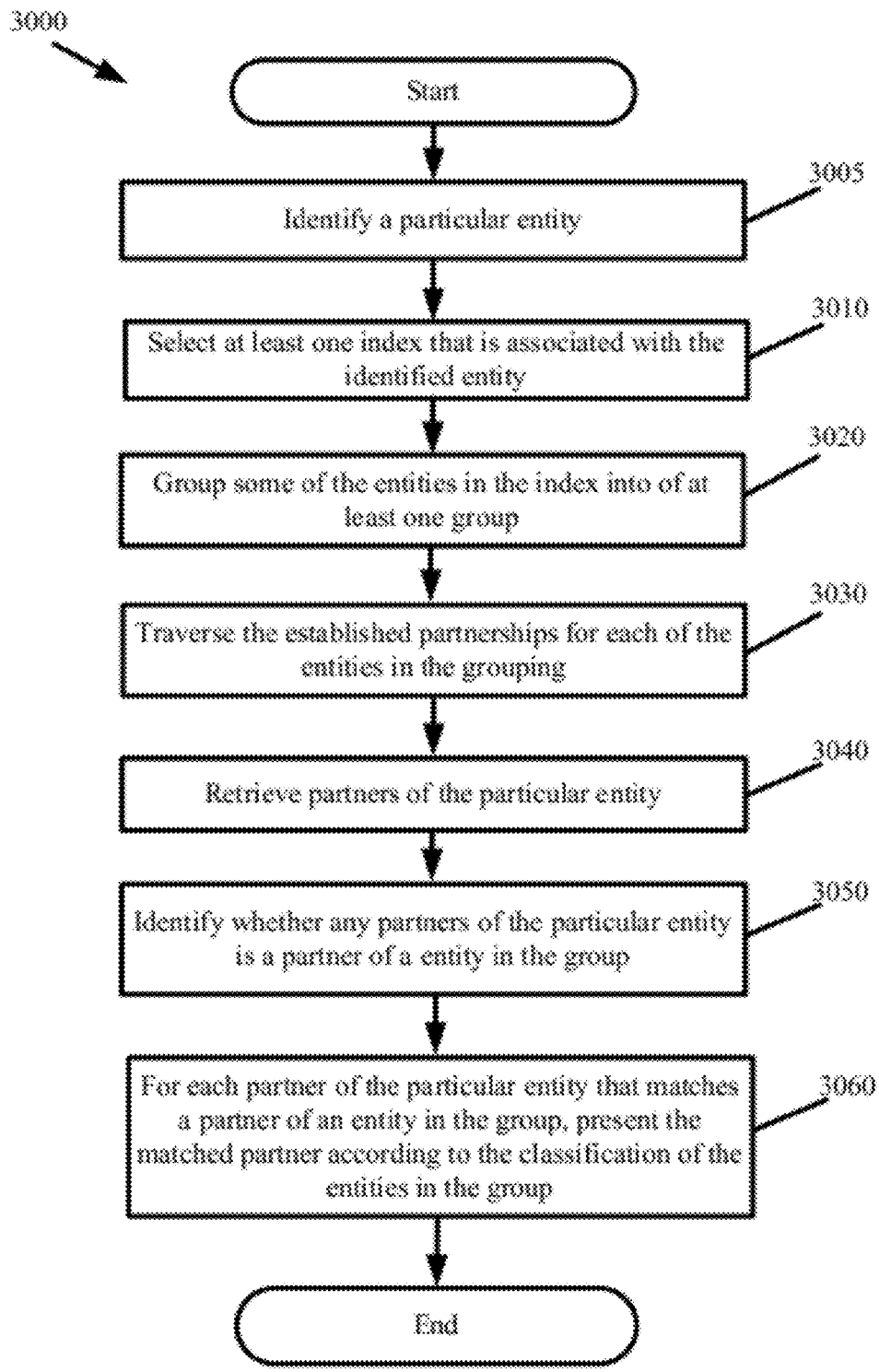
FIG. 30 presents a process for providing targeted information regarding partners of a particular business in accordance with some embodiments.

Partnership information that is presented in accordance with FIGS. 28 and 29 identifies partners of successful competitors or related entities that a particular entity can establish a relationship with in order to improve upon its own credibility. However, this does not identify for the particular entity whether its current partners are improving or degrading the credibility of the particular entity. Accordingly, some embodiments utilize the partnership information gleaned from process 2800 to provided targeted information to the particular entity. FIG. 30 presents a process 3000 for providing targeted information regarding partners of a particular entity in accordance with some embodiments.

Steps 3005-3030 are similar to steps 2805-2830 of FIG. 28. Specifically, the process identifies (at 3005) a particular entity and selects (at 3010) at least one index that is associated with the particular entity. The process groups (at 3020) some of the entities in the index in at least one of group. The process traverses (at 3030) the established partnerships for the entities that were grouped.

Next, the process retrieves (at 3040) partnership information for the particular entity. In some embodiments, this includes identifying the first degree partners of the particular entity. The process compares the partners of the particular entity to the partners of the entities that were grouped to identify (at 3050) whether any of the partners of the particular entity match any of the partners for the grouped entities. Depending on the classification of the entities in the group, each partner of the particular entity that matches a partner of a entity in the group is presented (at 3060) according to the classification. For example, if the group of entities includes top tier index performing entities, any matching partners will be presented as partners that beneficially impact the credibility of the particular entity and if the group of entities includes bottom tier index performing entities, any matching partners will be presented as partners that detrimentally impact the credibility of the particular entity.

Similar to the predictive credibility section above, the indexer can be leveraged to predictively identify for an entity what impact changing an existing partner or adding a new partner would have on the credibility score of that entity. This determination is made by determining the credibility score contribution that a specific partner makes to the overall credibility score of an entity. The credibility score contribution for all entities that have the specific partner are then averaged to derive an average credibility score contribution that can then be used to predict what impact establishing a partnership with that specific partner will have on the credibility score of an entity.

E. Preliminary Credibility

In some embodiments, the indexer uses information from the indices to determine a preliminary credibility score for a new entity for which credibility data does not exist or has not yet been aggregated. A new entity may include one that recently came into existence or one that has operated "under the radar" because of its small size or lack of exposure.

Agents of the new entity may register the entity with the credibility scoring and reporting system using the interface portal so that the system can be made aware of the entity. During registration, various information about the entity is provided by the registrant such as the name, address, phone number, agents/principals, field of business, goods and services provided by the entity, etc. Using this information, a preliminary credibility score is determined and provided to the registrant. The preliminary credibility score may also be provided to the public when they search for the new entity using the interface portal. In some embodiments, the preliminary credibility score is computed based on credibility scores of identified competitors or related entity that are adjusted according to a set of factors.

The preliminary credibility score instantly and accurately identifies the credibility of the new entity. Moreover, this identification is performed automatically by the indexer thereby eliminating individual subjective biases and interpretation from the computation of the preliminary credibility score. As actual credibility data is generated for the new entity and is aggregated into the credibility scoring and reporting system, the preliminary credibility score is adjusted to produce a credibility score that more heavily accounts for the credibility data that was aggregated for the entity.

Figure 31:
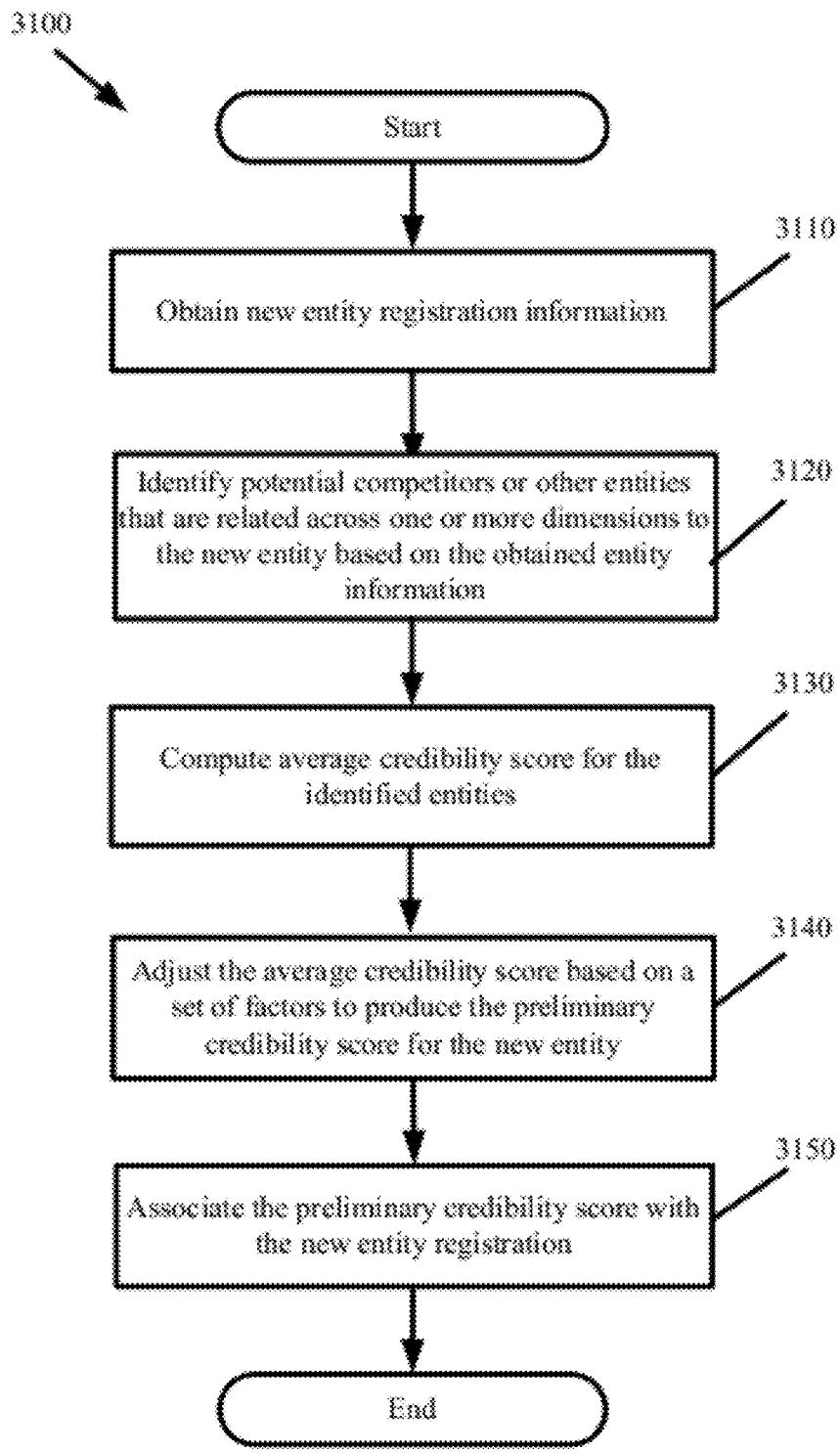
FIG. 31 presents a process performed by the indexer to compute a preliminary credibility score for a new business in accordance with some embodiments.

FIG. 31 presents a process 3100 performed by the indexer to compute a preliminary credibility score for a new entity in accordance with some embodiments. The process 3100 begins by obtaining (at 3110) new entity registration information. The registration is performed by a user directing a web browser application to an entity registration website of the credibility scoring and reporting system that is provided by the interface portal. The entity registration website includes interactive fields in which the user enters entity information. In some embodiments, the entity information includes identification information such as the name, address, phone number, website, etc. of the entity. In some embodiments, the entity information also includes information regarding the field of business that the entity operates in, goods and services provided by the entity, and other such information from which the entity can be classified and its competitors or other related entities can be identified.

The registration information is utilized by the process to identify (at 3120) potential competitors or other entities that are related across one or more dimensions. To do so, the indexer parses the registration information to extract data useful in classifying the entity (e.g., field of business, goods and services provided, zipcode, etc.). The indexer then formulates a query based on the parsed information to pass to the database. In response, the database identifies a list of competitors or related entities. In some embodiments, the query serves to identify one or more dimensions for an index from which the competitors or related entities are identified.

The process computes (at 3130) the average credibility score for the identified entities. Next, the process adjusts (at 3140) the average credibility score based on a set of factors to produce the preliminary credibility score for the new entity. The set of factors adjust the average credibility score to better reflect the credibility of a new entity relative to other established entities that are competitors or otherwise related to the new entity. The set of factors are used to adjust the average credibility score to account for how crowded the field of business is, how well established the competition is, location of the new entity relative to competitors, desirability of the new entity location, demand for the goods or services of the new entity as can be determined from the identified trends described above with reference to FIGS. 21 and 22, number of similar entities that have recently failed, how "hot" the field in which the new entity operates in is, etc. For example, if an unknown fast-food restaurant was to open a location directly adjacent to a McDonald's fast food restaurant, then the indexer can lower the preliminary credibility score to account for this high level of local competition. However, if the same fast food restaurant was to open a location in a congested residential neighborhood with no other fast food restaurants within a ten mile radius, then the indexer can increase the preliminary credibility score to account for the lack of competition.

It should be apparent that the set of factors can include additional factors in addition to or instead of some the above enumerated factors. Moreover, the indexer may selectively apply different factors to adjust the preliminary credibility score of different entities. Also, the process can utilize more complicated algorithms to derive the base credibility score that is subsequently adjusted. For example, instead of taking the average credibility score for related entities, the process can weight each credibility score differently based on how long the entity associated with that credibility score has been in operation. Less established or newer entities are likely to have credibility scores that more accurately reflect the credibility of the new entity for which a preliminary credibility score is to be computed. Accordingly, the credibility scores of the recently established entities will be weighted more heavily than the credibility scores of the more established or older entities.

The process associates (at 3150) the preliminary credibility score with the new entity registration. The association may include storing the preliminary credibility score with a data structure that was created for the new entity. Additionally, the association may include presenting the preliminary credibility score to the entity registrant at the end of the registration process so that the registrant is immediately provided with a quantified measure of the entity's credibility.

In addition to or instead of using process 3100 to derive a preliminary credibility score, some embodiments of the indexer parse user submitted registration information about a new entity to identify components for which a credibility score may be derived based on historic credibility for that component. In some embodiments, a primary component used in the computation of the preliminary credibility score is the identification of the principals operating the business entity. In many instances, the principals will have worked for other business entities for which credibility scores exist. By analyzing the historic performance of the credibility scores for the previous business entities that a principal worked for, the indexer can determine whether that principal is likely to have a beneficial or detrimental impact to the credibility of the new business entity. For example, a new restaurant may be registered with the credibility scoring and reporting system and the identification information provided may identify the executive chef as having previously been the executive chef at a Michelin star rated restaurant. Accordingly, the executive chef is acclaimed in the field and therefore will likely beneficially contribute to the credibility score of the new business. Similarly, a new franchise location that is operated by franchisee with several other successfully performing location will receive a higher preliminary credibility score for that new franchise location than a new franchise location that is operated by a franchisee with no other franchise locations.

To obtain the historic credibility performance for registration components, the indexer accesses the database and from the stored credibility data identifies previous associations for that component. As one example, aggregated credibility data from social networking sites, such as www.linkedin.com, can be used to identify previous businesses associated with an individual. Then, by performing a lookup of the credibility for those previous businesses, the indexer can determine whether that individual is likely to have a beneficial or detrimental impact on the credibility score of a new business.

In some embodiments, the preliminary credibility score is commoditized and monetized by restricting the preliminary credibility score to those entities that pay to gain access to the score. In this manner, the preliminary credibility score is converted to a tangible asset with monetary and sellable value.

The above methods for generating a preliminary credibility score are similarly applicable to generating a preliminary credit score for a newly formed business entity with no prior operational history. A newly formed business entity is often highly dependent on lines of credit to begin operations. However, lenders are more hesitant to extend credit to newly formed business entities because they do not have established records from which their revenue generating capabilities can be determined. Therefore, a preliminary credit score is a valued asset for lenders interested in determining how much credit to extend to a newly formed business entity.

As for the preliminary credibility score, the indexer computes a preliminary credit score by obtaining entity registration information. This information is utilized to identify potential competitors or other entities that are related across one or more dimensions. This is accomplished by the indexer parsing the registration information to extract data useful in classifying the entity (e.g., field of business, goods and services provided, zipcode, etc.). The indexer then identifies entities that have commonality with the new entity based on the parsed data.

The indexer computes the average credit score for the identified entities and adjusts value based on the same set of factors described above with respect to the derivation of the preliminary credibility score. Additionally, credit information may be obtained based on past performance of various components identified in the registration information including the past performance of the principals of the new entity.

F. Event Driven Credibility

In some embodiments, the indexer produces tangible assets in the form of credibility scores that not only account for credibility data that is associated with an entity, but that also account for micro and macro events. Micro and macro events include factors that are beyond the immediate influence of the entity, but that nevertheless impact the credibility of the entity. Such events may account for economic influences, political influences, climatic influences, seasonal influences, psychological influences, and logistical influences as some examples. A specific example of an economic influence includes accounting for whether an economy is in a "bull" market or "bear" market and how that market impacts credibility of an entity. A specific example of a political influence includes whether the controlling governmental party (e.g., Republicans or Democrats) changes and how that change impacts credibility of an entity. A specific example of a climatic influence includes accounting for whether a natural disaster, such as a tsunami or earthquake, has occurred and how that disaster impacts credibility of an entity. A specific example of a seasonal influence includes accounting for whether the holiday season is approaching and accounting for how the time of year impacts the credibility of an entity. A specific example of a psychological influence includes accounting for the public's perception of an industry, good, or service and how that perception impacts credibility of an entity. These examples are not intended to be limiting or exhaustive, but are presented for illustrative purposes.

By accounting for such events, the indexer is able to produce a more accurate credibility score that can also serve to forecast potentially unforeseen or unknown credibility influences. For example, a small business entity may operate in a geographic region that is affected by a natural disaster. The small business entity may not have been directly affected by the natural disaster and may presume that its credibility will remain unaffected. However, other entities that utilize goods and services of the small business entity may have been affected and that affect can impact the credibility of the small business entity. For example, the credibility of the small business entity may be detrimentally affected when the small business entity offers specialty luxury items and the natural disaster temporarily reduces demand for such luxury items. As another example, the credibility of the small business entity may be positively affected when the small business entity operates a hardware store and the natural disaster causes damage to the property of others which needs to be repaired using goods sold by the small business entity. Based on the type and magnitude of the event, the indexer automatically adjusts the credibility of one or more entities that are affected by the event or are otherwise impacted by the event.

Figure 32:
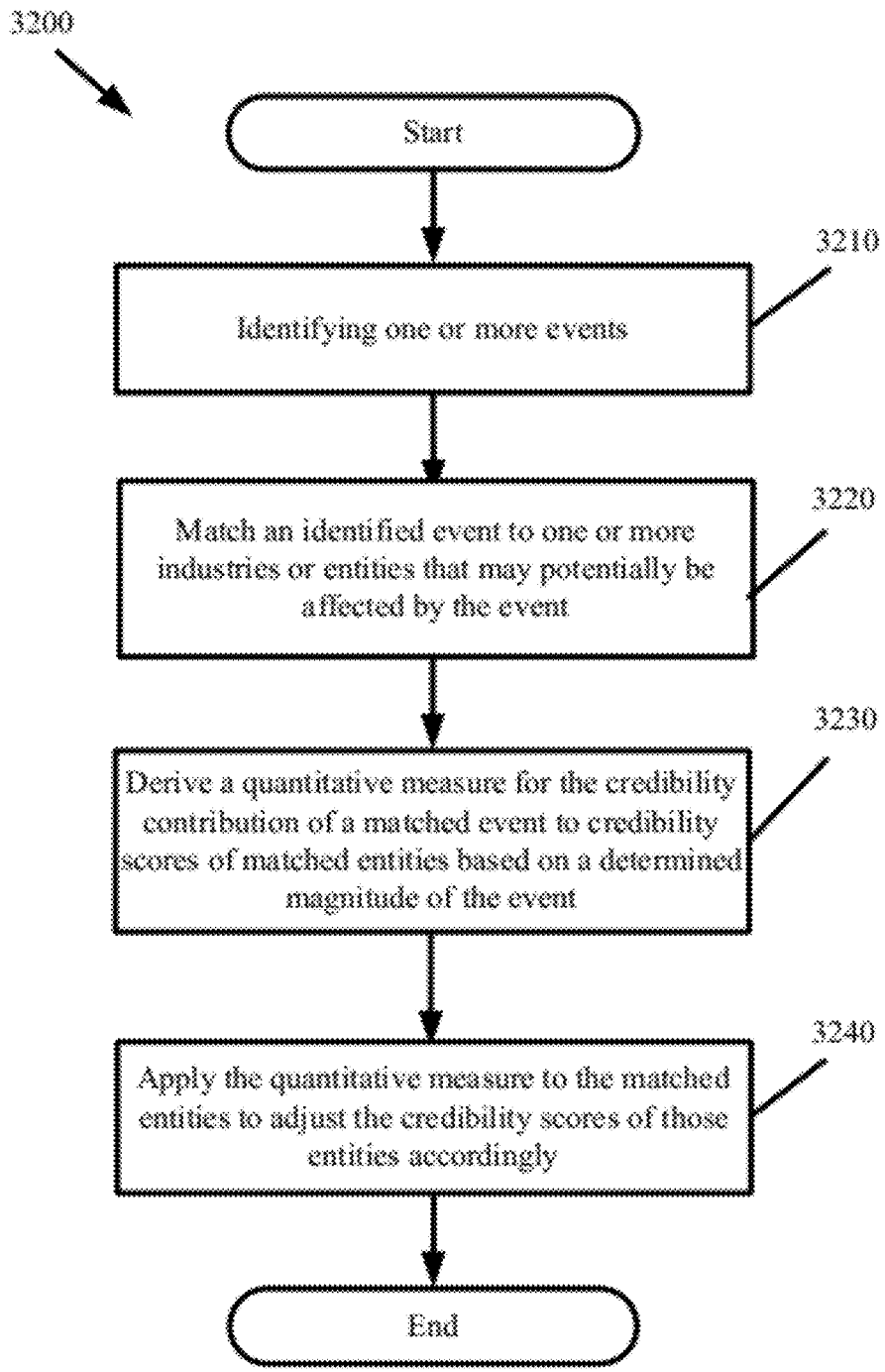
FIG. 32 presents a process performed by the indexer to adjust credibility of businesses based on micro and macro events in accordance with some embodiments.

FIG. 32 presents a process 3200 performed by the indexer to adjust credibility of entities based on the above enumerated and other micro and macro events that are in accordance with some embodiments. The process begins by identifying (at 3210) one or more events. Such identification occurs by the indexer aggregating news and social media feeds from multiple data sources and by processing the feeds to identify references to the events. The news feeds may be obtained from online news sites such as www.cnn.com and www.wsj.com as some examples. The social media feeds may be obtained from social media sites such as www.facebook.com and www.twitter.com as some examples. In some embodiments, the indexer identifies an event when processing of the one or more feeds identifies a threshold number of references to that event. For example, should an earthquake occur on the west coast of the United States, news and social media references to the earthquake will increase over time, crest, and decline. The surge in references about the earthquake will satisfy the threshold number of references needed to qualify the earthquake as an event. The identified event is matched (at 3220) to one or more industries or entities that may potentially be affected by the event. In some embodiments, matching occurs automatedly based on identifiers that occur in the references and that are associated with one or more entities. Specifically, some references to the event may be embodied as text that includes identifiers for identifying the geographic region affected by the event (e.g., "earthquake in California"), the industry affected by the event (e.g., "shortage of silicon used for transistors" or "crash in the banking system"), etc. Natural language processing of the references identifies the identifiers. The identifiers are then compared with identifiers that are associated with the entities of the credibility system. When a match is found with a particular entity, the indexer designates the particular entity as one whose credibility is affected by the event. For example, when a trending event specifies "earthquake in California", that event may automatically be associated with entities or indices that have California as a geographic dimension. In some embodiments, system administrators can manually match events to particular industries, entities, or indices.

The indexer derives (at 3230) a quantitative measure that the matched event will have on the credibility scores of matched or associated entities based on a determined magnitude of the event. In some embodiments, the magnitude is determined from natural language processing of the identifiers that are associated with the event. Similar to the quantification performed at FIGS. 7-10, the aggregated identifiers may connote some degree of positivity or negativity that is converted to a quantitative measure. For example, identifiers stating "worst natural disaster in the history of the state" or "estimated 5 billion dollars in damages" can be processed to derive quantitative measures to impact credibility scores of the entities matched to each event. Additionally, system administrators can manually process the aggregated identifiers associated with an event to specify a quantitative measure or modify the quantitative measure that is automatically provided by the indexer.

The process applies (at 3240) the quantitative measure to the matched entities to adjust the credibility scores of those entities accordingly. In some embodiments, an event has a temporary impact on the credibility scores of entities. The impact of the event is removed or degraded after some specified time whereby the significance of the event degrades or is no longer applicable. This specified time can be determined from the decline in the amount of data that is aggregated with respect to a given event. A decay parameter may also be attributed to the event to prolong its impact on the credibility of entities even after the event has subsided. For example, a decay parameter of one month may be applied to an earthquake event such that the credibility scores of entities impacted by the earthquake will remain impacted for one month after the earthquake or after aggregated news and social media about the earthquake passes some minimum threshold.

In this manner, the credibility scoring and reporting system can temporarily and automatically modify credibility scores of entities that are affected by micro and macro level events. In so doing, users and entities are provided a more accurate and holistic presentation of entity credibility.

In a similar manner, the credibility scoring and reporting system can temporarily and automatically modify credit scores of affected entities. As part of the data aggregation performed by the master data manager, the credibility scoring and reporting system aggregates or derives credit scores for the entities. The quantitative measure derived at 3230 of process 3200 that quantifies the magnitude of the event can also be applied to the credit scores of the affected entities. In so doing, the temporary impact of the event to the creditworthiness of the entities is determined.

It should be noted that the automated means for impacting credibility scores and impacting credit scores based on detected events is not limited in scope or applicability and requires no manual intervention. Such a system is therefore able to automatedly detect events that occur anywhere in the world, automatedly identify the affected entities anywhere in the world whether directly affected or indirectly affected through first or second degree partnerships, and automatedly provide a measure that quantifiably identifies the impact the event has on the credibility and creditworthiness of an identified entity. Moreover, because of the automation involved in the data aggregation, affected entity identification, and impact determination such affects can be seen in real-time as the event occurs or immediately thereafter.

G. Credibility Management

In some embodiments, the credibility scoring and reporting system provides tools to facilitate passive credibility management. Passive credibility management is useful for an entity that does not wish to actively monitor its credibility. Using the provided tools, the entity can setup various alerts using the interface portal that become active when specified thresholds are satisfied. Alerts may be specified for the overall credibility score, components used in deriving the credibility scores, for specific dimensions of credibility, or combinations thereof. For example, an alert may be set to become active (1) when the credibility score of the entity falls below a certain specified value, (2) when credibility data that negatively affects the credibility of the entity is aggregated and used in deriving the credibility of the entity, and/or (3) when the credibility of the entity falls to a specified percentile in an index that is based on a particular geographic dimension of credibility. In some embodiments, alerts are provided in the form of an email, telephone message, text message, fax, or social media update. This listing is not intended to be exhaustive or limiting, but is presented for illustrative purposes.

Figure 33:
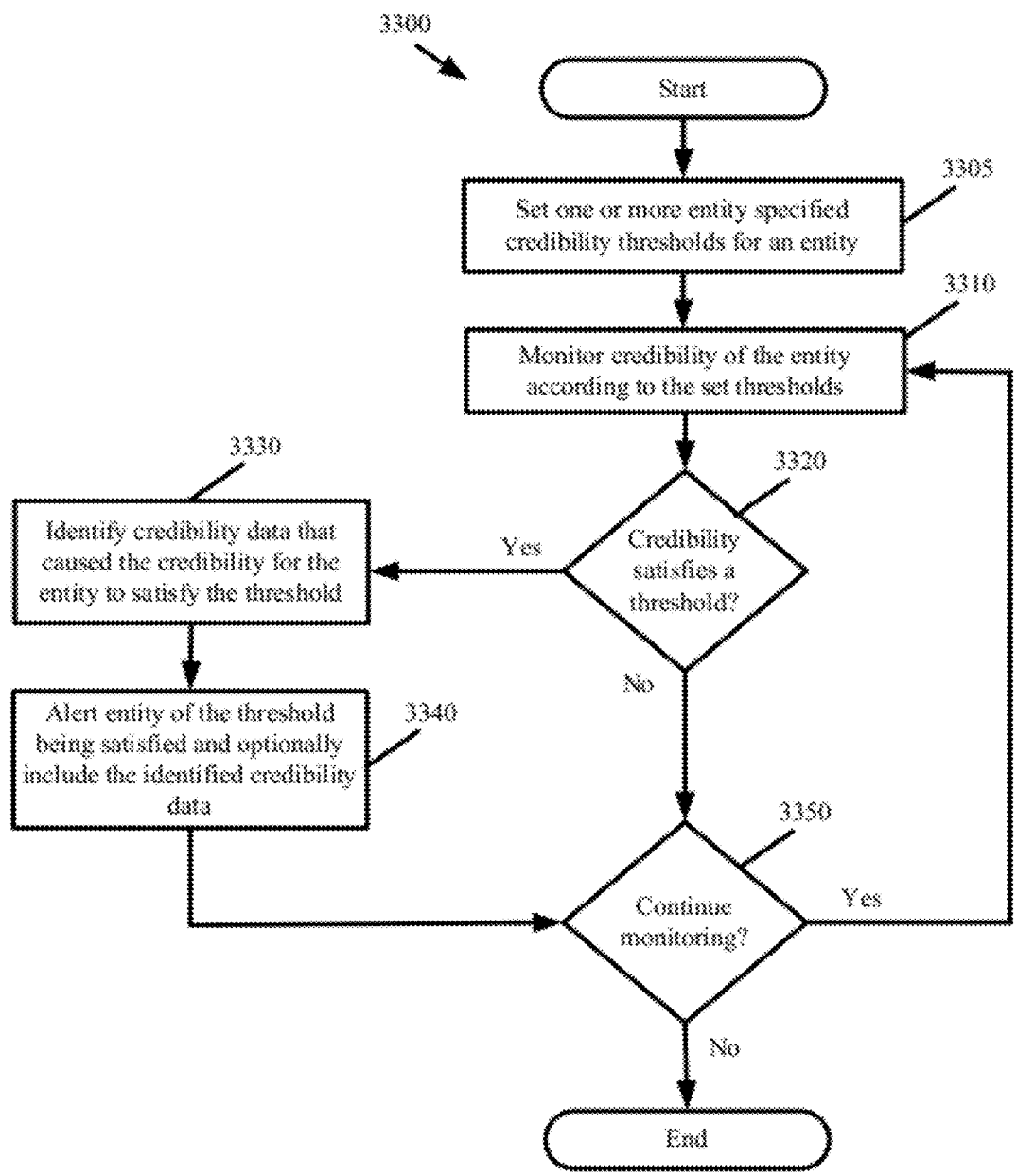
FIG. 33 presents a process performed by the credibility scoring and reporting system to passively monitor credibility of a business in accordance with some embodiments.

FIG. 33 presents a process 3300 performed by the credibility scoring and reporting system to passively monitor credibility of an entity in accordance with some embodiments. The process 3300 begins by setting (at 3305) one or more specified credibility thresholds for an entity. As noted above, these thresholds can apply to credibility scores, credibility components, various dimensions of credibility, or any combination thereof. Setting the thresholds includes defining automated rules in the database that are periodically executed by a background process running in the credibility scoring or reporting system. In some embodiments, defining a rule involves selecting one or more credibility dimensions or scores to monitor and a triggering action for the selected dimensions or scores. One or more interactive websites of the interface portal allow these thresholds to be set.

The process monitors (at 3310) the credibility of the entity according to the set thresholds. In some embodiments, monitoring the credibility of the entity includes monitoring for changes or updates to the credibility of the entity. This may include aggregating new credibility data that references the entity from the various data sources and adjusting the credibility score of the entity accordingly. The monitoring may be performed on a continual basis as new credibility data for the entity is aggregated. In some embodiments, the monitoring is performed periodically. For instance, the system monitors the credibility of the entity once a day to determine daily fluctuations to the credibility of the entity.

The process determines (at 3320) whether the credibility of the entity satisfies any of the set thresholds for that entity. If not, the process determines (at 3350) whether to continue monitoring and return to step 3305 or whether the process should end and be restarted at some subsequent time. When the credibility of the entity satisfies a set threshold, the process identifies (at 3330) credibility data that caused the threshold to be satisfied. The entity is then alerted (at 3340) of the threshold being satisfied and the alert optionally may include the identified credibility data such that the entity is made aware of what caused the threshold to be satisfied. The process determines (at 3350) whether to continue monitoring and return to step 3305 or whether the process should end and be restarted at some subsequent time.

IV. Computer System

Many of the above-described processes and modules are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Computer and computer system are meant in their broadest sense, and may include any electronic device with a processor including cellular telephones, smartphones, portable digital assistants, tablet devices, laptops, and netbooks. Examples of computer-readable media include, but are not limited to, CD-ROMs, flash drives, RAM chips, hard drives, EPROMs, etc.

FIG. 34 illustrates a computer system with which some embodiments are implemented. Such a computer system includes various types of computer-readable mediums and interfaces for various other types of computer-readable mediums that implement the various processes, modules, and engines described above (e.g., master data management acquisition engine, reporting engine, interface portal, etc.). Computer system 3400 includes a bus 3405, a processor 3410, a system memory 3415, a read-only memory 3420, a permanent storage device 3425, input devices 3430, and output devices 3435.

The bus 3405 collectively represents all system, peripheral, and chipset buses that communicatively connect the numerous internal devices of the computer system 3400. For instance, the bus 3405 communicatively connects the processor 3410 with the read-only memory 3420, the system memory 3415, and the permanent storage device 3425. From these various memory units, the processor 3410 retrieves instructions to execute and data to process in order to execute the processes of the invention. The processor 3410 is a processing device such as a central processing unit, integrated circuit, graphical processing unit, etc.

The read-only-memory (ROM) 3420 stores static data and instructions that are needed by the processor 3410 and other modules of the computer system. The permanent storage device 3425, on the other hand, is a read-and-write memory device. This device is a non-volatile memory unit that stores instructions and data even when the computer system 3400 is off. Some embodiments of the invention use a mass-storage device (such as a magnetic or optical disk and its corresponding disk drive) as the permanent storage device 3425.

Other embodiments use a removable storage device (such as a flash drive) as the permanent storage device. Like the permanent storage device 3425, the system memory 3415 is a read-and-write memory device. However, unlike the storage device 3425, the system memory is a volatile read-and-write memory, such as random access memory (RAM). The system memory stores some of the instructions and data that the processor needs at runtime. In some embodiments, the processes are stored in the system memory 3415, the permanent storage device 3425, and/or the read-only memory 3420.

The bus 3405 also connects to the input and output devices 3430 and 3435. The input devices enable the user to communicate information and select commands to the computer system. The input devices 3430 include, but are not limited to, any of a capacitive touchscreen, resistive touchscreen, any other touchscreen technology, a trackpad that is part of the computing system 3400 or attached as a peripheral, a set of touch sensitive buttons or touch sensitive keys that are used to provide inputs to the computing system 3400, or any other touch sensing hardware that detects multiple touches and that is coupled to the computing system 3400 or is attached as a peripheral. The input devices 3430 also include, but are not limited to, alphanumeric keypads (including physical keyboards and touchscreen keyboards) and pointing devices (also called "cursor control devices"). The input devices 3430 also include audio input devices (e.g., microphones, MIDI musical instruments, etc.). The output devices 3435 display images generated by the computer system. The output devices include printers and display devices, such as cathode ray tubes (CRT) or liquid crystal displays (LCD).

Finally, as shown in FIG. 34, bus 3405 also couples computer 3400 to a network 3465 through a network adapter (not shown). In this manner, the computer can be a part of a network of computers such as a local area network ("LAN"), a wide area network ("WAN"), or an Intranet, or a network of networks, such as the Internet. For example, the computer 3400 may be coupled to a web server (network 3465) so that a web browser executing on the computer 3400 can interact with the web server as a user interacts with a GUI that operates in the web browser.

As mentioned above, the computer system 3400 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for facilitating comparative analysis of entity credibility, the computer-implemented method comprising:

identifying at least one filter for restricting entities to include as part of the comparative analysis;

filtering a plurality of entities based on the at least one filter to obtain a set of entities satisfying the at least one identified filter;

aggregating credibility scores for each entity of the set of entities, wherein each credibility score quantifies, into a numeric value, qualitative credibility data and quantitative credibility data directed to reputation of a different entity of the set of entities, wherein the qualitative credibility data comprises reviews and the quantitative credibility data comprises ratings about experiences and accounts with the entity;

ordering the credibility scores for the set of entities;

generating an index based on the ordering of the credibility scores, wherein generating the index comprises plotting in a graph (i) a plurality of data points representing the credibility score of each entity of the set of entities based on the ordering and (ii) an indicator identifying in the graph, the credibility score of a particular entity from the set of entities;

isolating from the index, a subset of the set of entities having a credibility score exceeding a specified score;

determining at least one commonality in the qualitative and quantitative credibility data of the subset of entities; and providing to the particular entity in the set of entities and not in the subset of entities, the at least one commonality as a suggested business practice for improving the particular entity credibility score.

2. The computer-implemented method of claim 1, wherein the qualitative credibility data and quantitative credibility data is aggregated from a plurality of data sources, and the computer-implemented method further comprising associating the credibility data that is aggregated for each entity of the set of entities with a credibility score of that entity.

3. The computer-implemented method of claim 2 further comprising providing an interactive tool to display the credibility data that is aggregated for an entity by interacting with a credibility score of the entity that is presented in said index.

4. The computer-implemented method of claim 1 further comprising aggregating credibility data that is related to each entity of the plurality of entities from a plurality of data sources, wherein said credibility data comprises (i) qualitative data having a textual statement and (ii) quantitative data having an objective measure bounded by a specific scale.

5. The computer-implemented method of claim 4 further comprising computing a credibility score for each entity of the plurality of entities from credibility data that is aggregated for said entity.

6. The computer-implemented method of claim 1, wherein the set of entities is a first set of entities, the method further comprising providing an interactive tool for modifying the filter in order to modify said index to present credibility scores for a second set of the plurality of entities that satisfies the modified filter.

7. The computer-implemented method of claim 1, wherein filtering the plurality of entities comprises identifying a set of entities from the plurality of entities that are located within a specified geographic region.

8. The computer-implemented method of claim 1, wherein filtering the plurality of entities comprises identifying a set of entities from the plurality of entities that operate in the same field of business.

9. The computer-implemented method of claim 1, wherein generating the index comprises generating a graphical representation for the ordered credibility scores for the set of entities.

10. A computer-implemented method comprising:
specifying at least one dimension for filtering credibility scores of a plurality of entities that are to be included in an index;
specifying a range for the at least one specified dimension for further filtering of the credibility scores of the plurality of entities that are to be included in said index;
retrieving a set of credibility scores for a set of the plurality of entities that satisfy the at least one specified dimension and the range for the at least one specified dimension, wherein said set of credibility scores are retrieved from a database storing a plurality of credibility scores for the plurality of entities, wherein each credibility score of the plurality of credibility scores numerically quantifies qualitative credibility data and quantitative credibility data that is directed to reputation of a different entity of the plurality of entities, and wherein the qualitative credibility data comprises reviews and the quantitative credibility data comprises ratings about the entity; and
generating an index to present the retrieved set of credibility scores in a graphical representation that comparatively presents the retrieved sets of credibility scores for the set of entities; and
isolating from the index, a subset of the set of entities having a credibility score exceeding a specified score;
determining at least one commonality in the qualitative and quantitative credibility data of the subset of entities; and
providing to a particular entity that is in the set of entities and that is not in the subset of entities, the at least one commonality as a suggested business practice for improving the particular entity credibility score.

11. The computer-implemented method of claim 10 further comprising linking said index to an account for each entity of the set of entities for presentation of said index when an account of an entity of the set of entities is accessed.

12. The computer-implemented method of claim 10 further comprising providing interactive functionality with said index, wherein said interactive functionality enables access to the qualitative and quantitative credibility data that is used in deriving the credibility score for at least one particular entity of the set of entities.

13. The computer-implemented method of claim 10 further comprising keying said index to the particular entity of the set of entities, wherein keying said index to the particular entity comprises highlighting a credibility score of the particular entity relative to credibility scores of other entities of the set of entities that are presented in the index.

14. The computer-implemented method of claim 13, wherein keying said index to the particular entity further comprises demarcating in the index, a credibility score of the particular entity from credibility scores of other entities in the set of entities.

15. The computer-implemented method of claim 10, wherein the at least one specified dimension comprises location, the range for the at least one specified dimension comprises a defined geographic region, and the set of entities comprises entities in the defined geographic region.

16. The computer-implemented method of claim 10, wherein the at least one specified dimension comprises goods and services, the range for the at least one specified dimension comprises at least one enumerated good and service, and the set of entities comprises entities offering the at least one enumerated good and service.

17. The computer-implemented method of claim 10, wherein the at least one specified dimension comprises business, the range for the at least one specified dimension comprises a particular field of business, and the set of entities comprises entities operating in the particular field of business.

18. The computer-implemented method of claim 10, wherein specifying the at least one dimension comprises specifying a first dimension and a second dimension, wherein specifying the range for the at least one specified dimension comprises specifying a first range for the first dimension and a second range for the second dimension, and wherein retrieving the set of credibility scores comprises retrieving a set of credibility scores for a set of the plurality of entities that satisfy the first dimension and the first range for the first dimension and that satisfy the second dimension and the second range for the second dimension.

* * * * *